United States Patent
Itoh et al.

(10) Patent No.: US 8,174,757 B2
(45) Date of Patent: May 8, 2012

(54) WAVELENGTH DETERMINING APPARATUS, METHOD AND PROGRAM FOR THIN FILM THICKNESS MONITORING LIGHT

(75) Inventors: Takahiro Itoh, Tokyo (JP); You Mimura, Tokyo (JP)

(73) Assignee: The Furukawa Electric Co., Ltd. (JP)

( * ) Notice: Subject to any disclaimer, the term of this patent is extended or adjusted under 35 U.S.C. 154(b) by 0 days.

(21) Appl. No.: 12/843,453

(22) Filed: Jul. 26, 2010

(65) Prior Publication Data
US 2010/0284062 A1 Nov. 11, 2010

Related U.S. Application Data

(60) Continuation of application No. 11/804,835, filed on May 21, 2007, now abandoned, which is a division of application No. 10/330,936, filed on Dec. 27, 2002, now abandoned.

(30) Foreign Application Priority Data

Jan. 4, 2002 (JP) ................................. 2002-000115
Jan. 4, 2002 (JP) ................................. 2002-000143
Jan. 16, 2002 (JP) ................................. 2002-007901

(51) Int. Cl.
*H01S 3/00* (2006.01)
(52) U.S. Cl. ................ 359/337.1; 359/337.4; 359/341.1
(58) Field of Classification Search ............... 359/337.1, 359/337.4, 341.1
See application file for complete search history.

(56) References Cited

U.S. PATENT DOCUMENTS

| | | | |
|---|---|---|---|
| 3,737,210 A | 6/1973 | Howe | |
| 4,102,683 A | 7/1978 | DiPiazza | |
| 4,985,737 A | 1/1991 | Gaylord et al. | |
| 5,920,424 A | 7/1999 | Espindola et al. | |
| 6,396,624 B1 | 5/2002 | Nissov et al. | |
| 6,438,150 B1 | 8/2002 | Yoo | |
| 6,483,631 B1 | 11/2002 | Cheng et al. | |
| 6,498,676 B1 | 12/2002 | Zimmerman et al. | |
| 6,569,516 B1 | 5/2003 | Nakamura et al. | |
| 6,611,378 B1 * | 8/2003 | Wang et al. | 359/588 |
| 6,716,779 B2 | 4/2004 | Lin | |
| 2001/0013970 A1 * | 8/2001 | Aida et al. | 359/341.3 |
| 2002/0196541 A1 | 12/2002 | Cai | |
| 2003/0086152 A1 | 5/2003 | Wigley et al. | |
| 2004/0062945 A1 | 4/2004 | Domash et al. | |
| 2004/0239953 A1 | 12/2004 | Flynn | |

FOREIGN PATENT DOCUMENTS

| | | |
|---|---|---|
| JP | 54-13367 | 1/1979 |
| JP | 60-181704 A | 9/1985 |
| JP | 60-218601 A | 11/1985 |

(Continued)

OTHER PUBLICATIONS

Form PTO-892 from Office Action for U.S. Appl. No. 11/804,835 dated Mar. 20, 2009.

(Continued)

*Primary Examiner* — Mark Hellner
(74) *Attorney, Agent, or Firm* — Cantor Colburn LLP

(57) ABSTRACT

A multi-layer optical thin film filter comprising plural deposited optical thin films, wherein optical thin film thickness for each of said optical thin films has a predetermined wavelength spectrum in a predetermined gain equalization band and a predetermined wavelength spectrum in a pumping light transmission band other than said gain equalization band.

11 Claims, 40 Drawing Sheets

FOREIGN PATENT DOCUMENTS

| | | | |
|---|---|---|---|
| JP | 1-286476 | A | 11/1989 |
| JP | 4-340504 | A | 11/1992 |
| JP | 5-206546 | A | 8/1993 |
| JP | 9-18416 | A | 1/1997 |
| JP | 2000-131028 | A | 5/2000 |
| JP | 2001-311820 | A | 11/2001 |
| JP | 2002-196129 | A | 7/2002 |
| JP | 2003-69116 | A | 3/2003 |

OTHER PUBLICATIONS

Form PTO-892 from Office Action for U.S. Appl. No. 10/330,936 dated Nov. 21, 2006.

Information Disclosure Statement filed in U.S. Appl. No. 11/804,835 on May 21, 2007.

Information Disclosure Statement filed in U.S. Appl. No. 11/804,835 on Aug. 17, 2007.

Japanese Office Action for Patent Application No. 2002-000115 mailed Jun. 6, 2006 with English translation.

Notice of Reasons for Rejection for Japanese Patent Application No. 2002-007901 mailed Feb. 13, 2007 with English translation.

Notice of Reasons for Rejection for Japanese Patent Application No. 2002-000143 mailed Feb. 20, 2007 with English translation.

Form PTO-892 from Office Action for U.S. Appl. No. 10/330,936 dated Feb. 25, 2005.

Form PTO-892 from Office Action for U.S. Appl. No. 10/330,936 dated Mar. 10, 2006.

* cited by examiner

FIG. 15

| LAYER NUMBER | THIN FILM MATERIAL | OPTICAL THIN FILM THICKNESS BASED ON CENTER WAVELENGTH $\lambda c$ |
|---|---|---|
| 1 | $SiO_2$ | 1.5218 |
| 2 | $Ta_2O_5$ | 1.6844 |
| 3 | $SiO_2$ | 1.7932 |
| 4 | $Ta_2O_5$ | 1.7409 |
| 5 | $SiO_2$ | 1.7677 |
| 6 | $Ta_2O_5$ | 1.7582 |
| 7 | $SiO_2$ | 1.7228 |
| 8 | $Ta_2O_5$ | 1.7233 |
| 9 | $SiO_2$ | 1.7274 |
| 10 | $Ta_2O_5$ | 1.8238 |
| 11 | $SiO_2$ | 1.7422 |
| 12 | $Ta_2O_5$ | 1.7906 |
| 13 | $SiO_2$ | 1.7199 |
| 14 | $Ta_2O_5$ | 1.7687 |
| 15 | $SiO_2$ | 1.7071 |
| 16 | $Ta_2O_5$ | 1.7686 |
| 17 | $SiO_2$ | 1.7256 |
| 18 | $Ta_2O_5$ | 1.7731 |
| 19 | $SiO_2$ | 1.7732 |
| 20 | $Ta_2O_5$ | 1.7388 |
| 21 | $SiO_2$ | 1.7606 |
| 22 | $Ta_2O_5$ | 1.7747 |
| 23 | $SiO_2$ | 1.7594 |
| 24 | $Ta_2O_5$ | 1.7251 |
| 25 | $SiO_2$ | 1.7049 |
| 26 | $Ta_2O_5$ | 1.7548 |

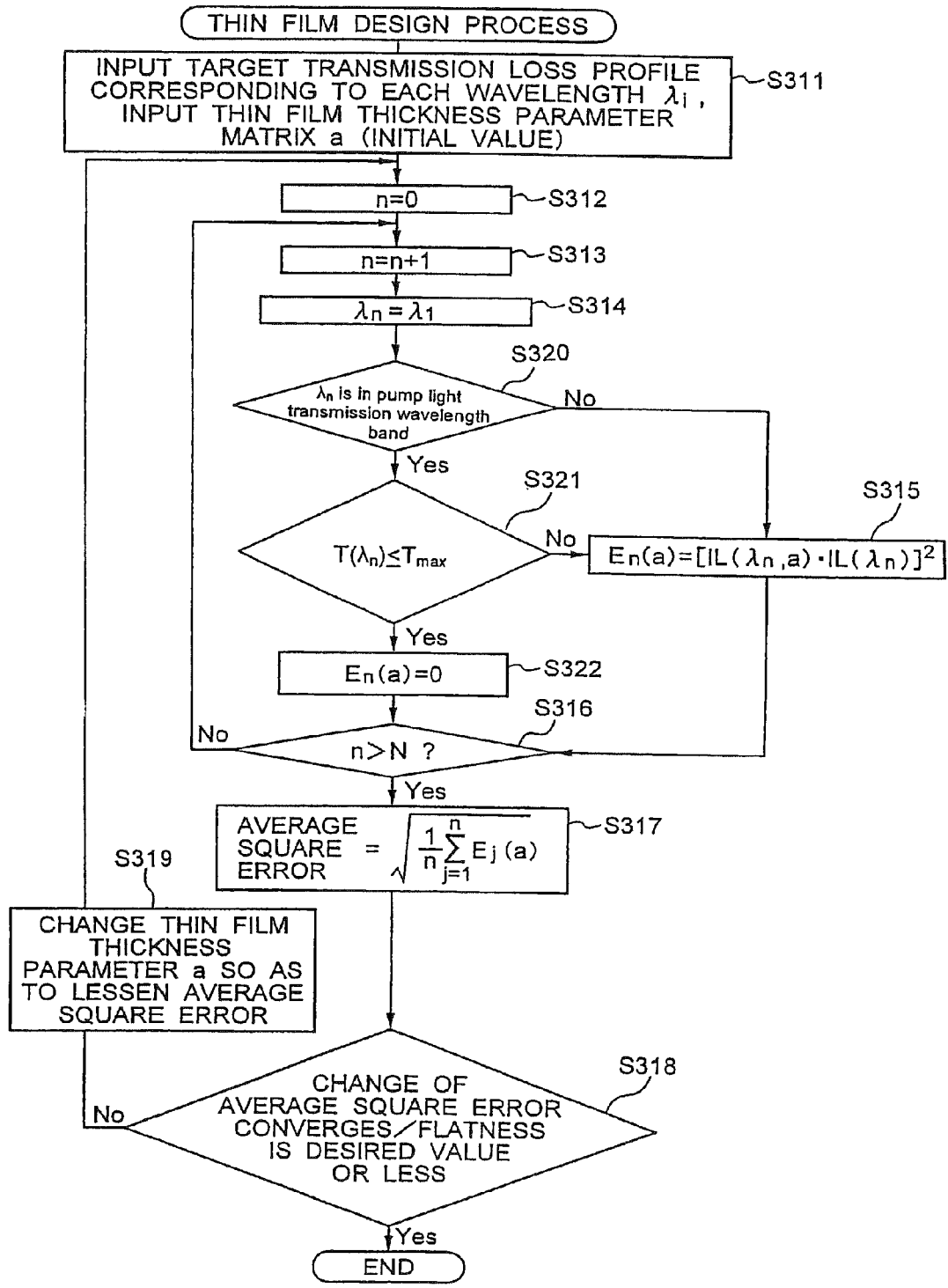

WAVELENGTH DETERMINING APPARATUS, METHOD AND PROGRAM FOR THIN FILM THICKNESS MONITORING LIGHT

CROSS-REFERENCE TO RELATED APPLICATIONS

The present application is a Continuation of U.S. patent application Ser. No. 11/804,835, filed on May 21, 2007, which is a divisional of U.S. patent application Ser. No. 10/330,936, filed on Dec. 27, 2002, the entire contents of each of which are incorporated herein by reference. The Ser. No. 10/330,936 application claimed the benefit of the date of Jan. 4, 2002 of the earlier filed Japanese Patent Application No. 2002-000115; Jan. 4, 2002 of Japanese Application No. 2002-000143; and Jan. 16, 2002 of Japanese Application No. 2002-007901, priority to each of which is also claimed herein, and the entire contents of which are hereby incorporated by reference.

FIELD OF THE INVENTION

The present invention relates to an apparatus, a method and a program for determining a wavelength of a monitoring light which monitors a thin film thickness while an optical thin film with an optical profile such as an optical filter and the like used for optical transmission is deposited.

The present invention also relates to a multi-layer thin film filter used for optical transmission, and a method and a system to produce the multi-layer thin film filter.

In addition, the present invention relates to a multi-layer thin film filter used for optical transmission, and an apparatus and a method to design the multi-layer thin film filter.

RELATED ART

It is desired to increase a present capacity of data transmission because a broadband era has arrived. Under such circumstances, it is expected to realize WDM (Wavelength Division Multiplexing) transmission systems to transmit plural light beams with different wavelengths in a wavelength-multiplexed light signal.

As one of the key devices supporting such WDM transmission systems, there are optical filters that optically affects on an incident light. Such optical filers include optical band pass filters (BPF) for transmitting only a light with a desired preset wavelength out of the incident light obtained by wavelength-multiplexing light beams with different wavelengths, and gain flattening filters (GFF) for flattening an output of an optical fiber amplifier such as EDFA (Erbium-doped Fiber Amplifier) or the like.

A multi-layer film filter consisting of plural optical thin films with different refractive indices is known as one of the above mentioned optical filters. This multi-layer thin film filter makes it possible to obtain a desired wavelength loss profile by setting a thin film thickness and a refractive index of each layer suitably.

For example, as a thin film deposition method and a thin film deposition apparatus both for producing a multi-layer thin film filter, or a multi-layer thin film, there is known a method and apparatus in which optical thin films (filter films) are deposited sequentially on a deposition substrate by utilizing vacuum deposition technique or sputtering technique.

As mentioned above, it is required to design and produce a thin film thickness of a multi-layer thin film filter precisely because desired filtering profiles (target loss-wavelength profile) are obtained by a precise thickness of each layer which composes multi-layer thin films.

Therefore it is required to control production of a optical thin film such as always monitoring an optical film thickness during the thin film deposition and stopping the thin film deposition precisely when the monitored optical thin thickness reaches a target thickness. For example, one type to control production of an optical thin film is a B/A control method and the like.

According to the B/A control method, it is required to project a monitoring light to optical thin films under a deposition and monitor a change of a transmission rate of the monitoring light that is transmitted through or reflecting from the optical thin films. As shown in FIG. 45, it is possible to illustrate theoretically the B/A which is a ratio between "B" which is a distance from a maximum value for a optical intensity of a stopping light and "A" which is a distance between a top and a bottom of a locus of the transmission rate change because this locus of the transmission rate change has a definite amplitude, and a maximum and a minimum value.

Therefore a desired film thickness is obtained with stopping the thin film deposition when the B/A value based on an actual change of a transmission rate and the B/A value based on a theoretical change for a transmission rate of a desired film thickness becomes the same value.

However there are the following problems when an optical thin film is produced with using a optical thin film thickness monitoring method such as the above mentioned B/A control method or the like.

For multi-layer thin film filters, more layers of optical films are required to obtain a transmission loss wavelength profile with a sharper transmission loss change. However it becomes more difficult to design a multi-layer thin film filter when a number of layers increase because of the above mentioned reason. Therefore it takes long time to optimize a optical thin film thickness to obtain a target optical profiles.

In addition, a target transmission loss wavelength profile cannot be obtained when a difference between a designed optical thin film thickness of each layer and a optical thin film thickness actually deposited becomes larger than an allowable maximum difference.

When a number of layers of a multi-layer thin film filter is increased, an allowable maximum difference to obtain a profile close to the target transmission loss wavelength profile becomes smaller and a precise control for a thin film deposition is required. Therefore it is difficult to produce a multi-layer thin film filter with a target transmission loss wavelength profile.

On the other hand, FIG. 46 is a graph illustrating an example of a result of a thin film deposition using a conventional control method of a thin film thickness.

Data as shown in FIG. 46 is data of a gain flattening filter (GFF) produced by a method that two kinds of film materials ($Ta_2O_5$, $SiO_2$) are deposited sequentially. A large difference is found out between a design value (design data) and actual optical profile data in a wavelength band of optical signals (1529 nm to 1561 nm in FIG. 46) in this data. A flatness to express a difference of the transmission loss is a value calculated by a maximum difference minus a minimum difference, and the value shown in FIG. 46 reaches 2.514 dB.

However, when the GFF is produced, a desired flatness (a difference of transmission loss) varies, the GFF with flatness of 1.0 dB or less can be used as a commercial product. Therefore the GFF as shown in FIG. 46 has 2.541 dB as a difference of transmission loss, and it cannot be used as a commercial product.

The reason of such large difference between a profile of the optical transmission loss based on the design data and a profile of the optical transmission loss of the thin film filter actually deposited is explained below.

The difference between the desired thin film thickness and the thin film thickness actually deposited is hereinafter called an error.

Though the precise thin film deposition is theoretically achievable with using a conventional control method for thin film thickness, there is an error during the actual deposition. A thin film thickness of each layer differs from a desired thin filter thickness and an ideal optical profile cannot be obtained because of the error. There are random errors and usual errors in the category of errors. The reason why the usual error occurs is hereinafter explained with using the following example.

The first reason of the usual error is an optical damping time constant at projecting a monitoring light. This optical damping time constant can be studied by monitoring response of the monitoring light at closing and opening an optical axis.

In general, an optical system has a receiver (an O/E converter) that receives a monitoring light and converts it into an electrical signal, or a lock-in amplifier for removing noises. Such elements composing an optical system have an optical damping time constant. Therefore a change of optical intensity of a monitoring light during a vacuum deposition is delayed with compared to an actual change of optical intensity because of the optical damping time constant. Therefore, a stopping control for a thin film deposition is delayed, which causes a thicker film thickness because this thin film deposition is controlled by the change of the optical intensity of the monitoring light.

Next reason of the usual error is a delay during processing signals. An actual stopping time of a thin film deposition is always delayed with compared to a target stopping time of a thin film deposition because of the delay of a signal processing structure based on a program incorporated in a control apparatus (computer) for thin film deposition control, a signal processing capacity of the control apparatus itself, interfaces and the like. This delay causes a thinner film thickness in a vacuum deposition.

Furthermore other reason is a mechanical movement. A conventional control method to stop a thin film deposition is to prevent evaporated deposition materials from deposited on a deposition substrate with closing a shutter located over a deposition materials source.

There is a time delay between a starting time to close the shutter after a shutting signal is received from a control apparatus and a completion time to complete closing the shutter. This additional time for completion of closing a shutter causes more deposition time than expected and a thinner film thickness.

Other reason of the usual error is that the evaporated deposition materials reach a surface of the deposition substrate through the shutter. The shutter is closed with a signal from a control apparatus when a value such as the B/A and the like reaches a target value. Though the shutter is closed, a part of evaporated deposition materials reach the deposition substrate for deposition through the shutter if a deposition material source is heated.

Other reason of the usual error is a change of wavelength during usage of an optical monitor. It is possible that a wavelength profile of a thin film changes according to a change of stress, temperature and the like of thin films during a thin film deposition. It is also possible that a wavelength itself changes according to unstableness of a light source that projects a monitoring light or unstableness of a spectroscope which selects a wavelength of the monitoring light and the like.

When a wavelength of a monitoring light that is transmitted or reflecting from the optical thin films changes relatively, a desired thin film thickness cannot be achieved because of the following reasons.

For example, when wavelength of $\lambda 1$ for a monitoring light (a monitoring wavelength) changes relatively according to the above mentioned reasons and becomes $\lambda 2$ ($\lambda 1 < \lambda 2$) while monitoring a transmitted or reflecting light (a monitoring light) with a wavelength of $\lambda 1$ with using the B/A control method, cumulative errors for an optical film thickness of each layer become large based on the B/A values calculated with a theoretical design method, and it is possible that a desired optical profile is not obtained in total multi-layer thin films.

In addition, the EDFA (Erbium Doped Fiber Amplifier) and the like which enables to amplify the above mentioned wavelength-multiplexed light signal simultaneously without using optical-electrical conversion is developed as one of the key devices of WDM transmission systems.

It is possible that a transmission length and a transmission band become lower because of deformation of an optical signal profile caused by a difference of optical signal levels of each wavelength transferred in the WDM transmission systems. Therefore it is required to equalize a gain profile of an amplifier in a transmission wavelength band of projected optical signals when the EDFA and the like is utilized.

In this point a gain profile of an optical amplifier has wavelength dependency in a transmission wavelength band. Therefore the gain profile is equalized with combining the optical amplifier with the GFF which has a transmission loss profile which is reciprocal to the optical amplifier in the above mentioned transmission wavelength band. (Refer to FIG. 47.)

A fiber grating, an etaron filter, a multi-layer thin film filter and the like are used as a GFF, and especially a multi-layer optical thin film filter (or sometimes called a multi-layer thin film filter) which is suitable for mass production is used for an optical amplifier for mass production. "Multi-layer" means plural layers in this specification.

FIG. 48 is a graph illustrating the above mentioned target design transmission loss profiles (the GFF specification: ◇), a transmission loss based on design data of a multi-layer thin film filter (a solid line) and a difference of both transmission losses (□). A flatness, which is a scale of a transmission loss, is a value that the minimum difference is deducted from the maximum difference.

As shown in FIG. 48, a multi-layer thin film filter is designed and manufactured with using a transmission loss profile which is reciprocal to a gain profile of an optical amplifier for a target transmission loss profile (a GFF desired transmission loss profile) and making a design value of the GFF closer to the above mentioned GFF desired transmission loss profile in a transmission wavelength band (for example 1530 nm to 1565 nm.)

There is a requirement for the optical amplifier to output with transmitting a pumping light (a pump light) for optical amplification through the GFF and with cutting off the pumping light.

However a wavelength band of a pump light for optical amplification (for example around 1450 nm in case of a wavelength band of pump light for an EDFA) is different from the above mentioned normal transmission wavelength band for optical amplification (from 1530 nm to 1565 nm.) Therefore a GFF with a transmission loss profile designed simply with using the GFF desired transmission loss profile as a target profile (a solid line of FIG. 46) a design without a pump pas)) dose not have a profile to transmit or cut off the pump light.

For example, as shown in FIG. 48, an enough transmission profile (for example more than minus 1 dB) cannot be obtained in a wavelength band of a pump light for optical amplification (around 1450 nm.)

Therefore a desired transmission and cutting off profile for a pump light cannot be obtained for a multi-layer film filter (GFF) which has a function to equalize a gain.

SUMMARY OF THE INVENTION

An embodiment of a multi-layer optical thin film filter of the present invention is a multi-layer optical thin film filter comprising plural deposited optical thin films so as to obtain a desired wavelength profile in a target wavelength band, wherein optical thin film thickness for each of said optical thin films is not less than (2n+1)/4 times ("n" is a natural number excluding zero.) of center wavelength which ranges from 1/2 times to 3/2 times of the wavelength in said target wavelength band.

Another embodiment of the multi-layer optical thin film filter of the present invention is a multi-layer optical thin film filter comprising plural deposited optical thin films so as to obtain a desired wavelength profile in a target wavelength band, wherein optical thin film thickness for each of said optical thin films is designed using basic optical thin film thickness which is (2n+1)/4 times ("n" is a natural number excluding zero.) of center wavelength which ranges from 1/2 times to 3/2 times of the wavelength in said target wavelength band.

Another embodiment of the multi-layer optical thin film filter of the present invention is the multi-layer optical thin film filter, wherein said optical thin film thickness for each of said optical thin films is designed with using said basic thin film thickness for an initial value by fitting a theoretical value which expresses said wavelength profile in said target wavelength band with using optical thin film thickness or light of at least one layer of said optical thin films as parameter to a predetermined target wavelength profile in said target wavelength band.

An embodiment of a designing method for a multi-layer optical thin film filter of the present invention is a designing method for a multi-layer optical thin film filter comprising plural deposited optical thin films so as to obtain a desired wavelength profile in a target wavelength band, comprising a step that optical thin film thickness for each of said optical thin films is designed using basic optical thin film thickness which is (2n+1)/4 times ("n" is a natural number excluding zero.) of center wavelength which ranges from 1/2 times to 3/2 times of the wavelength in said target wavelength band.

Another embodiment of the designing method for a multi-layer optical thin film filter of the present invention is the design method of the multi-layer optical thin film filter, comprising a step to optimize the optical thin film thickness of at least one layer of said plural thin films so as to obtain said desired wavelength profile.

Another embodiment of the multi-layer optical thin film filter of the present invention is a multi-layer optical thin film filter comprising plural deposited optical thin films, wherein optical thin film thickness for each of said optical thin films has a desired wavelength profile in a predetermined wavelength band for gain equalization and a desired wavelength profile in a pumping light wavelength band other than said wavelength band for gain equalization.

Another embodiment of the multi-layer optical thin film filter of the present invention is the multi-layer optical thin film filter, wherein the optical thin film thickness for each of said optical thin films is designed by fitting using desired optical thin film thickness for an initial value so as to lessen a first error between a theoretical value which expresses a wavelength profile in said wavelength band for gain equalization with using the optical thin film thickness for each of said optical thin films as parameter and a target wavelength profile value in the corresponding wavelength band for gain equalization, and a second error between a theoretical value which expresses a wavelength profile in said pumping light wavelength band with using the optical thin film thickness for each of said optical thin films as parameter and a target wavelength profile in the corresponding pumping light wavelength band.

Another embodiment of the multi-layer optical thin film filter of the present invention is the multi-layer optical thin film filter, wherein an initial value of the optical thin film thickness for each of said optical thin films during said fitting is designed so that a cutting off wavelength band in said wavelength profile does not overlap said pumping light wavelength band.

Another embodiment of the multi-layer optical thin film filter of the present invention is the multi-layer optical thin film filter, wherein an initial value of optical thickness for each of said optical thin films during said fitting is designed so that an edge of a short wavelength side of said cutting off wavelength band in the wavelength profile overlaps said wavelength band for gain equalization.

Another embodiment of the multi-layer optical thin film filter of the present invention is a multi-layer optical thin film filter, wherein optical thin film thickness for each of said optical thin films is designed by fitting with using desired optical thin film thickness for an initial value so as to lessen a first error between a theoretical value which expresses a wavelength profile in a desired wavelength band other than predetermined pumping light wavelength band with using optical thin film thickness for each of optical thin films and target wavelength values in a desired wavelength band, and a second error between a theoretical value which expresses a wavelength profile in said pumping light wavelength band with parameterizing optical thin film thickness for each of said optical thin films and a wavelength profile value in the corresponding pumping light wavelength band in the case that a transmission rate corresponding to a target wavelength profile in said pumping light wavelength band is smaller than a minimum transmission rate required in said pumping light wavelength band.

Another embodiment of the multi-layer optical thin film filter of the present invention is the multi-layer optical thin film filter, wherein said second error between said theoretical value which expresses the wavelength profile in said pumping light wavelength band with the optical thin film thickness for each of said optical thin films as parameter and said wavelength profile value in the corresponding pumping light wavelength band becomes zero in the case that the transmission rate corresponding to the target wavelength profile in said pumping light wavelength band is larger than the minimum transmission rate required in said pumping light wavelength band.

Another embodiment of the multi-layer optical thin film filter of the present invention is a multi-layer optical thin film filter comprising plural deposited optical thin films, wherein optical thin film thickness for each of said optical thin films is designed by fitting with using desired optical thin film thickness for an initial value so as to lessen a first error between a theoretical value which expresses a wavelength profile in a desired wavelength band other than a predetermined pumping light wavelength band with using optical thin film thickness for each of optical thin films and a target wavelength value in a desired wavelength band, and a second error between a theoretical value which expresses a wavelength profile in said pumping light wavelength band with optical thin film thickness for each of said optical thin films as parameter and a wavelength profile value in the corresponding pumping light wavelength band in the case that a transmission rate corresponding to a target wavelength profile in said pumping light wavelength band is larger than an allowable maximum transmission rate required in said pumping light wavelength band.

Another embodiment of the multi-layer optical thin film filter of the present invention is the multi-layer optical thin film filter, wherein said second error between said theoretical value which expresses the wavelength profile in said pumping light wavelength band with the optical thin film thickness for each of said optical thin films as parameter and said wavelength profile value in the corresponding pumping light wavelength band becomes zero in the case that the transmission rate corresponding to a target wavelength profile in said pumping light wavelength band is smaller than an allowable maximum transmission rate required in said pumping light wavelength band.

An embodiment of a designing method for a multi-layer optical thin film filter of the present invention is a designing method for a multi-layer optical thin film filter comprising plural deposited optical thin films to design thin film thickness for each of said optical thin films, comprising a step to calculate a first error between a theoretical value which expresses a wavelength profile in a desired wavelength band other than a predetermined pumping light wavelength band with using optical thin film thickness for each of optical thin films and a target wavelength value in a desired wavelength band, and a step to calculate a second error between a theoretical value which expresses a wavelength profile in said pumping light wavelength band with using optical thin film thickness for each of said optical thin films as parameter and a wavelength profile value in the corresponding pumping light wavelength band, and a step to design optical thin film thickness for each of said optical thin films so as to lessen the calculated first and second errors respectively.

Another embodiment of the designing method for a multi-layer optical thin film filter of the present invention is a designing method for a multi-layer optical thin film filter comprising plural deposited optical thin films to design thin film thickness for each of said optical thin films, comprising a step to calculate a first error between a theoretical value which expresses a wavelength profile in a desired wavelength band other than a predetermined pumping light wavelength band with using optical thin film thickness for each of said optical thin films and a target wavelength value in a desired wavelength band, and a step to calculate a second error between a theoretical value which expresses a wavelength profile in said pumping light wavelength band with optical thin film thickness for each of said optical thin films as parameter and a wavelength profile value in the corresponding pumping light wavelength band in the case that a transmission rate corresponding to a target wavelength profile in said pumping light wavelength band is smaller than a minimum transmission rate required in said pumping light wavelength band, and a step to design optical thin film thickness for each of said optical thin films by fitting with using desired optical thin film thickness for an initial value so as to lessen the calculated first and second errors respectively.

Another embodiment of the designing method for a multi-layer optical thin film filter of the present invention is the designing method for a multi-layer optical thin film filter comprising a step that the second error between the theoretical value which expresses the wavelength profile in said pumping light wavelength band with optical thin film thickness for each of said optical thin films as parameter and the wavelength profile value in the corresponding pumping light wavelength band becomes zero in the case that the transmission rate corresponding to the target wavelength profile in said pumping light wavelength band is larger than the minimum transmission rate required in said pumping light wavelength band.

Another embodiment of the designing method for a multi-layer optical thin film filter of the present invention is a designing method for a multi-layer optical thin film filter comprising plural deposited optical thin films to design optical thin film thickness for each of said optical thin films, comprising a step to calculate a first error between a theoretical value which expresses a wavelength profile in a desired wavelength band other than a predetermined pumping light wavelength band with using optical thin film thickness for each of said optical thin films and a target wavelength value in a desired wavelength band, and a step to calculate a second error between a theoretical value which expresses a wavelength profile in said pumping light wavelength band with using optical thin film thickness for each of said optical thin films as parameter and a wavelength profile value in the corresponding pumping light wavelength band in the case that a transmission rate corresponding to a target wavelength profile in said pumping light wavelength band is larger than an allowable maximum transmission rate in said pumping light wavelength band, and a step to design optical thin film thickness for each of said optical thin films by fitting with using desired optical thin film thickness for an initial value so as to lessen the calculated first and second errors respectively.

Another embodiment of the designing method for a multi-layer optical thin film filter of the present invention is the designing method for a multi-layer optical thin film filter comprising a step to the second error between the theoretical value which expresses the wavelength profile in said pumping light wavelength band with using optical thin film thickness for each of said optical thin films as parameter and the wavelength profile value in the corresponding pumping light wavelength band becomes zero in the case that the transmission rate corresponding to the target wavelength profile in said pumping light wavelength band is smaller than the allowable maximum transmission rate in said pumping light wavelength band.

An embodiment of a thin film thickness designing apparatus for a multi-layer optical thin film filter of the present invention is a thin film thickness designing apparatus for a multi-layer optical thin film filter comprising plural deposited optical thin films, comprising a means to calculate a first error between a theoretical value which expresses a wavelength profile in a desired wavelength band other than a predetermined pumping light wavelength band using optical thin film thickness for each of said optical thin films and a target wavelength value in a desired wavelength band, and a means to calculate a second error between a theoretical value which expresses a wavelength profile in said pumping light wavelength band with using optical thin film thickness for each of said optical thin films and a target wavelength profile value in the corresponding pumping light wavelength, and a means to design optical thin film thickness for each of said optical thin films by fitting with using desired optical thin film thickness for an initial value so as to lessen the calculated first and second errors respectively.

Another embodiment of the thin film thickness designing apparatus for a multi-layer optical thin film filter of the present invention is a thin film thickness designing apparatus for a multi-layer optical thin film filter comprising plural deposited optical thin films, comprising a means to calculate a first error between a theoretical value which expresses a wavelength profile in desired wavelength band other than a predetermined pumping light wavelength band with using optical thin film thickness for each of said optical thin films and a target wavelength value in a desired wavelength band, and a means to calculate a second error between a theoretical value which expresses a wavelength profile in said pumping light wavelength band with using optical thin film thickness for each of said optical thin films as parameter and a wavelength profile value in the corresponding pumping light wavelength in the case that a transmission rate corresponding to a target wavelength profile in said pumping light wavelength band is smaller than an allowable maximum transmission rate in said pumping light wavelength band, and a means to design optical thin film thickness for each of said optical thin films by fitting with using desired optical thin film thickness for an initial value so as to lessen the calculated first and second errors respectively.

Another embodiment of the thin film thickness designing apparatus for a multi-layer optical thin film filter of the present invention is the thin film thickness designing apparatus for a multi-layer optical thin film filter as claimed in claim 20, comprising a means that the second error between the theoretical value which expresses the wavelength profile in said pumping light wavelength band with using the optical thin film thickness of each of said optical thin films as parameter and the wavelength profile value in the corresponding pumping light wavelength becomes zero in the case that the transmission rate corresponding to the target wavelength profile in said pumping light wavelength band is smaller than the allowable maximum transmission rate in said pumping light wavelength band.

Another embodiment of the thin film thickness designing apparatus for a multi-layer optical thin film filter of the present invention a thin film thickness designing apparatus for a multi-layer optical thin film filter comprising plural deposited optical thin films, comprising a means to calculate a first error between a theoretical value which expresses a wavelength profile in a desired wavelength band other than a predetermined pumping light wavelength band with using optical thin film thickness for each of said optical thin films and a target wavelength value in a desired wavelength band, and a means to calculate a second error between a theoretical value which expresses a wavelength profile in said pumping light wavelength band with using optical thin film thickness for each of said optical thin films as parameter and a wavelength profile value in the corresponding pumping light wavelength band in the case that transmission rate to correspond to target wavelength profile in said pumping light wavelength band is larger than an allowable maximum transmission rate in said pumping light wavelength band, and a means to design optical thin film thickness for each of said optical thin films by fitting with using desired optical thin film thickness for an initial value so as to lessen the calculated first and second errors respectively.

Another embodiment of the thin film thickness designing apparatus for a multi-layer optical thin film filter of the present invention is the thin film thickness designing apparatus for a multi-layer optical thin film filter as claimed in claim 22, comprising a means that the second error between the theoretical value which expresses the wavelength profile in said pumping light wavelength band with using the optical thin film thickness for each of said optical thin films as parameter and the target wavelength profile value in the corresponding pumping light wavelength becomes zero in the case that the transmission rate corresponding to the target wavelength profile in said pumping light wavelength band is smaller than the allowable maximum transmission rate in said pumping light wavelength band.

An embodiment of a computer program of the present invention is a computer program performed by a computer for a multi-layer optical thin film filter comprising plural deposited optical thin films to design thin film thickness for each of said optical thin films, comprising a means to calculate a first error between a theoretical value which expresses a wavelength profile in a desired wavelength band other than a predetermined pumping light wavelength band with using optical thin film thickness for each of said optical thin films and a target wavelength value in a desired wavelength band, and a means to calculate a second error between a theoretical value which expresses a wavelength profile in said pumping light wavelength band with using optical thin film thickness for each of said optical thin films as parameter and a target wavelength profile value in the corresponding pumping light wavelength, and a means to design optical thin film thickness for each of said optical thin films so as to lessen the calculated first and second errors respectively.

Another embodiment of the computer program of the present invention is a computer program performed by a computer for a multi-layer optical thin film filter comprising plural deposited optical thin films to design thin film thickness for each of said optical thin films, comprising a means to calculate a first error between a theoretical value which expresses a wavelength profile in a desired wavelength band other than a predetermined pumping light wavelength band with using optical thin film thickness for each of said optical thin films and a target wavelength value in a desired wavelength band, and a means to calculate a second error between a theoretical value which expresses a wavelength profile in said pumping light wavelength band with using optical thin film thickness for each of said optical thin films as parameter and a target wavelength profile value in the corresponding pumping light wavelength, and a means to design optical thin film thickness for each of said optical thin films so as to lessen the calculated first and second errors respectively.

Another embodiment of the computer program of the present invention is the computer program performed by a computer for a multi-layer optical thin film filter, comprising a means that the second error between the theoretical value which expresses the wavelength profile in said pumping light wavelength band with using optical thin film thickness for each of said optical thin films as parameter and the target wavelength profile value in the corresponding pumping light wavelength becomes zero in the case that the transmission rate corresponding to the target wavelength profile in said pumping light wavelength band is larger than the minimum transmission rate required in said pumping light wavelength band.

Another embodiment of the computer program of the present invention is a computer program performed by a computer for a multi-layer optical thin film filter comprising plural deposited optical thin films to design thin film thickness of each of said optical thin films, comprising a means to calculate a first error between a theoretical value which expresses a wavelength profile in a desired wavelength band other than a predetermined pumping light wavelength band with using optical thin film thickness for each of said optical thin films and a target wavelength value in a desired wavelength band, and a means to calculate a second error between a theoretical value which expresses a wavelength profile in said pumping light wavelength band with using optical thin film thickness for each of said optical thin films as parameter and a target wavelength profile value in the corresponding pumping light wavelength in the case that a transmission rate corresponding to the target wavelength profile in said pumping light wavelength band is larger than an allowable maximum transmission rate in said pumping light wavelength band, and a means to design optical thin film thickness for each of said optical thin films by fitting with using desired optical thin film thickness for an initial value so as to lessen the calculated first and second errors respectively.

Another embodiment of the computer program of the present invention is the computer program performed by a computer for a multi-layer optical thin film filter, comprising a means that the second error between the theoretical value which expresses the wavelength profile in said pumping light wavelength band with using optical thin film thickness for each of said optical thin films and the target wavelength profile value in the corresponding pumping light wavelength becomes zero in the case that the transmission rate corresponding to the target wavelength profile in said pumping light wavelength band is smaller than the maximum allowable transmission rate in said pumping light wavelength band.

An embodiment of an optical amplifier of the present invention is an optical amplifier comprising an rare earth element doped optical fiber to amplify an optical signal, an pumping light source which projects pumping light to excite said rare earth element, a combiner which combines pumping light projected by said pumping light source with said optical signal and projects said pumping light to said rare earth element doped optical fiber, and the multi-layer thin film filter as claimed in claim 6 which is located in an output side for pumping light of said combiner and a down stream side for said optical signal.

An embodiment of a wavelength division multiplex system of the present invention is a wavelength division multiplex system which transmits plural optical signals with different wavelength, comprising an optical sender to send said plural optical signals to an optical transmission route, the optical amplifier as claimed in claim 29 which amplifies said plural optical signals sent by said sender and transmitted though said optical transmission route in a lump, and an optical receiver which receives said plural optical signals amplified by said optical amplifier and transmitted through said optical transmission route.

An embodiment of a wavelength determining method for thin film thickness of monitoring light is a wavelength determining method for thin film thickness of monitoring light so as to determine wavelength of said monitoring light which is projected to an optical thin film under deposition and transmitted through or reflecting from said optical thin film, comprising a step, related to a optical intensity change of said monitoring light, to calculate a first stopping index value to stop deposition of said optical thin film whose thin film thickness reaches desired thin film thickness in each nominal wavelength of said plural monitoring light, and a step to determine the nominal wavelength of said monitoring light in said plural monitoring light based on the first stopping index value of each calculated nominal wavelength.

An embodiment of a wavelength determining apparatus for thin film thickness of monitoring light is a wavelength determining apparatus for thin film thickness of monitoring light so as to determine wavelength of said monitoring light which is projected to an optical thin film under deposition and transmitted through or reflecting from said optical thin film, comprising a means, related to a optical intensity change of said monitoring light, to calculate a first stopping index value to stop deposition of said optical thin films whose thin film thickness reaches desired thin film thickness in each nominal wavelength of said plural monitoring light, and a meaning to determine the nominal wavelength of said monitoring light in said plural monitoring light based on the first stopping index value of each calculated nominal wavelength.

Another embodiment of the wavelength determining apparatus for thin film thickness of monitoring light is the wavelength determining apparatus for thin film thickness of the monitoring light, wherein the first stopping index value related to the optical intensity change of said monitoring light is a parameter for a function of a deposition time which expresses the optical intensity change.

Another embodiment of the wavelength determining apparatus for thin film thickness of monitoring light is the wavelength determining apparatus for thin film thickness of the monitoring light, wherein the first stopping index value related to the optical intensity change of said monitoring light is a B/A value which expresses a ratio between a changing range (A) of the optical intensity of transmitted or reflecting light of said optical thin film and a changing value (B) from extremal value of the optical intensity of transmitted or reflecting light when said optical thin film thickness reaches desired thickness.

Another embodiment of the wavelength determining apparatus for thin film thickness of monitoring light is the wavelength determining apparatus for a thin film thickness of the monitoring light, related to the optical intensity change of said monitoring light, comprising a means to calculate a second stop index value so as to stop deposition when said thin film thickness reaches the desired thickness in plural change nominal wavelengths where a desired wavelength change is added to each of the nominal wavelengths of said monitoring light, a means to calculate a changing value between the first stop index value and the second stop index value in each of plural calculated nominal wavelengths, and a means to determine the nominal wavelength of said monitoring light based on the calculated changing value in said plural nominal wavelengths.

Another embodiment of the wavelength determining apparatus for thin film thickness of monitoring light is the wavelength determining apparatus for a thin film thickness of the monitoring light, wherein said means to calculate the first and second stop index values is a means to calculate the first and second stop index values respectively in each of said optical thin film layers and said nominal wavelength in the case that said optical thin film is deposited on a deposition substrate in plural layers, said means is a means to calculate the changing value between the first and the second stop index values in each of the calculated optical thin films and each of said plural nominal wavelengths, and said means is a means to determine the nominal wavelength of said monitoring light based on the calculated changing value in said nominal wavelength.

Another embodiment of the wavelength determining apparatus for thin film thickness of monitoring light is the wavelength determining apparatus for a thin film thickness of the monitoring light, wherein said means is a means to calculate the first and second stop index values respectively in each of said optical thin film layers and said nominal wavelength in the case that said optical thin film is deposited on said deposition substrate in plural layers, said means is a means to calculate the changing value between the first and the second stop index values in each of the calculated optical thin films and each of the plural nominal wavelengths, and said means to is a means to determine the nominal wavelength of said monitoring light based on total sum of the changing values between the calculated first and second stop index values in the total optical thin film layers from said plural nominal wavelengths.

An embodiment of a program of the present invention is a program to determine a wavelength of a monitoring light which is projected to an optical thin film deposited on a deposition substrate and transmitted through or reflecting from said optical thin film, related to a optical intensity change of said monitoring light, comprising a means to calculate a first stop index value so as to stop deposition when said optical thin film thickness reaches a desired thin film thickness in each of said plural nominal wavelengths of said monitoring light, a means to determine the plural nominal wavelengths of said monitoring light based on the first stop index value in each of the calculated nominal wavelengths in said plural nominal wavelength.

Another embodiment of the program of the present invention is the program, related to the optical intensity change of said monitoring light, comprising a means to calculate a second stop index value so as to stop deposition when said thin film thickness reaches the desired thickness in plural change nominal wavelengths where a desired wavelength change is added to each of the nominal wavelengths of said monitoring light, a means to calculate the changing value between the first stop index value and the second stop index value in each of plural calculated nominal wavelengths, and means to determine the nominal wavelength of said monitoring light based on the calculated changing value in said plural nominal wavelengths.

An embodiment of a deposition system is a deposition system to set an optical thin film thickness of an optical thin film deposited on a deposition substrate with a deposition material evaporated from a deposition material source using a monitoring light with a wavelength determined by the wavelength determining apparatus for the optical thin film thickness monitoring light as claimed in claims 32 to 37 as a design value, related to the optical intensity change of said monitoring light, comprising a memorizing means to memorize a stop index value so as to stop deposition of said optical thin film corresponding to said design value, a receiving means to receive said monitoring light with a wavelength determined by said optical thin film thickness monitoring light from the light which is projected to said wavelength determining apparatus for the optical thin film monitoring light and transmitted through or reflecting from said optical thin film, a means to judge if the optical thin film thickness corresponding to said optical intensity change reaches said stop index value based on the optical intensity change of the received monitoring light and said stop index value memorized by said memorizing means and to prevent the deposition material evaporated by said deposition material source from deposited on said deposition substrate if it is judged that the optical thin film thickness reaches said stop index value.

An embodiment of a deposition control method of the present invention is a deposition control method to control optical thin film thickness of each optical thin film so as to correspond to a predetermined design thin film thickness of each optical thin film thickness with using a monitoring light which is transmitted through or reflecting from said optical thin film when multi-layer thin films comprising plural optical thin films deposited on a deposition substrate with a deposition material evaporated by a deposition material source, comprising a memorizing step to memorize data to express an optical transmission profile and/or a reflecting loss profile in a desired wavelength band of multi-layer optical thin films actually deposited by a deposition apparatus, a estimating step to estimate an optical thin film thickness error which usually occurs in an optical thin film deposited by said deposition apparatus based on the wavelength profile of said multi-layer thin films memorized by said memorizing step, a control step to perform said optical thin film thickness control based on the design optical thin film thickness for each of said optical thin films and the estimated optical thin film thickness error.

An embodiment of a deposition control system of the present invention is a deposition control system used for a deposition apparatus to deposit multi-layer thin films consisting of plural optical thin films on a deposition substrate with a deposition material evaporated by a deposition material source to control optical thin film thickness of each optical thin film so as to correspond to pre-designed thin film thickness of each optical thin film with using a monitoring light which is transmitted through or reflecting from each of said optical thin films, comprising a control means to perform deposition control based on a thin film thickness error which usually occurs in the optical thin films deposited by said deposition apparatus.

Another embodiment of the deposition control system of the present invention is the deposition control system, wherein the thin film thickness error which usually occurs in the optical thin films deposited by said deposition apparatus is a thin film thickness error estimated based on the data of an optical transmission profile or a reflection loss profile in a desired wavelength band of multi-layer thin films where deposition has been completed.

Another embodiment of the deposition control system of the present invention is the deposition control system, wherein the thin film thickness error which usually occurs in the optical thin films deposited by said deposition apparatus is estimated as an error from said pre-designed thin film thickness.

Another embodiment of the deposition control system of the present invention is the deposition control system, wherein the thin film thickness error which usually occurs in the optical thin films deposited by said deposition apparatus is estimated with converting the thin film thickness error into a delay time during the deposition.

Another embodiment of the deposition control system of the present invention is a deposition control system used for a deposition apparatus to deposit multi-layer thin films consisting of plural optical thin films on a deposition substrate with a deposition material evaporated by a deposition material source to control optical thin film thickness of each optical thin film so as to correspond to a pre-designed thin film thickness of each optical thin film with using a monitoring light which is transmitted through or reflecting from each of said optical thin films, comprising a memorizing means to memorize data to express an optical transmission profile in a desired wavelength band of multi-layer thin films actually deposited by a deposition apparatus, an thin film thickness error estimation means to estimate a thin film thickness error which usually occurs in said optical thin films deposited by said deposition apparatus based on optical transmission loss profile data of said multi-layer thin films memorized by said memorizing means, and a control means to perform optical thin film thickness control based on the design thin film thickness and the estimated thin film thickness error.

Another embodiment of the deposition control system of the present invention is the deposition control system, wherein said thin film thickness error estimation means comprises an estimation means to estimate said thin film thickness error as an error from said design thin film thickness, and an adjustment means to adjust said design thin film thickness so as to cancel the estimated error.

Another embodiment of the deposition control system of the present invention is the deposition control system, wherein said estimation means for the thin film thickness error is a means to estimate said thin film thickness error with converting said thin film thickness error into a delay time during the deposition.

Another embodiment of the deposition control system of the present invention is the deposition control system, wherein said estimation means for the thin film thickness error comprises a means to set plural delay times, a memorizing means to memorize functional data to express a optical intensity change of a monitoring light obtained from said design thin film thickness, a calculation means to calculate a optical intensity change of a monitoring light from each thin film layer under deposition during the simulation, a means to calculate a parameter of the functional data of each thin film layer by fitting of said functional data with using the calculated optical intensity change, a calculation means to calculate a thin film thickness of each layer of an optical thin film under deposition for the deposition control based on functional data including the calculated parameter, a means to calculate a thin film thickness of each layer of optical thin films in each delay time when a deposition time is changed from calculated thin film thickness of each layer by each delay time, a means to calculate an error in each of said delay time with comparing an optical transmission loss profile data of a multi-layer thin film actually deposited with the optical transmission loss profile data calculated in each of said delay time, and a means to calculate a optimized delay time with comparing errors in each of the calculated delay times.

Another embodiment of the deposition control system of the present invention is the deposition control system, wherein said thin film thickness control means comprises a means to monitor the luminous change of monitoring light from the optical thin film layer deposited on said deposited material, a means to calculate the parameter of the functional data corresponding to said optical thin film layer by fitting of said functional data with using the optical intensity change, a means to calculate the time when said optical thin film thickness becomes said design thin film thickness, a means to prevent said deposition material from deposited on said deposition substrate when the present time becomes the time that said delay time is deducted from the calculated time.

Another embodiment of the computer program of the present invention is a computer program used for a deposition apparatus to deposit multi-layer thin films consisting of plural optical thin films on a deposition substrate with a deposition material evaporated by a deposition material source to control an optical thin film thickness of each optical thin film so as to correspond to pre-designed thin film thickness of each optical thin film with using a monitoring light which is transmitted through or reflecting from each of said optical thin films, and to perform said deposition control based on the thin film thickness error pre-estimated by said deposition apparatus which usually occurs in the optical thin film deposited by said deposition apparatus.

Another embodiment of the computer program of the present invention is a computer program used for a deposition apparatus to deposit multi-layer thin films consisting of plural optical thin films with a deposition material evaporated by a deposition material source so as to control to meet a pre-designed optical thin film thickness for each of the optical thin films with using a monitoring light which is transmitted through or reflecting from said optical thin films, comprising a means, related to a optical intensity change of said monitoring light, to calculate a first stopping index value to stop deposition of said optical thin films where a thin film thickness reaches a desired thin film thickness in each nominal wavelength of said plural monitoring lights, and a meaning to determine the nominal wavelength of said monitoring light in said plural monitoring lights based on the first stopping index value of each calculated nominal wavelength.

BRIEF DESCRIPTION OF THE DRAWINGS

FIG. 15 is a table for showing a result of a thin film thickness design for each layer of a multi-layer thin film filter in the second embodiment;

FIG. 33 is a flow chart for illustrating an example of a thin film thickness design process in the fifth embodiment;

DETAILED DESCRIPTION OF THE INVENTION

One object of the present invention is to provide an apparatus, a method, and a program to determine a wavelength of a film thickness monitoring light.

Another object of the present invention is to provide a thin film deposition system to deposit thin films with monitoring optical thin film thickness with using a monitoring light with a wavelength which can lower the above mentioned thin film thickness error.

Another object of the present invention is to provide a multi-layer thin film filter and its designing method which can obtain a wavelength transmission loss profile with a sharp transmission loss change with less thin film layers than the conventional thin films and improve a maximum allowable error for an optical film thickness.

Another object of the present invention is a thin film deposition method and system that strongly reduces an influence of the usual error caused by various factors and improves a profile of deposited filters.

Another object of the present invention is to provide a multi-layer film filter that has both a function to equalize an amplification gain and a function to transmit and cut off a pump light, and also to provide a thin film deposition method and an apparatus for the multi-layer film filter.

The first to fifth embodiments of the present invention are hereinafter explained referring to the attached drawings. These first to fifth embodiments are described only for explanation and never limit the scope of the present invention. Therefore a person with ordinary skill in the art can adopt other embodiments including a part of or all elements described in the first to fifth embodiments, and these embodiments are included in the present invention.

Wording "a thin film thickness" means optical thin film thickness in the following explanation, and if "a thin film thickness" means a physical thin film thickness, wording "a physical film thickness" will be used.

The First Embodiment

Figure 1:
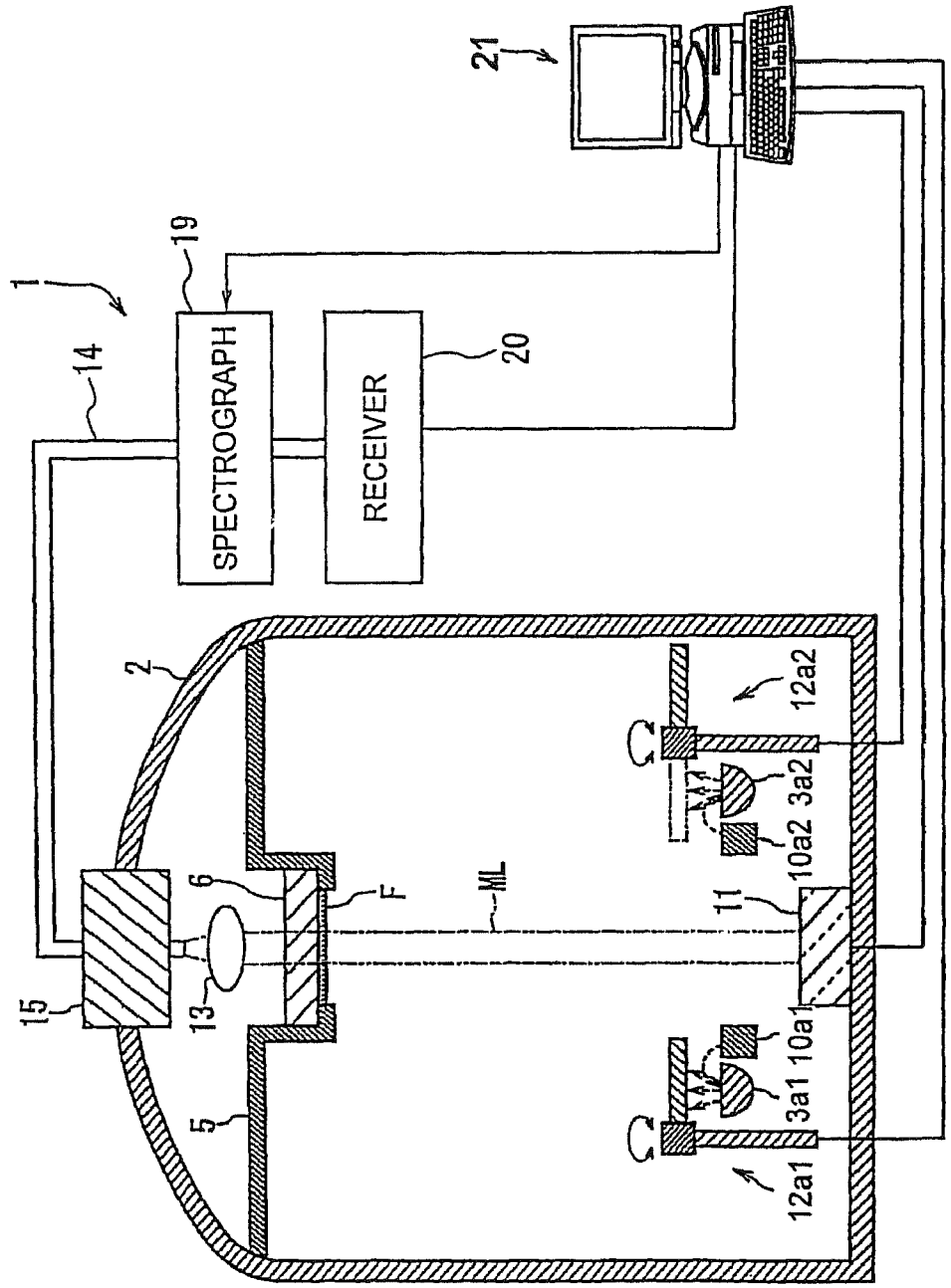
FIG. 1 is a schematic view (partially including a sectional view) for illustrating a configuration of a deposition system including a wavelength determining apparatus for a thin film monitoring light for the first embodiment.

The first embodiment of the present invention is hereinafter explained using the attached drawings. FIG. 1 is a schematic view (partially including a sectional view) for illustrating a configuration of a deposition system including a wavelength determining apparatus for a thin film monitoring light for the first embodiment of the present invention.

As shown in FIG. 1, a thin film deposition system 1 includes a vacuum chamber 2, two deposition material sources 3a1 and 3a2, for example, located in parallel on the bottom of the vacuum chamber 2, and a deposition substrate 6 located on the opposite side of the deposition material sources 3a1 and 3a2 (upper side) in the vacuum chamber 2 and held by a substrate holder 5.

Deposition materials are set on the deposition material sources 3a1 and 3a2 respectively, and the materials have different refraction indices.

The thin film deposition system 1 is installed in the vacuum chamber 2. The thin film deposition system 1 includes electron guns 10a1 and 10a2 which project electron beams to the deposition material sources 3a1 and 3a2 so as to heat the deposition materials in the deposition material sources 3a1 and 3a2, and a light source 11 which projects, for example, a white light which is a kind of a wide wavelength band light as a measuring light ML.

Further more, the thin film deposition system 1 comprises shutter devices 12a1, 12a2 which cover a top of the deposition material sources 3a1 and 3a2 according to a shutting signal sent by a control apparatus, which is described below, so as to stop the deposition process and open the top of the deposition material sources 3a1 and 3a2 according to an opening signal so as to start the deposition process, a collecting lens 13 to collect a transmitted monitoring light which is transmitted through the thin film F during deposition and a substrate 6, and a optical fiber bundle 14 which receives the transmitted light which is collected by the collecting lens 13 in each wavelength.

This optical fiber bundle 14 is extended out of the vacuum chamber 2 through an airtight shield box 15 installed on a top wall of the vacuum chamber 2 in air tight.

The thin film deposition system 1 includes a spectrograph 19 which selects only a transmitted light with a wavelength corresponding to wavelength determining signals to express a monitoring light wavelength sent by a control apparatus 21, which is described below, as a monitoring light, a receiver 20 which receives the monitoring light selected by the spectrograph 19 and projects optical intensity signals according to the received light, and the control apparatus 21 connected to the spectrograph 19, the shutter devices 12a1 and 12a1 to enable data transmission.

The control apparatus 21 has a function to receive optical intensity signals projected by the receiver 20, and to send shutter signals to the shutter devices 12a1 and 12a2 individually according to the received optical intensity signals so as to control a thin film thickness of the thin film F which is deposited on the substrate 6.

Figure 2:
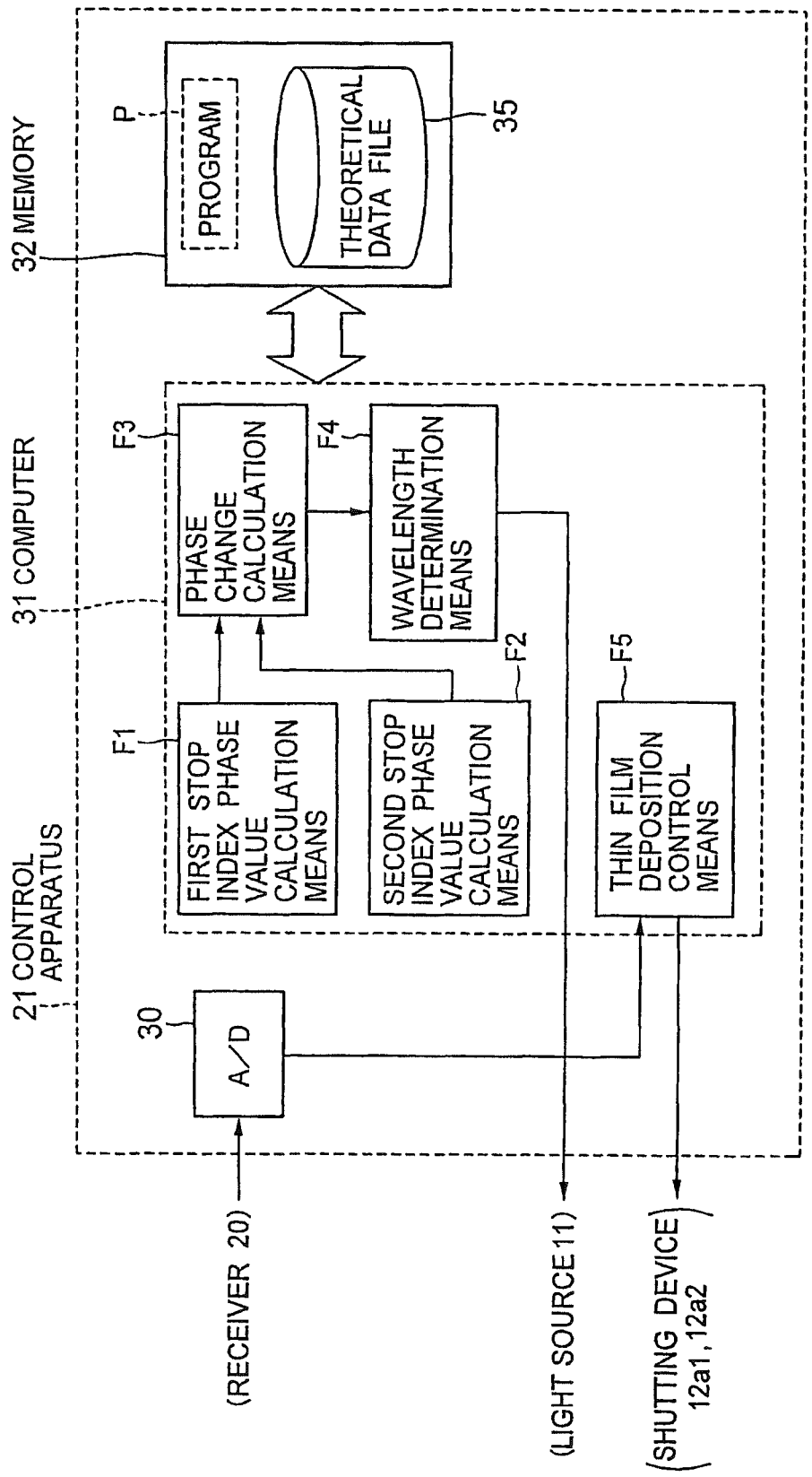
FIG. 2 is a block diagram for illustrating a configuration of a functional block achieved by a configuration of the control apparatus as shown in FIG. 1.
Figure 3:
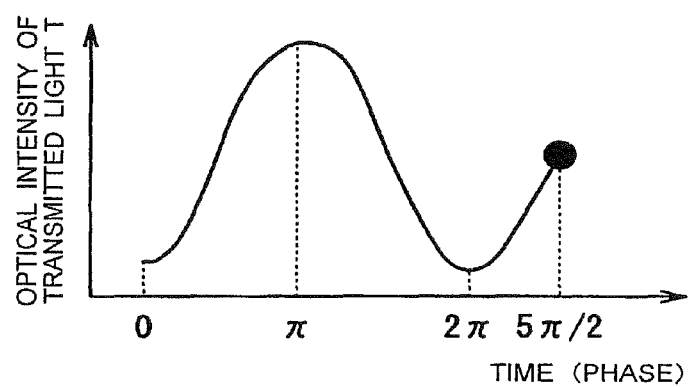
FIG. 3 is a graph for illustrating a optical intensity change of a transmitted light during deposition in the first embodiment.

FIG. 2 shows components of the control apparatus 21 and a configuration of a functional block achieved by a configuration of the control apparatus 21.

As shown in FIG. 2, the control apparatus 21 includes an A/D converter 30 to convert optical intensity signals projected by the receiver 20 into digital light volume signals (digital light volume data), a computer to process data corresponding to the means F1 to F5 as explained below according to the digital light volume data converted by the A/D converter 30, and a memory 32 as a memory medium to memorize a program P in advance to enable the computer 31 to perform the above mentioned means F1 to F5. A semiconductor memory, a magnetic memory and the like are available for the memory medium.

A memory 32 memorizes in advance a theoretical equation data file 35 including a theoretical equation data to show a transmission rate change during deposition as a periodical function of a deposition time.

The data memorized by the theoretical equation data file 35 is hereinafter explained.

At first, a multi-layer thin film theory is explained. The theoretical equations for transmission rates of multi-layer thin film filters with N layers to use an optical film thickness of each layer from "a1" to "aN" as a parameter are shown in the equation of energy transmission rates as shown in the equation (1) below and the equations (2) to (5) below, on the condition that an inlet light angle is vertical to the surface of the multi-layer film filter.

$$T = \tau\tau * \frac{n_s}{n_0} \quad (1)$$

$$\tau = \frac{2n_0}{(m_{11} + im_{12}n_s)n_{11} + (im_{21} + m_{22}n_s)} \quad (2)$$

$$M = \begin{pmatrix} m_{11} & im_{12} \\ im_{21} & m_{22} \end{pmatrix} = \prod_{j=1}^{N} M_j \quad (3)$$

$$M_j = \begin{pmatrix} \cos g_j & i\frac{\sin g_j}{n_j} \\ in_j \sin g_j & \cos g_j \end{pmatrix} \quad (4)$$

$$g_j = \frac{2\pi n_j d_j}{\lambda} \quad (5)$$

"τ" in the equation (1) is expressed in the equation (2). The parameters $m_{11}$, $m_{12}$ $m_{21}$ $m_{22}$ in the equation (2) are components of the functional determinant M of total N layers as expressed in the equation (3), which are figured out by multiplication of total of $M_j$ ("j" is an integral number from 1 to N.). The functional determinant $M_j$ of the number j layer is expressed in the equation (4). "$g_j$" in the equation (4) is expressed in the equation (5), and "$n_j$" is a complex refractive index, and "$d_j$" is a physical film thickness of the number j layer.

A wavelength to calculate a transmission rate is substituted for "λ" of the equation (5). "$n_0$" is a complex refractive index and "$n_s$" is a transmission rate of a filter substrate. "τ*" of the equation (1) is a conjugate complex number, and "i" of the equation (3) and (4) is an imaginary number.

A change of the transmission rate of the layer during deposition is calculated with using the equation from (1) to (5). Therefore, if total layers in which a deposition has completed are expressed in the above-mentioned profile matrix M, the change of the transmission rate of the layer during deposition can be expressed with using a function with parameterizing a physical film thickness. The physical film thickness can be converted into a time on the condition that the transmission rate of the layer during deposition is constant because the physical film thickness is in proportion to the deposition time.

Therefore a change of the transmission rate of the layer during deposition can be expressed with using a periodic function.

A change of a optical intensity of a transmitted light during deposition (under evaporation) "T" can be expressed with using a periodic function of the deposition time "x" of the equation (6) on the condition that a deposition rate of the thin film layer during deposition and a refractive index of the thin film are constant.

$$T = \frac{1}{A_0 + A_1 \cos(A_2 x + A_3)} \quad (6)$$

"$A_0$" and "$A_1$" in the equation (6) is a coefficient to express an amplitude and a waveform. "$A_2$" is a function of the deposition time "x" to express a rate of the deposition, and "$A_3$" expresses an initial phase. "$A_{2x}+A_3$" expresses a phase of the above-mentioned present time "x" during deposition.

The above-mentioned parameters $A_0$, $A_{01}$, $A_{02}$ and $A_{03}$ are calculated by nonlinear fitting with using all optical intensity changes $\{x_k, t_k (k=0, 1, \ldots m-1)\}$ measured before the present time "$x_m$" during deposition. "$x_k$" is a time of each sampling rate from a starting time (0) of a deposition for the corresponding thin film thickness.

Therefore the theoretical equation that a optical intensity change of the transmission light as shown in the equation (6) is expressed as a function of deposition time (phase) is stored in the theoretical equation data file 35.

Figure 7:
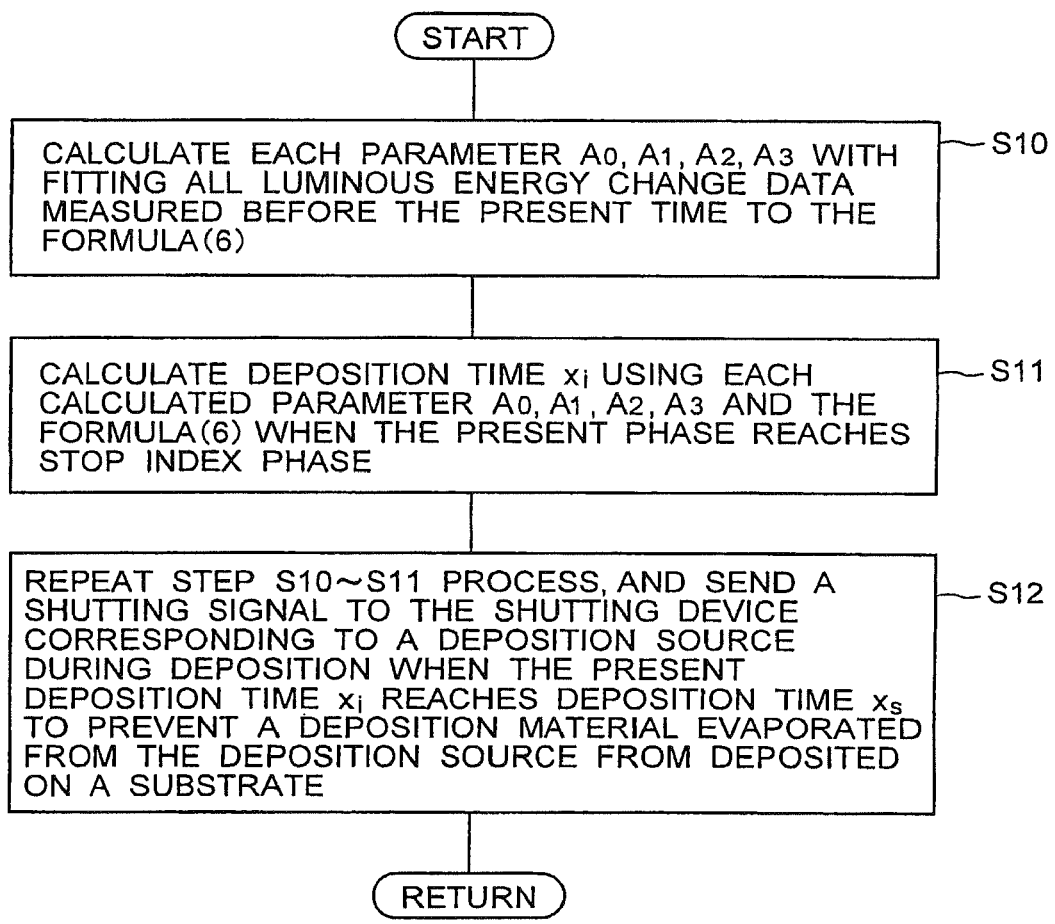
FIG. 7 is a flow chart for illustrating an example monitoring light wavelength determining process of the control apparatus as shown in FIG. 1.

The computer 31 includes a stop index phase calculation means F1, a second stop index phase calculation means F2, a phase change calculation means F3, a wavelength determining means F4, and a thin film deposition control means F5 as a function realized by a program P. Each means from F1 to F5 is explained later in detail with using FIG. 5 and the flow chart of FIG. 7.

Total movement of the first embodiment is explained. A monitoring light determining process and a thin film deposition process to produce a multi-layer GFF is mainly explained in the first embodiment.

Figure 4:
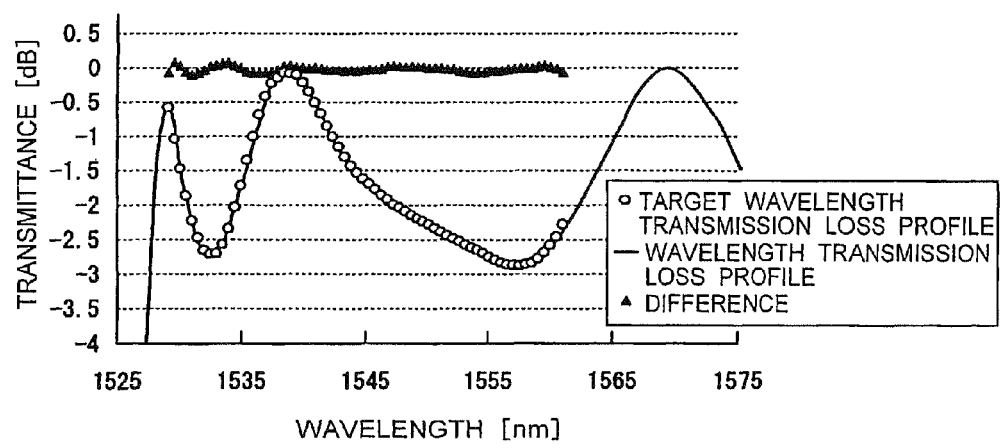
FIG. 4 is a graph for illustrating a target wavelength transmission loss profile of multi-layer thin films GFF (○), wavelength transmission loss profile after deposition (a solid line), and difference of the transmission loss between the above mentioned target wavelength transmission loss profile and the wavelength transmission loss profile after deposition (▲)

A target wavelength loss profile of the desired multi-layer film GFF (the wavelength range of 1530 nm to 1562 nm: Δ) and the wavelength loss profile after a deposition (the wavelength loss profile after a deposition in the above-mentioned wavelength range: a solid line) are shown in FIG. 4. The object of this multi-layer thin film GFF is that a difference between the above-mentioned wavelength loss profile and the wavelength loss after a deposition (▲) becomes within 0.2 dB (flatness: within 0.2 dB). Therefore when a number of layers of the multi-layer film GFF and a film thickness of each thin film to compose the multi-layer thin films are determined, this multi-layer film design data is stored in the memory 32 as multi-layer film setting data.

Figure 5:
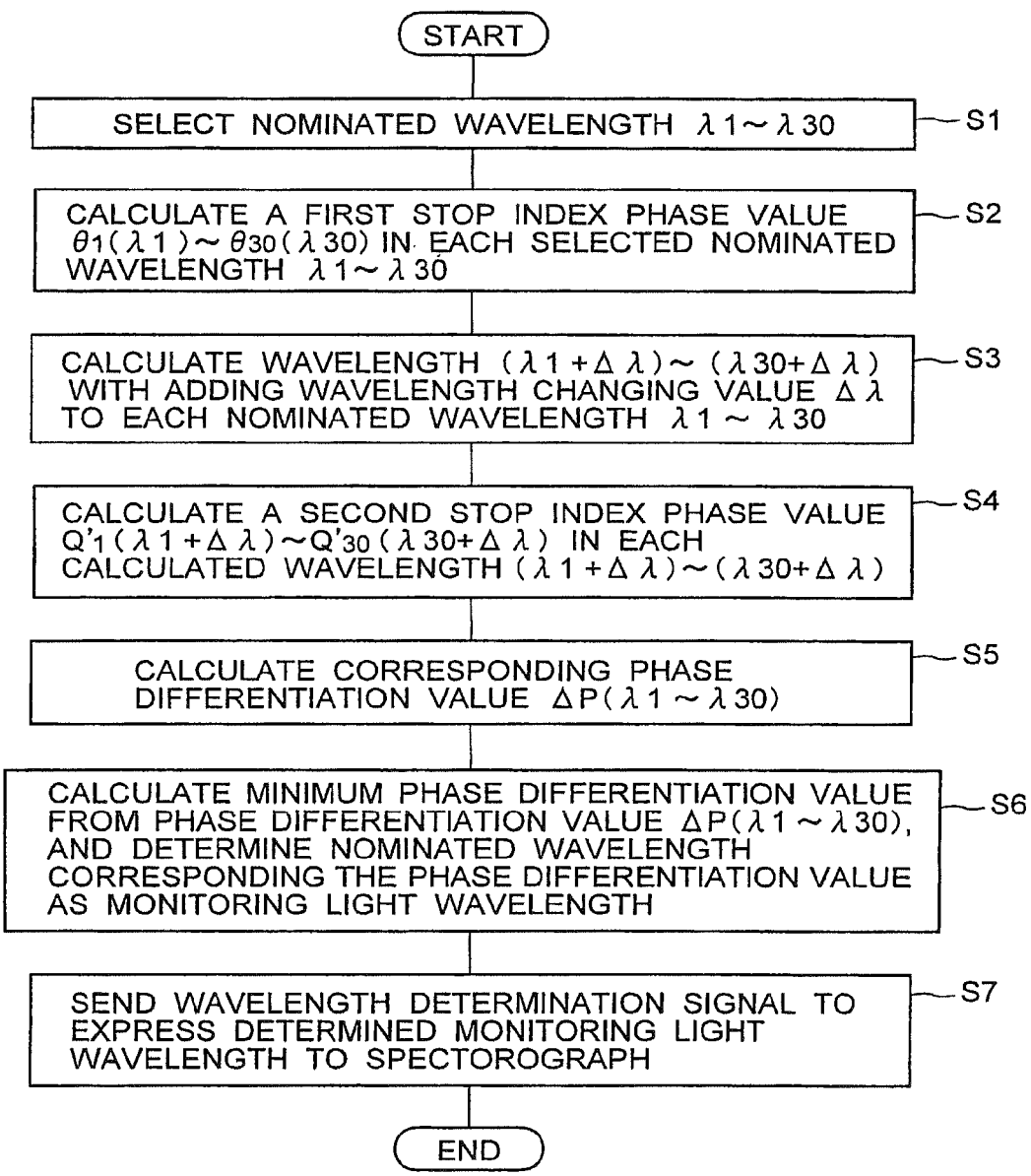
FIG. 5 is a flow chart for illustrating an example of a monitoring light wavelength determining process of the control apparatus as shown in FIG. 1.

The computer 31 performs according to the program P stored in the memory 32, and the monitoring light determining process is performed as shown in FIG. 5.

As shown in FIG. 5, the computer 31 selects, for example, 30 kinds of nominal wavelengths (λ1 (1530 nm) to λ30 (1559 nm) which change in every 1 nm in the desired wavelength (for example 1530 nm to 1560 nm) according to the above mentioned multi-layer thin film filter profile range. (Step S1)

The computer 31 calculates a optical intensity change (the first change of optical intensity light ΔT(λ1) to ΔT(λ30)) on the condition that a monitoring light which has 30 kinds of the nominal wavelengths is transmitted through each thin film layer which composes the above-mentioned multi-layer film, and the first stop index phase value $\theta_1(\lambda1)$ to $\theta_{30}(\lambda30)$ in each nominal wavelength to meet a thin film thickness of each film layer corresponding to a film thickness design value according to the above mentioned equation (6). (Step S2)

Therefore the first stop index phase value $\{\theta_1(\lambda1)$ to $\theta_{30}(\lambda30)\}$ is calculated in each nominal wavelength when $(Ax_3+Ax_4)$ which expresses the phase of the above mentioned equation (6) reaches the design film thickness. The process as shown in Step S1 and Step S2 corresponds to the stop index phase calculation means F1.

Following to the Step S3, the computer 31 calculates $\{(\lambda1+\Delta\lambda)$ to $(\lambda30+\Delta\lambda)\}$ with adding a desired wavelength change Δλ (for example 0.001 nm) to each nominal wavelength λ1 to λ30. (Step S3)

The computer 31 calculates the second stop index phase value $\theta_1'(\lambda1+\Delta\lambda)$ to $\theta_{30}'(\lambda30+\Delta\lambda)$ in each "nominal wavelength+wavelength change" to match a thin film thickness of each layer of thin films corresponding to a design film thickness, according to a optical intensity change of the monitoring light in each layer of thin films {the second change of a optical intensity ΔT(λ1+Δλ) to ΔT(λ30+Δλ)} and the theoretical equation data DA based on the above mentioned equation (6) on the condition that a monitoring light which has the calculated wavelength $\{(\lambda1+\Delta\lambda)$ to $(\lambda30+\Delta\lambda)\}$ is transmitted through each film layer of the thin films. (Step S4) Therefore, the second stop index phase value $\theta_1'(\lambda1+\Delta\lambda)$ to $\theta_{30}'(\lambda30+\Delta\lambda)$ is calculated in each "nominal wavelength+wavelength change" when $(Ax_3+Ax_4)$ which expresses the phase of the above equation (6) reaches the design film thickness.

Figure 6:
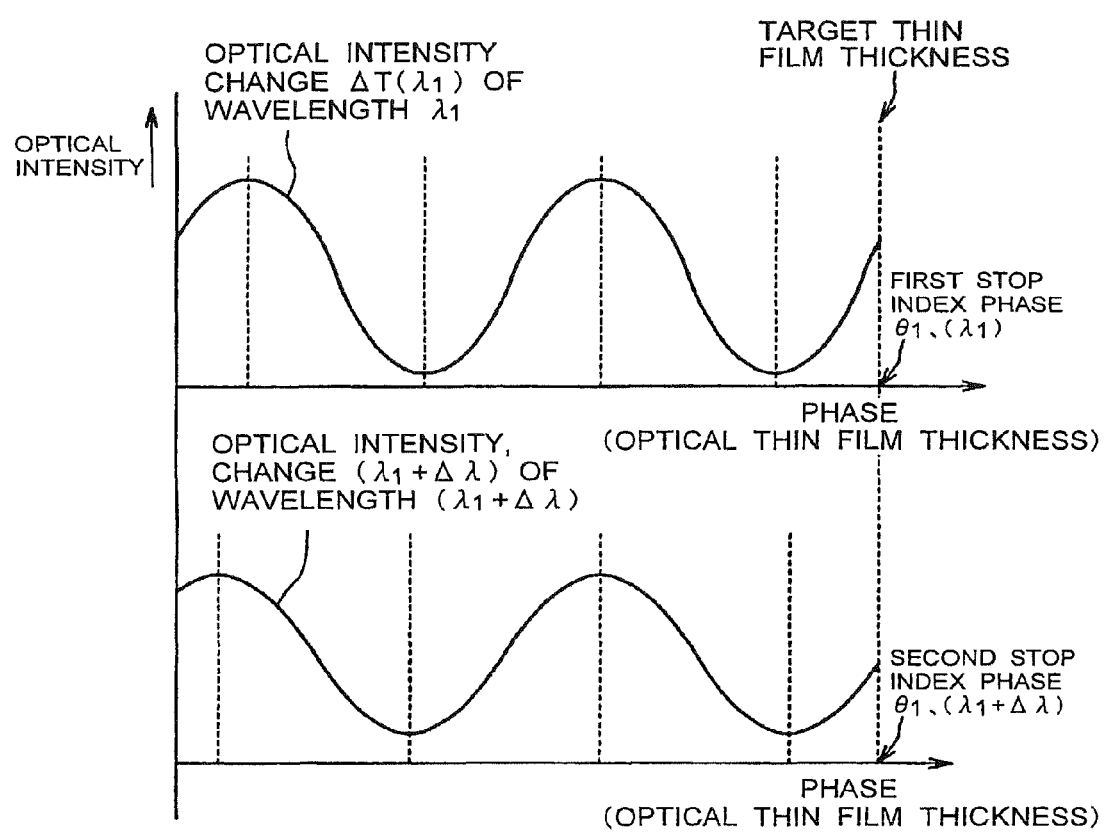
FIG. 6 is a graph for illustrating a optical intensity change $\Delta T(\lambda 1)$ of a transmitted light for a monitoring light (wavelength $\lambda 1$) and a optical intensity change $\Delta T(\lambda 1+\Delta \lambda)$ of a transmitted light for a monitoring light (wavelength: $\lambda 1+\Delta \lambda$)

FIG. 6 is a graph showing a optical intensity change of the transmission ΔT(λ1) for the monitoring light (wavelength λ1), the first stop index phase value $\theta_1(\lambda1)$ corresponding to the ΔT(λ1), a optical intensity change of a transmitted monitoring light ΔT(λ1+Δλ) including a wavelength (λ1+Δλ) to which a wavelength change Δλ is added, and the second stop index phase value $\theta_1'(\lambda1+\Delta\lambda)$.

After calculation of the first stop index phase value $\theta_1(\lambda1)$ to value $\theta_{30}(\lambda30)$ in the nominal wavelength λ1 to λ30 of each layer of thin films and the second stop index phase value $\theta_1'(\lambda1+\Delta\lambda)$ to $\theta_{30}'(\lambda30+\Delta\lambda)$, the computer 31 calculates the phase change value ΔP(λ1 to λ30) in each corresponding nominal wavelength according to the equation (7). (Step S5)

$$\Delta P_{(\lambda = \lambda 1 \sim \lambda 30)} = \frac{\theta_K'(\lambda_K + \Delta\lambda) - \theta_K'(\lambda_K)}{\Delta\lambda} \quad (7)$$

Notes: k = 1 ~ 30

Each phase change value ΔP(λ1) to ΔP(λ30) shows luminous a energy change of a stop index phase value when each corresponding wavelength λ1 to λ30 changes in a desired wavelength (Δλ), that is to say, a degree of effects on each stop index phase value when the wavelength of each monitoring light λ1 to 30 changes by the Δλ. Therefore it shows that effects of the wavelength change Δλ becomes smaller if absolute values of ΔP(λ1) to ΔP(λ30) are smaller.

The computer 31 selects, for example, the minimum phase change value ΔP(λ1) to ΔP(λ30) in each nominal wavelength calculated for each thin film layer, that is to say, the phase change value with minimum effects on a wavelength change Δλ in each thin film layer. The computer 31 determines a nominal wavelength (for example the wavelength $\lambda_{min}$) corresponding to the calculated phase change value as a wavelength of the monitoring light in each thin film layer. (Step S6) The process of Step S5 and Step S6 correspond to the wavelength determining means F4.

The computer 31 sends wavelength determining signals to show the corresponding monitoring light ($\lambda_{min}$) in each processed thin film layer at a deposition process of each thin film layer to the spectrograph 19, and completes the process. (Step S7)

As a result, the spectrograph 19 selects only corresponding monitoring light ($\lambda_{min}$) out of the transmitted light in a wide wavelength range and send it to the receiver 20 according to the wavelength determining signals sent by the computer 31.

Even though there is a relative wavelength change at each thin film deposition layer during deposition process for optical thin films, the determined monitoring light can minimize the effects of such wavelength change. Therefore difference of thin film thickness of each layer caused by the relative wavelength change can be minimized and cumulative errors of the total film thickness is controlled within a range which has a desired optical profile in the total multi-layer film.

The above mentioned Step S6 selects the phase change value ΔP(λ1) to ΔP(λ30) calculated in each nominal wavelength, that is to say, the nominal wavelength in each thin film layer corresponding to the phase change value with minimum effects on the wavelength change Δλ. However the present invention is not limited to this process.

For example, it is possible to select the nominal wavelength corresponding to the controllable value such as the minimum value etc. as a monitoring light according to the result of comparison of the first stop index phase value $\theta_1(\lambda 1)$ to $\theta_{30}(\lambda 30)$.

It is also possible to establish a desired threshold in the phase change values and select the nominal wavelength corresponding to the desired variation value under such as the threshold as a monitoring light. It is also possible to select the nominal wavelength corresponding to the phase change value that is the most advantageous for a deposition considering various elements during the deposition as a monitoring light.

It is also possible to determine the phase change values for total thin film layers using the phase change value ΔP(λ1) to ΔP(λ30) in each nominal wavelength calculated in each thin film layer. Therefore it is also possible to calculate $\Delta P_{TOTAL}$ (λ1) to $\Delta P_{TOTAL}$(λ30) which shows a total of ΔP in each thin film layer and selects the nominal wavelength in which the phase change value $\Delta P_{TOTAL}$(λ1) to $\Delta P_{TOTAL}$(λ30) is the minimum, that is to say, it corresponds to the phase change value with minimum effects on the total thin film layers against the wavelength change.

A film deposition process performed with a monitoring film thickness with using a monitoring light with a wavelength to minimize a film thickness error is explained below.

When a thin film layer $L_j$ (1≦j≦N) of multi-layer thin films (N is an integer not less than 1.) is deposited, for example, corresponding to the deposited material of the deposition material source 3a2, the shutter device 12a2 for the deposition material source 3a2 is opened, and the shutter device 12a1 for the deposition material source 3a1 is closed by the control of the computer 31.

On the other hand, the electron guns 10a1 and 10a2 project electron beams to the deposition material source 3a1 and 3a2, and deposition materials heated in the deposition material source 3a1 and 3a2 are evaporated.

The evaporated deposition materials in the deposition material source 3a2 which is not covered with the shutter device 12a2 flow upward in vacuum chamber 2 and are deposited on the substrate 6, and then a part of the thin film layer $L_j$ is formed.

At the same time, the light source 11 projects a wide wavelength band light to the thin film layers during deposition. The transmitted light transmitted through the thin film layers during deposition is injected into the spectrograph 19 through the substrate 6, the collecting lens and the optical fiber bundle 14.

The wavelength determining signals which expresses the monitoring light wavelength ($\lambda_{min}$) corresponding to each thin film layer are injected into the spectrograph 19 by the control of the computer 31. Therefore only the monitoring light which has the wavelength ($\lambda_{min}$) is separated by the spectrograph 19 and injected into the receiver 20. The optical intensity signals corresponding to the optical intensity received by the receiver 20 are sent to the computer 31.

Therefore the optical intensity change data $\{x_k, t_k$ (k=0, 1, . . . m−1)} based on all the luminous change signals measured before the present time $x_j$ for the corresponding thin film layer $L_j$ is received by the computer 31 through the receiver 20.

At this moment, the computer 31 calculates each parameter $A_0, A_1, A_2$ and $A3$, of the equation (6) by fitting all the optical intensity change data $\{x_k, t_k$ (k=0, 1, . . . m−1)} stored in the memory 32 based on all the luminous change signals measured before the present time $x_j$ for the corresponding thin film layer $L_j$ to the equation (6) stored in the theoretical data file 35 of the memory 32. (FIG. 7: Refer to Step S10 and FIG. 8.)

Figure 8:
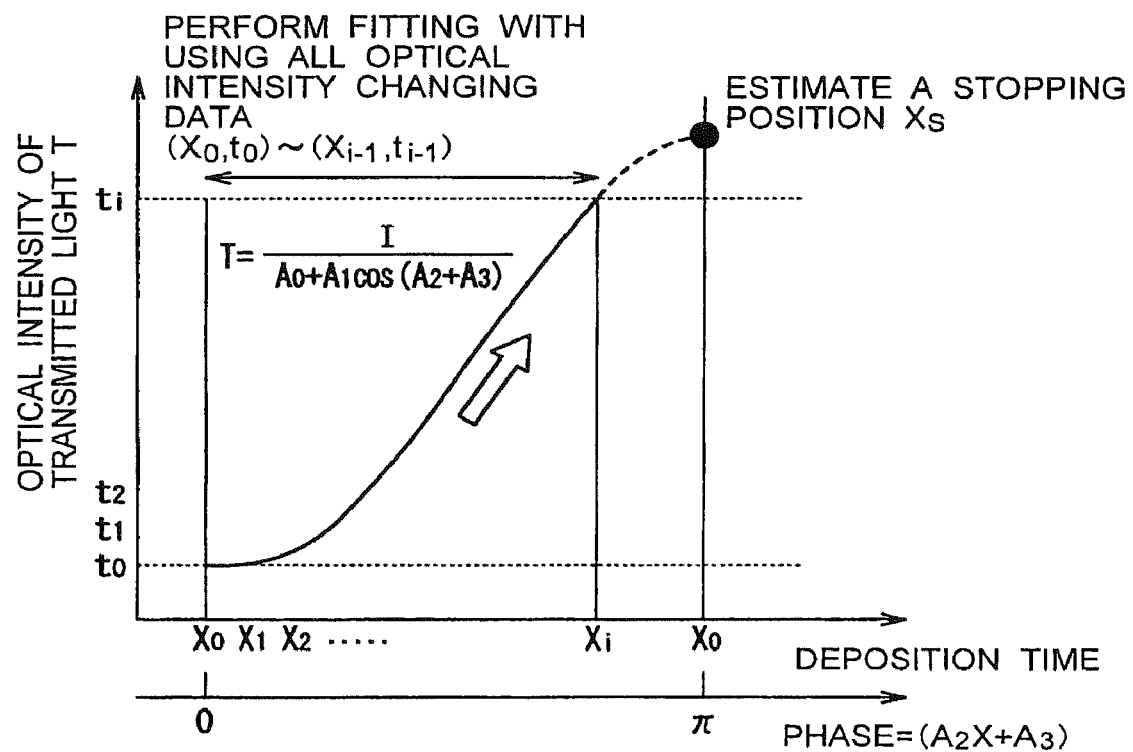
FIG. 8 is a graph for explaining an estimation process of a deposition stopping position in the first embodiment.

After that, the computer 31 calculates the deposition time $x_j$ when the present phase reaches the target phase (For example, the target phase θ becomes π when the target film thickness is one fourth of the cutting off band wavelength λ (λ/4) as shown in FIG. 8.). Therefore the computer 31 calculates $x_s$ which satisfy the condition of $\{(Ax_3x+Ax_4)=\theta=\pi\}$.

The computer 31 performs the Step S10 and the Step S11 repeatedly and sends shutting off signals to the shutter device 12a2 corresponding to the deposition material source 3a2 during deposition so as to stop a deposition the evaporated materials from the deposition material source 3a2 on the substrate 6 when the present time $x_j$ reaches the deposition time $x_s$ corresponding to the target phase. (Step S12, the deposition control means F5)

Errors of thin film thickness of the thin film layer $L_j$ caused by the relative wavelength change can be minimized because a monitoring process of a film thickness with using a monitoring light wavelength ($\lambda_{min}$) which minimizes effects of the wavelength change even if a wavelength change of the monitoring light occurs.

Therefore cumulative film thickness errors of the total thin film layers can be controlled within a range to get a desired optical profile in the total multi-layer thin film.

Figure 9:
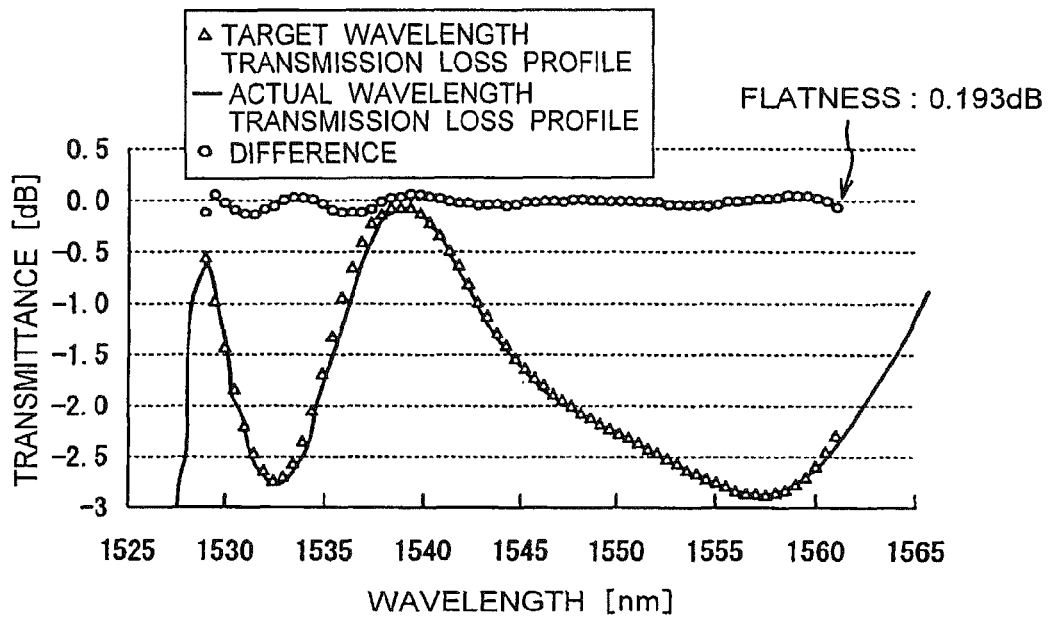
FIG. 9 is a graph for illustrating a target wavelength transmission loss profile ($\Delta$), a wavelength transmission loss profile for a GFF actually produced based on the monitoring light wavelength determining process as explained in the first embodiment considering a phase changing value corresponding to the wavelength change and the thin film deposition process (a solid line), and a difference of the transmission loss of the both profiles (▲)

A target wavelength loss profile of the multi-layer film GFF (the wavelength range of 1530 nm to 1562 nm: Δ) considering the phase fluctuation corresponding to the wavelength fluctuation for, the wavelength-loss profile of the GFF (a solid line) which is actually manufactured based on the monitoring light wavelength determining process and the deposition process and the difference between the above-mentioned 2 wavelength-loss profiles (Δ) are shown in FIG. 9. The flatness that becomes a measure of difference of the loss is calculated by the maximum difference minus the minimum difference.

Figure 10:
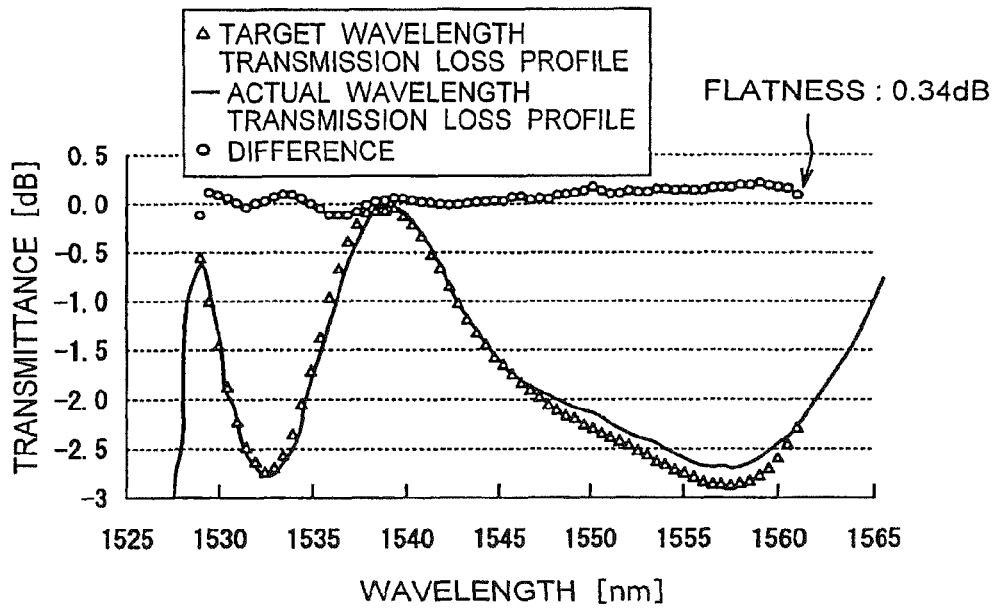
FIG. 10 is a graph for illustrating a target wavelength transmission loss profile for a multi-layer thin film GFF ($\Delta$), a wavelength transmission loss profile for the GFF actually produced without considering a phase changing value corresponding to the wavelength change (a solid line), and a difference of the transmission loss of the both profiles (▲)

The target wavelength-loss profile of the multi-layer film GFF (the wavelength range of 1530 nm to 1562 nm: Δ) without considering the phase change corresponding to the wavelength change (A wavelength of the monitoring light is fixed on 1530 nm.), the wavelength loss profile of the GFF (a solid line) actually manufactured and the difference between the above mentioned two kinds of the wavelength loss profiles (Δ) are shown in FIG. 10.

If results between FIG. 9 and FIG. 10 are compared, it is clear that the flatness shown in FIG. 10 is 0.34 dB does not satisfy the target wavelength loss profile of 0.2 dB or less.

On the other hand, the flatness shown in FIG. 9 is 0.193 dB satisfies the target wavelength loss profile of 0.2 dB or less.

As mentioned above, it is proved that the error of film thickness of each layer caused by the relative wavelength change can be minimized and cumulative errors of the total film thickness is controlled within a range which has a desired optical profile in the total multi-layer film when the multi-layer film GFF is actually manufactured with using the monitoring light wavelength determining process and the deposition process as specified in the first embodiment.

The theoretical equation data DT in which a change of optical intensity of a transmission light during deposition is theoretically expressed as a function of a deposition time is applied as the theoretical equation data corresponding to the phase control means monitoring the phase of a optical intensity change and perform the deposition. However the present invention is not limited to this embodiment.

Therefore when the deposition control using B/A (A is a band of the optical intensity change, and B is a change from the extreme value of the stop light.) is performed, the B/A value in which the optical intensity change is theoretically expressed as a parameter is stored in the theoretical data file 35. When the process of S1 to S4 is performed with using this theoretical equation data, the first stop index $B/A_1(\lambda 1)$ to $A_{30}(\lambda 30)$ is calculated to match each thin film thickness to the design film thickness (Refer to Step S2.), and the second stop index $B/A_1'(\lambda 1+\Delta\lambda)$ to $A_{30}'(\lambda 30+\Delta\lambda)$ is calculated to match each thin film thickness to the design film thickness considering the wavelength change. (Refer to the Step S4.)

It is possible to minimize the film thickness errors caused by the relative wavelength as well as ΔB/A (λ1 to λ30) corresponding to each nominal wavelength is calculated and the nominal wavelength corresponding to, for example, the minimum value of the calculated ΔB/A (λ1 to λ30) is selected.

Although one computer performs the above mentioned monitoring light wavelength determining process and the deposition control process in the first embodiment, plural computers can also perform the same function.

Additionally a light source to project the wide wavelength band light is used as the light source 11 in the first embodiment. However the present invention is not limited to it, and a laser device to project a laser beam as a monitoring light with a single wavelength is available. The spectrograph 19 is not necessary in this case.

Therefore it is possible to control a wavelength of the monitoring light directly projected from the light source 11 with sending the wavelength determining signals from the computer 31 to the light source 11.

The light transmitted through the thin film F and the substrate 6 is used as a monitoring light in the first embodiment. However the present invention is not limited to the embodiment, and it is also possible to use the light reflected from the thin film F as a monitoring light.

The Second Embodiment

Figure 11:
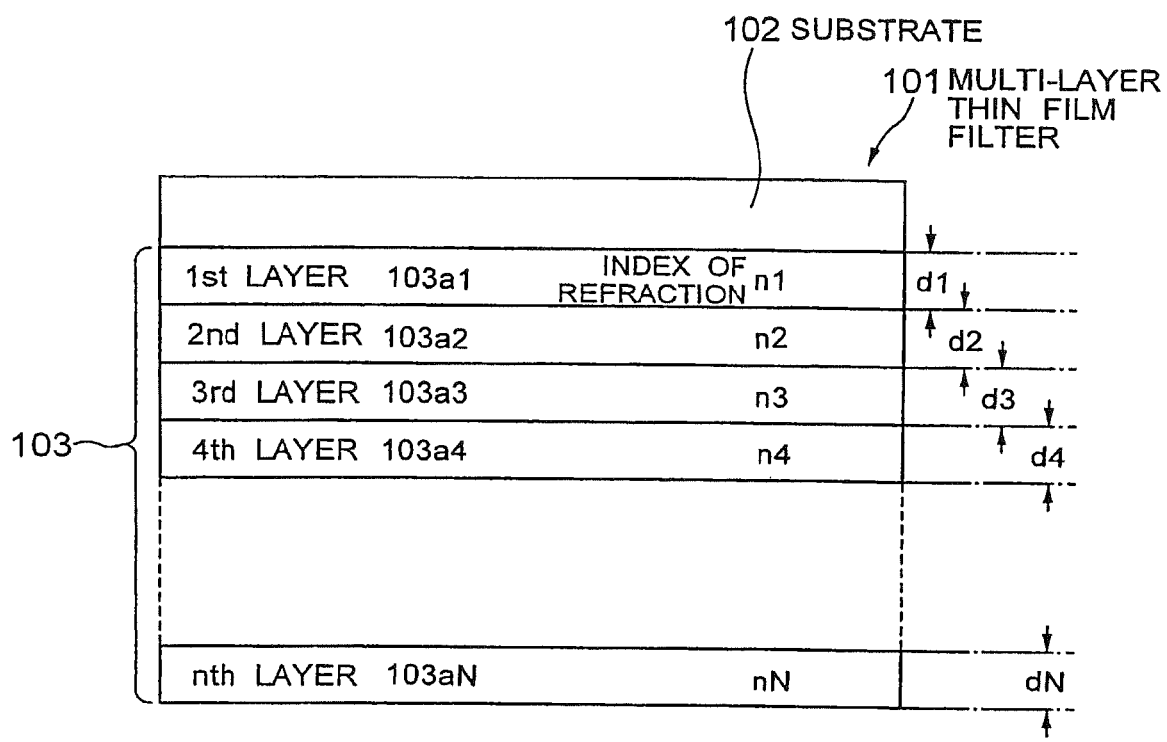
FIG. 11 is a graph for illustrating a multi-layer thin film filter of the second embodiment.

The second embodiment of the present invention is hereinafter explained with using drawings. FIG. 11 is a drawing to illustrate configuration of a multi-layers thin film filter 101 of the second embodiment of the present invention.

As shown in FIG. 11, the multi-layer thin film filter 101 includes a substrate 102 and plural thin film layers 103 (the first layer 103a1 to the $N_{th}$ layer 103aN) deposited on the substrate 102, for example, by vaporizing, spattering and the like. In the plural thin film layers 103a1 to 103aN, the refractive indexes of the thin film material for the layers with odd numbers (the first layer 103a1, the third layer 103a3, . . . the $N-1_{th}$ layer 103aN-1 . . . ) are different from the refractive indexes of the thin film material for the layers with even numbers (the second layer 103a2, the fourth layer 103a4, . . . the $N_{th}$ layer 103aN . . . ).

Each thin film layer to compose the plural thin film layers 103, that is, the optical film thickness which is the product of the physical film thickness d1 for the first layer 103a1 to the physical film thickness dN for the $N_{th}$ layer 103aN by the refractive indexes of n1 to nN is precisely designed in each film layer based on a thin film thickness design process which is explained later.

Figure 12:
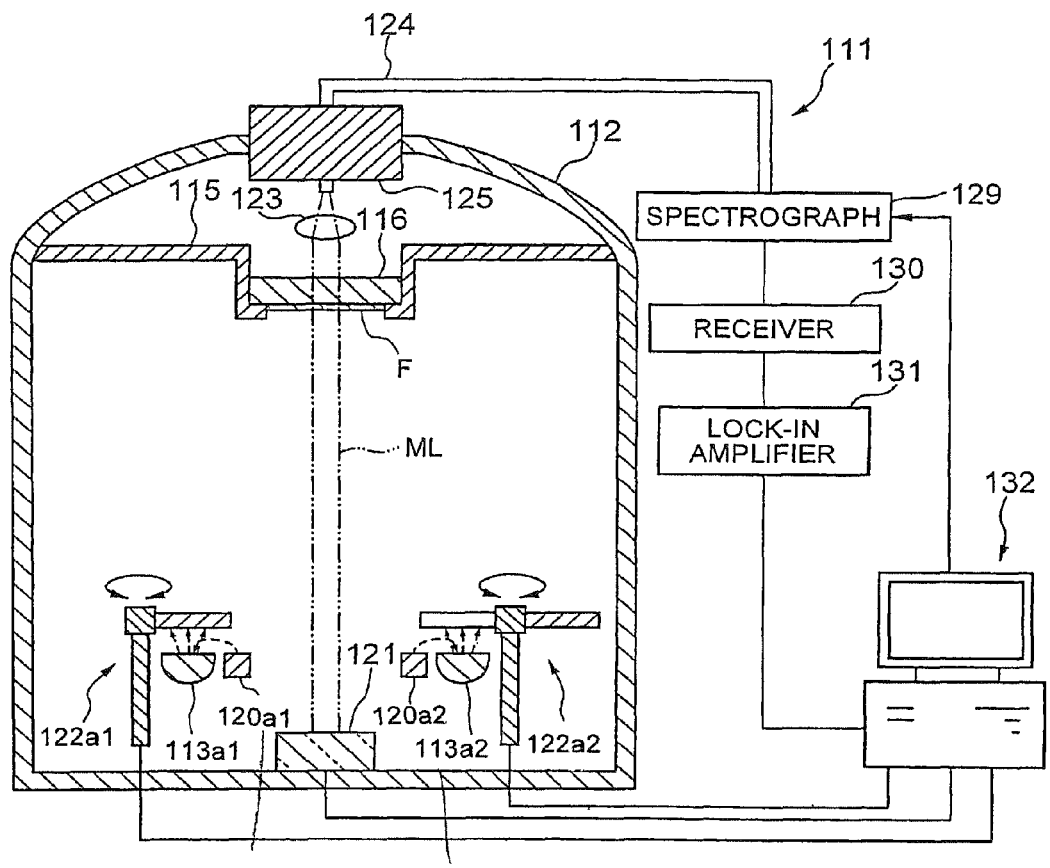
FIG. 12 is a schematic view (partially including a sectional view) for illustrating a configuration of a deposition system including a thin film monitoring light wavelength determining apparatus for the second embodiment.

FIG. 12 is a drawing to illustrate configuration of a deposition system that includes a thin film thickness design apparatus and a thin film deposition apparatus of the embodiment of the present invention.

As illustrated in FIG. 12, the deposition system 111 includes a vacuum chamber 112, two deposition material sources such as 113a1 and 113a2 installed on the bottom of the vacuum chamber 112, the deposition material source 113a1 in the vacuum chamber 112 and a deposited substrate 116 held by a base holder 115 and installed on the opposite (upper) side of the deposition material source 113a2.

Deposition materials are set in the deposition material source 113a1 and 113a2 respectively, and each material has the different reflective index.

The deposition system installed on the vacuum chamber 112 has electron beam guns 120a1 and 120a2 which project electron beams into the deposition material sources 113a1 and 113a2 so as to heat the deposition materials in the deposition material sources, and a light source 121 which projects, for example, a white light which is one of the wide wavelength light as a measuring light ML.

Additionally the deposition system has shutter devices 122a1 and 122a2 which cover the deposition material sources 113a1 and 113a2 so as to stop the deposition process according to a shutter signal which is explained later, a collecting lens 123 which collects the transmitted light in which the light objected by the light source 121 is transmitted through the thin film F during deposition and the substrate 116, and an optical fiber bundle 124 which receives the transmitted light collected by the collecting lens 123 in each wavelength.

The optical fiber bundle 124 is extended in airtight from the vapor chamber through a sealed box 125 connected, for example, to the upper wall of the vapor chamber 112 in air tight.

The deposition system has a spectrograph 129 which selects only the transmitted light with the wavelength corresponding to the wavelength determining signal which expresses the wavelength of the monitoring light objected by a control apparatus, which is explained later, as a monitoring light from the transmitted light transferred through the optical fiber bundle 124, a light receiver 130 which receives the monitoring light selected by the spectrograph 129 one by one so as to project the optical intensity signal corresponding to the optical intensity of the received light, a lock-in amplifier 131 which deletes noise elements from the optical intensity signal sent by the light receiver 130, and a control apparatus 132 which is connected the spectrograph 129 and the shutter device 122a1 and 122a2 to enable data communication.

The control apparatus 132 has a function to collect the optical intensity signals projected by the light receiver 130, and to send the shutter close/open signals to the shutter device 122a1 and 122a2 respectively according to the received optical intensity signals so as to control the film thickness of the thin film layer F deposited on the deposited substrate 116.

Figure 13:
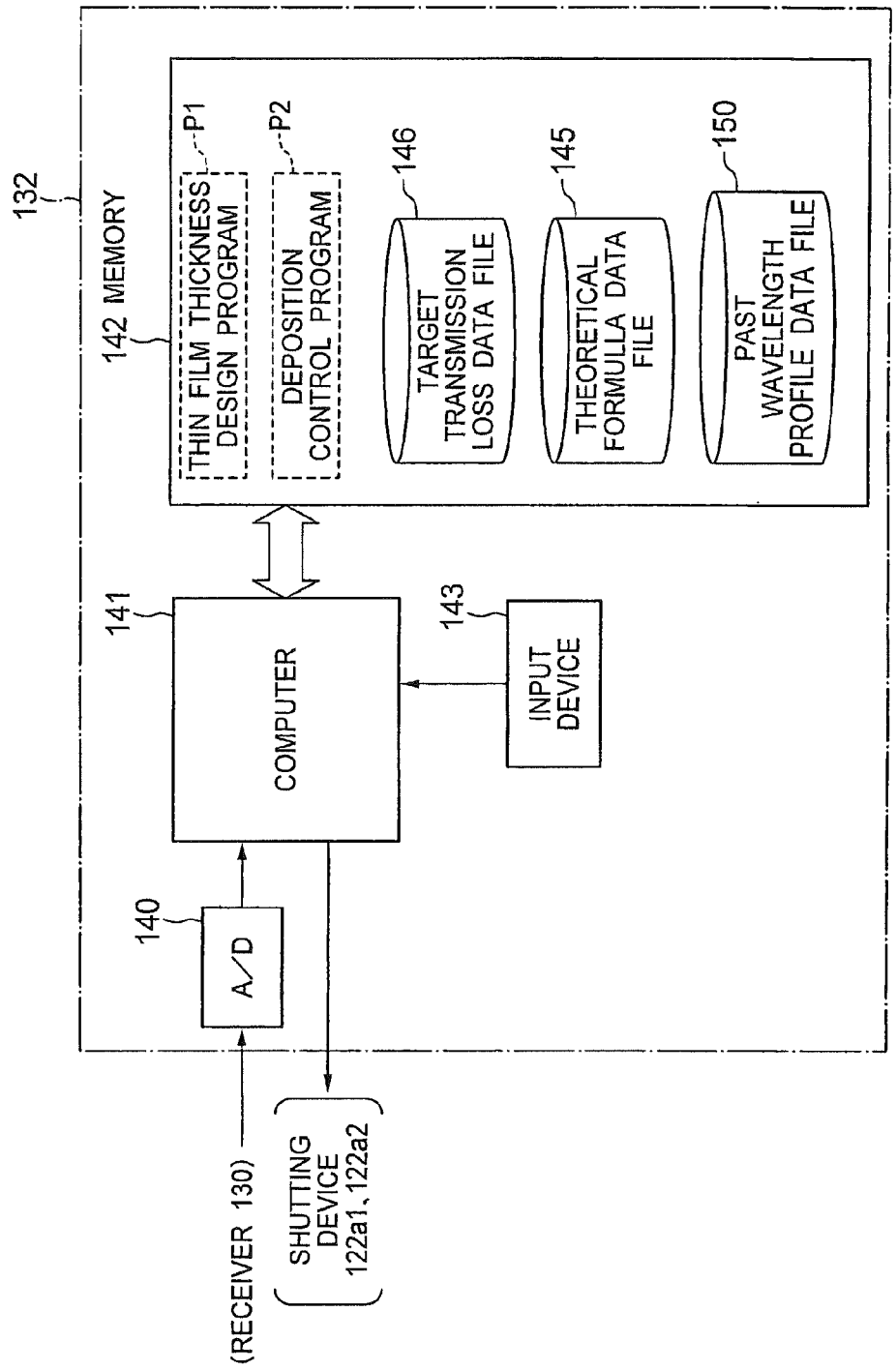
FIG. 13 is a block diagram for illustrating a configuration of hardware of the control apparatus as shown in FIG. 12.

FIG. 13 illustrates configurations of the hardware of the control apparatus 132 in the deposition system shown in FIG. 12.

As shown in FIG. 13, the control apparatus 132 is a computer system and includes a A/D converter 140 which coverts the optical intensity signal projected by the light receiver 130 into the digital optical intensity signal (the digital optical intensity data), an input device 143 so that designers can input the data, a computer 141 which is connected to the input device 143, a memory 142 connected to the computer 141 to enable data communication which stores in advance the thin film thickness design program P1 to perform a thin film thickness design process as explained later and a control program P2 to perform deposition process as explained later, an input-output interface which performs input process from and output process to the outside. Various kinds of memories such as a semiconductor memory, a magnetic memory and the like are available for memory mediums.

The memory 142 also stores a theoretical data file 145 which includes the theoretical data to express theoretical values of the transmission rate of the multi-layers thin film filter 101 with N layers in the continuous wavelength, and a target transmission loss data file 146 which includes the target transmission loss of each desired wavelength step in the desired wavelength band, that is, the wavelength band for a transmission loss profile as a GFF (for example, 1530 nm to 1560 nm).

The theoretical data stored in the theoretical data file 145 is hereinafter explained.

The theoretical equation of transmission rate for the multi-layer thin film filter 101 with N layers to use optical film thickness of each layer 103a1 to 103aN as a parameter is given in the equation (1) to (5) specified in the first embodiment based on the condition that a projecting angle is perpendicular (90 degrees).

The theoretical value of the transmission rate in the continuous wavelength of the multi-layers thin film filter 101 with continuous N layers is determined with using the optical film thickness values as parameters according to the equation (1) to (5), and the transmission loss value can be expressed with using the optical film thickness and the wavelength as a parameter if the transmission rate is converted into the transmission loss value (the input loss value).

A change of the transmission rate of layers during deposition is expressed in the function with using a physical film thickness as a parameter if total layers in which a deposition has already completed is expressed in the above mentioned profile matrix M. If the deposition rate is constant in the layers during deposition, the physical film thickness can be converted into a time because the physical film thickness is in proportion to the deposition time.

Therefore a change of the transmission rate during deposition can be expressed in the periodical function of a time during deposition.

The theoretical equation to express the above mentioned transmission loss value (the input loss value) IL and the above mentioned equations (1) to (6) is stored in the theoretical data file 145 respectively as a theoretical data DA.

A past wavelength profile data file 150 where the data to express a wavelength profile (transmission/reflection loss) of the multi-layer thin film filter actually deposited by the deposition device 111 is stored in the memory 142. The past wavelength profile data file can be omitted for the configuration of the second embodiment.

Total movement of the second embodiment is hereinafter explained. The optical film thickness of each layer 103a1 to 103aN is designed at the beginning of production of the multi-layers thin film filter 101.

The minimum number of layers which has a target transmission loss wavelength profile stored in a target transmission loss data file 146 is applied for the number of layers of the multi-layers thin films in the second embodiment. At designing the multi-layers thin films 103, the projecting angle to the surface of the multi-layers thin film filter 101 is 90 degrees, and one material for the multi-layer thin films 103 is $Ta_2O_5$ (for example, the material for the deposition material source 113a1 is $Ta_2O_5$) and the reflective index is 2.1654, and the other material for the deposition material source 113a1 is $SiO_2$ (for example, the material for the deposition material source 113a2 is $SiO_2$) and the reflective index is 1.4471. The reflective index $n_s$ for the filter substrate 102 is 1.5022 and the reflective index of air (the medium) is 1.0000, and there is no absorption in the materials.

Figure 16:
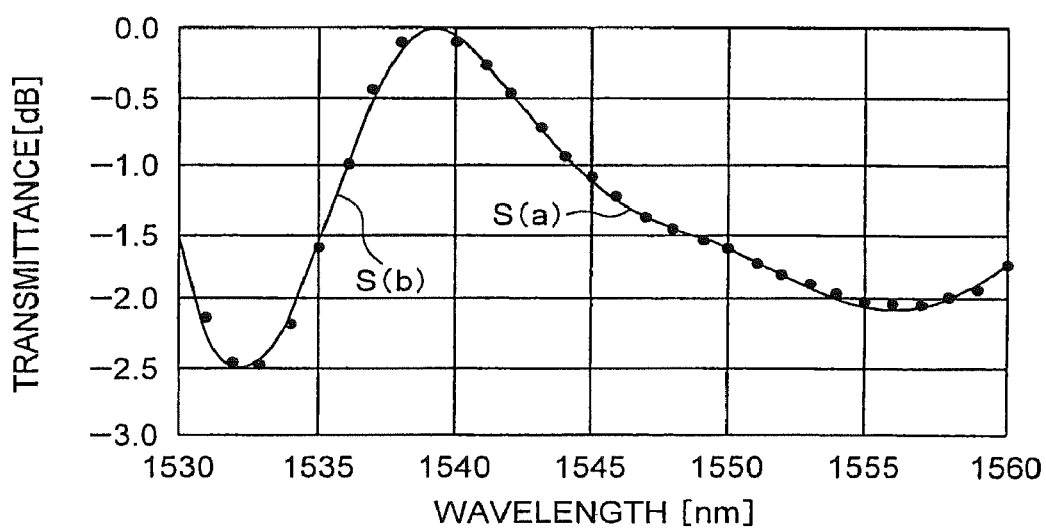
FIG. 16 is a graph for showing an interrelation between a target wavelength transmission loss profile targeted by the multi-layer thin film filter of the second embodiment and a wavelength transmission loss profile designed by the above mentioned designing method.

Therefore a designer inputs, for example, the target transmission loss data desired for the GFF as a profile calculation wavelength band into the computer 141 through the input device 143 of the control apparatus 132 (Step S101). The target transmission loss data expresses the target transmission loss profile and that is, for example, the specific transmission loss for each discontinuous wavelength $\lambda_i$ ("i"=1, 2, 3, . . . N−1, N) of a target transmission loss profile as shown in FIG. 16 which is explained later.

In addition to that, a designer determines the target wavelength $\lambda$, for example, of 1495 nm, that is, around 0.95th times of the target profile wavelength band (1530 nm ($\lambda_s$) to 1560 nm ($\lambda_e$)) as an initial value (a basic film thickness) of the matrix a of the parameter of the optical film thickness (hereinafter called the film thickness parameter), and inputs $7\lambda/4$ ($1.75\lambda$), that is, the seventh times of the quarter of the center wavelength $\lambda$ (Step S102).

The computer 141 performs according to a thin film thickness design program P1, and receives an input profile wavelength and a group of the thin film thickness parameter a. The group of the thin film thickness a (the matrix)=($a_1$, $a_2$, $a_3$, $a_4$, . . . $a_p$). "p" is a generic number for an optimization.

The computer 141 sets zero as a variable n (Step S103), performs the increment to the n (adds one to the n) (Step S104), and sets $\lambda_i$ as a wavelength parameter in the profile wavelength band. If n=1, $\lambda_n$ is $\lambda_1$ (Step S105).

The computer 141 reads the theoretical equation data stored in the theoretical equation data file 145 of the memory 142, and inputs the group of thin film thickness parameters (the matrix) a (the basic thin film thickness=7λ/4) to the theoretical equation data DA read by the computer 141. Then the computer 141 calculates the insert transmission loss IL($\lambda_n$, a) of the multi-layers thin films 103 for total N layers with using the group of the thin film thickness parameters (matrix) a and the wavelength $\lambda_n$ as variables. The computer 141 calculates the square error $E_n$ between the insert transmission loss IL($\lambda_n$, a) of the multi-layers thin films 103 and the target transmission loss IL($\lambda_n$) at the corresponding wavelength of $\lambda_n$ using the following equation:

$$E_n(a) = \{IL(\lambda_n, a) - IL(\lambda_n)\}^2$$

And then the computer 141 stores the calculated $E_n$ for the total multi-layers thin films 103 (a) in the memory 142 (Step S106).

Additionally the computer 141 judges if n exceeds N (YES) or not (NO). (Step S107) The present condition is that n equals one. Therefore the computer 141 judges NO in the Step S107 and returns to the Step S104, and then re-calculates from the Step S104 with adding one to the n (the increment).

The computer 141 repeats the above mentioned calculation of the Step S104 to the Step S107 until n exceeds N, that is, until the process of the Step S107 based on the condition that the wavelength parameter $\lambda_n$ equals $\lambda_N$.

As a result, the square error $E_n$ between the theoretical transmission loss IL($\lambda_n$, a) of every wavelength step in the total profile wavelength band setting the group of thin film thickness parameters (the matrix) a for each layer of 103a1 to 103aN as the basic thin film thickness (7λ/4) and the target transmission loss IL($\lambda_n$) at the corresponding wavelength of $\lambda_n$.

If the wavelength parameter $\lambda_n$ equals the wavelength $\lambda_e$, the judgment of the above mentioned Step S107 becomes YES, and the computer 141 calculates the average of the square error $E_n$ calculated in the total profile wavelength band for the total multi-layers thin films 103 (a) with using the following equation (8):

$$\text{average square error} = \sqrt{\frac{1}{n} \sum_{j=1}^{n} E_j(a)} \quad (8)$$

And then the computer 141 performs the fitting process with changing the group of thin film thickness parameters (the matrix) a for each layer of 103a1 to 103aN based on the above mentioned the group of thin film thickness parameters (the matrix) a (an initial data: 7λ/4). Therefore the computer 141 calculates the average of the square error for the total corresponding multi-layers thin films 103 one by one with changing the group of thin film thickness parameters (the matrix) a for each layer of 103a1 to 103aN individually, and makes the average of the square error smaller (Step S109).

The computer 141 repeats the fitting process of the Step S109, and when the average of the square error converges though the group of thin film thickness parameters (the matrix) a for each layer of 103a1 to 103aN is changed, or when the difference (the flatness) between the transmission loss IL($\lambda_1$ to $\lambda_N$, a) with using the present optical thin film thickness a(1) to a (p) and the corresponding target transmission loss IL($\lambda_1$ to $\lambda_N$) becomes the setting value (for example, less than 1 dB), the above mentioned fitting process completes (The judgment of the Step S110 becomes YES.)

As a result of the design shown in FIG. 15, total number of layers: 26 is calculated for the multi-layers thin films 103a1 to 103aN based on the wavelength of 7λ/4. The top side is the medium and the bottom side is the substrate in FIG. 15.

FIG. 16 shows the interrelation between the target transmission loss profile for the multi-layers thin film filter 101 of this embodiment and the transmission loss profile designed according to the above mentioned design method. The profile curve S(a) shows the target transmission loss profile corresponding to each discontinuous wavelength $\lambda_i$ (i: 1, 2, 3, . . . N−1, N), and S(b) shows the transmission loss profile for the multi-layers thin film filter 101 designed with the designing method explained in this embodiment in plural wavelengths $\lambda_k$ (k: 1, 2, 3, . . . N) selected from the target wavelength band (1530 nm to 1560 nm) of the target transmission loss profile.

It is clear in FIG. 16 that the transmission loss profile of the multi-layers thin film filter 101 designed in this embodiment has the transmission loss profile which is close to the above mentioned target wavelength transmission loss profile.

Figure 14:
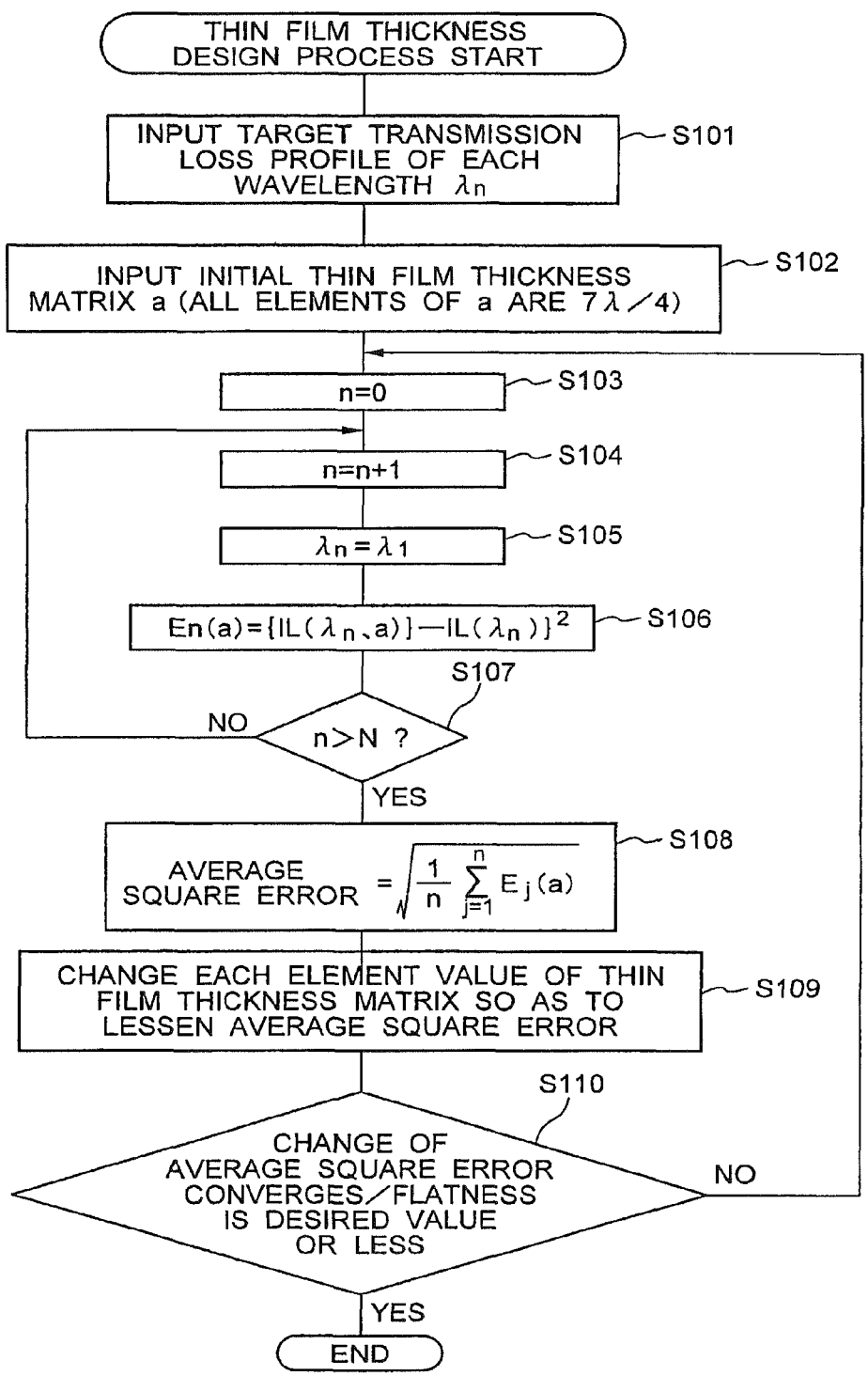
FIG. 14 is a flowchart for illustrating an example of a thin film design process in the second embodiment.

If the thin film thickness is optimized based on the condition that the center wavelength is 1327 nm and the optical thin film thickness of each layer of the multi-layers thin films is one fourth ($0.25^{th}$ times) of the center wavelength as a basic thin film thickness (Refer to FIG. 14.), the multi-layers thin films at least needs 76 layers, and it is clear that number of layers more than those designed based on the condition that the basic thin film thickness is $(2n+1)/4^{th}$ times (n is a natural number not less than 1.) of the center wavelength is required.

Requiring more layers means requiring more calculation work volume and more design hours. Therefore if the optical thin film thickness is calculated based on the condition that the basic thin film thickness is $(2n+1)/4^{th}$ ($3/4^{th}$, $5/4^{th}$, . . . ), the basic thin film thickness can be designed easier than the basic thin film thickness designed based on the condition that the basic thin film thickness is $1/4^{th}$ of the center wavelength.

The method to produce the multi-layers thin films filter 1 is explained with using the optical thin film thickness of 26 layers which has the thin film thickness in each layer designed based on the condition that the basic thin film thickness is $7/4^{th}$ times of the center wavelength.

During the deposition process of thin film layer $L_j$ b($1 \leq j \leq 26$) in the 26 layers thin films $L_1$ to $L_{26}$ (For example, it is the layer corresponding to the deposition material of the deposition material source 113a2.), the shutter device 122a2 of the deposition material source 113a2 is opened and the shutter device 122a1 of the deposition material source 113a1 is closed according to the control of the computer 141.

On the other hand, the electron beam is projected to the deposition material sources 113a1 and 113a2 by the electron beam guns 120a1 and 120a2, and the deposition material in the deposition material sources 113a1 and 113a2 is heated and evaporated.

The evaporated deposition materials (evaporated particles) from the deposition material sources 113a2 which is not covered by the shutter device 122a2 flows upward in the vacuum chamber 112 and deposited on the deposition substrate 116 and a part of thin film layer $L_j$ is formed.

At the same time of the deposition, the light source projects the wide wavelength band light into the thin film layer. The transmitted light which is transmitted through the thin film layer during deposition is projected into the spectrograph 129 through the substrate 116, the collecting lens 123, and the optical fiber bundle 124.

Only the monitoring light with the desired monitoring wavelength is selected by the spectrograph 129, and received by the light receiver 130. The optical intensity signal corresponding to the light received by the light receiver 130 is sent to the computer 141 in the control apparatus 132 after a noise in the signal is deleted by the lock-in amplifier 131.

Therefore the optical intensity change $\{x_k, t_k (k=0, 1, \ldots i-1)\}$ based on all the optical intensity signals measured before the present time "$x_i$" in the thin film layer $L_j$ corresponding through the light receiver 130 is received by the computer 141, and stored in the memory 142 with the process of the computer 141.

At this moment, the computer 141 performs the fitting as described in the equation (6) stored in the theoretical data file 145 of the memory 142 with using the optical intensity change $\{x_k, t_k\}$ based on all the luminous "$x_m$" energy change $\{x_k, t_k (k=0, 1, \ldots i-1)\}$ signals measured before the present time "$x_i$" in the corresponding thin film layer $L_j$, and each parameter $A_0, A_1, A_2$ and $A_3$ of the equation (6) is calculated. (Refer to FIG. 17 and Step S111.)

The computer 141 calculates the deposition time $x_s$ when the present phase reaches the target phase (the target stop index phase value corresponding to the designed target thin film thickness), that is, the $x_s$ calculated based on the condition that $(A_2 x_s + A_3)$ becomes the above mentioned target stop index phase value (Step S112).

The computer repeats the process from the Step S111 to the Step S112, and when the present deposition time $x_i$ reaches the deposition time $x_s$ corresponding to the target phase (the design thin film thickness), the computer 141 sends the shutting signal to the shutter device 122a2 corresponding to the deposition material sources 113a2 during deposition to prevent the deposition material evaporated from the deposition material sources 113a2 from reaching the substrate 116 (Step S113).

As a result, the thin film thickness of the thin film layer $L_j$ actually deposited meets the design thin film thickness.

The maximum allowable error of the optical thin film thickness under production which have the target transmission loss profile in the 26 layers of thin films filter 101 as designed and produced according to the above mentioned method is five times larger than the maximum allowable error for the production of the multi-layers thin films with using 76 layers of optical film thickness based on the condition that the basic thin film thickness is one fourth of the above mentioned center wavelength. Therefore required accuracy for thin film deposition can be eased.

In general if a number of layers of multi-layer thin films become smaller, the maximum allowable error at the production of the optical thin film with the target transmission becomes larger. The required accuracy for a thin film deposition can be eased, and it becomes easier to produce the multi-layer s thin films filter with the target transmission loss wavelength profile.

The Third Embodiment

The configuration of the deposition system 111 of the third embodiment is almost the same as the configuration of the second embodiment. Therefore the same equipment numbers is used so as to avoid duplicated explanation.

Figure 19:
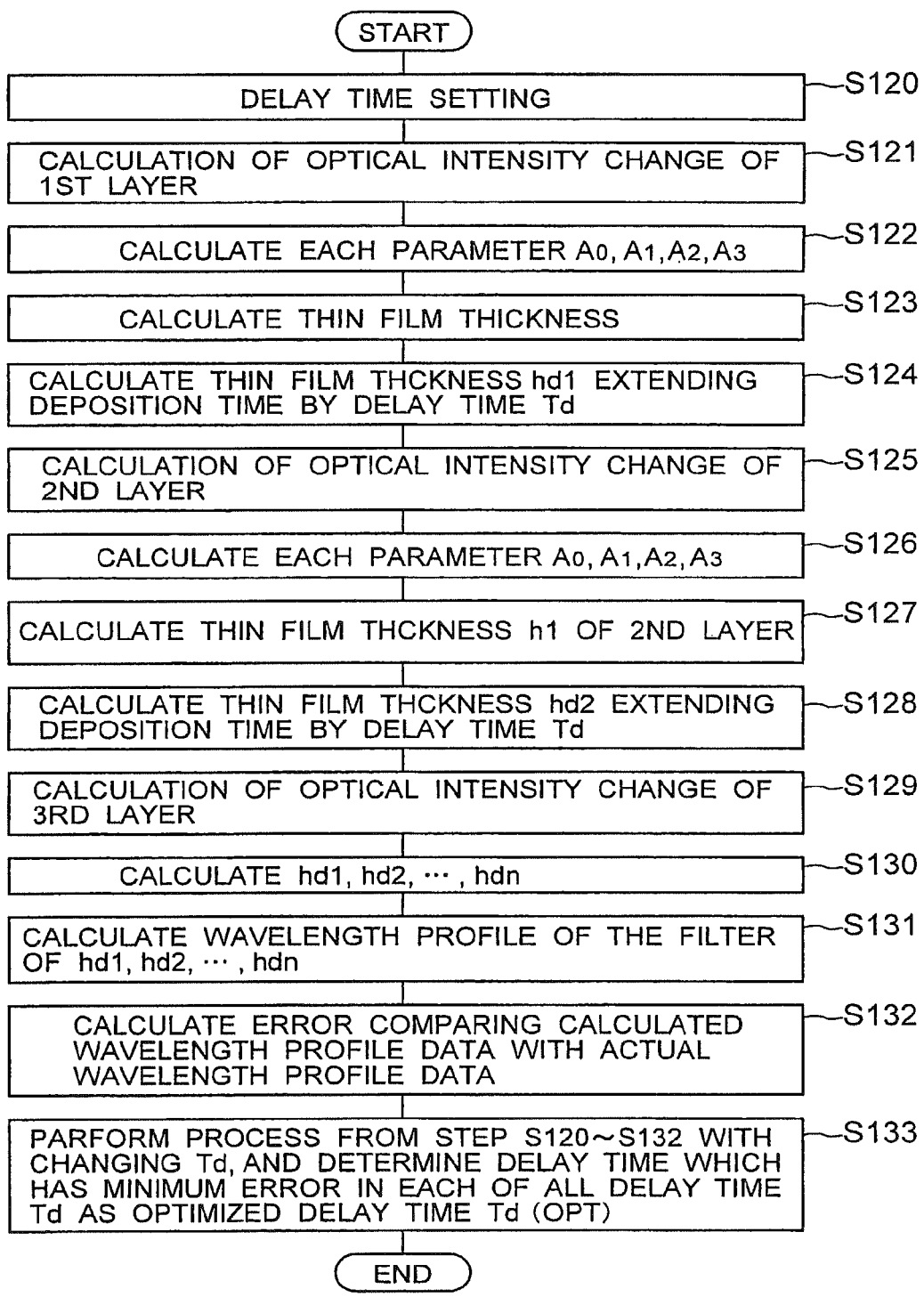
FIG. 19 is a flow chart for illustrating an example of a thin film deposition control process for the third embodiment.
Figure 20:
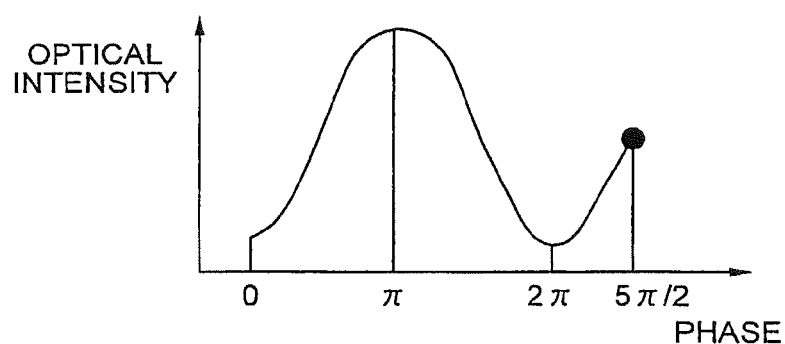
FIG. 20 is a graph for explaining a optical intensity change for the third embodiment.

In the third embodiment, the computer 141 performs the process as shown in FIG. 19 according to the deposition control program P2 after design of the thin film thickness of each thin film layer 103a1 to 103aN for the multi-layer thin film filter is completed to control deposition process with estimating the thin film thickness error of the multi-layer thin films actually deposited by the deposition system 111.

The computer 141, for example, sets the delay time Td corresponding to the optical time constant of the deposition system 111 (FIG. 19; Step S120), and calculates (simulates) the optical intensity change with increasing the thin film thickness gradually referring to the theoretical equation data DA, with assuming the case to deposit (vaporize) the first layer.

The computer 141 performs the fitting as described in the equation (6) with using the calculation result of the Step S121 and calculates each parameter of the equation (6); $A_0, A_1, A_2$ and $A_3$ (Step S122). The computer 141 calculates the thin film thickness h1 of the first layer when the present phase reaches the target phase (the stop index phase value corresponding to the designed target thin film thickness) with using each calculated parameter $A_0, A_1, A_2$ and $A_3$ and the equation (6) (Step S123).

The computer 141 adds the delay time Td to the calculated deposition time of the thin film thickness h1, and calculates the thin film thickness hd1 with using the extended deposition time (Step S124). The fixed value based on the actual data is used as a deposition rate in the process of the Step S124.

The computer 141 calculates the optical intensity change referring to the theoretical equation data when the thin film thickness increases gradually with assuming that the thin film thickness of the first layer is fixed with hd1, and the second layer is deposited on the first layer (Step S125). Then the computer 141 performs the fitting as described in the equation (6) with using the result of the Step S6 and calculated parameter $A_0, A_1, A_2$ and $A_3$ (Step S126). The computer 141 calculates the thin film thickness h2 of the second layer when the present phase reaches the target phase (the stop index phase value corresponding to the designed target thin film thickness) with using each calculated parameter $A_0, A_1, A_2$ and $A_3$ and the equation (6) (Step S127).

The computer 141 adds the delay time Td to the calculated deposition time of the thin film thickness h2, and calculates the thin film thickness hd2 with using the extended deposition time (Step S128). The computer 141 calculates the optical intensity change referring to the theoretical equation data when the thin film thickness increases gradually with assuming that the thin film thickness of the first layer and the second layer are fixed with hd1 and hd2 respectively, and the third layer is deposited on the second layer (Step S129).

The computer 141 repeats the same process and calculates hd1, hd2, hd3, ..., hdn until the final optical thin film layer (103aN) is calculated (Step S130), and the computer 141 calculates the filter wavelength profile based on the thin film thickness of hd1, hd2, hd3, ..., hdn referring to the theoretical equation data (Step S131).

The computer 141 calculates the difference (the error) between the past wavelength profile data based on the actual deposition stored in the past wavelength profile data file 150 of the memory 142 and the calculated wavelength profile data (Step S132).

The computer 141 selects the delay time Td that has the minimum error of all the time delay Td and sets the optimized delay time Td (OPT) with repeating the process the Step S120 to S132 with changing the Td. (Step S133)

Figure 21:
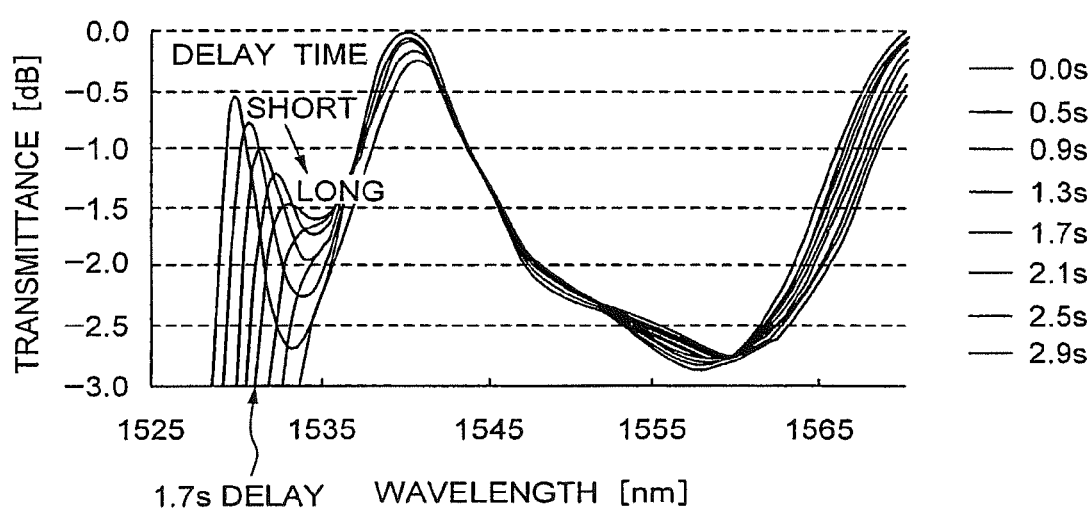
FIG. 21 is a graph for illustrating a calculation result of a wavelength profile in each delay time calculated according to the delay time estimation process as shown in FIG. 19 in the third embodiment.
Figure 46:
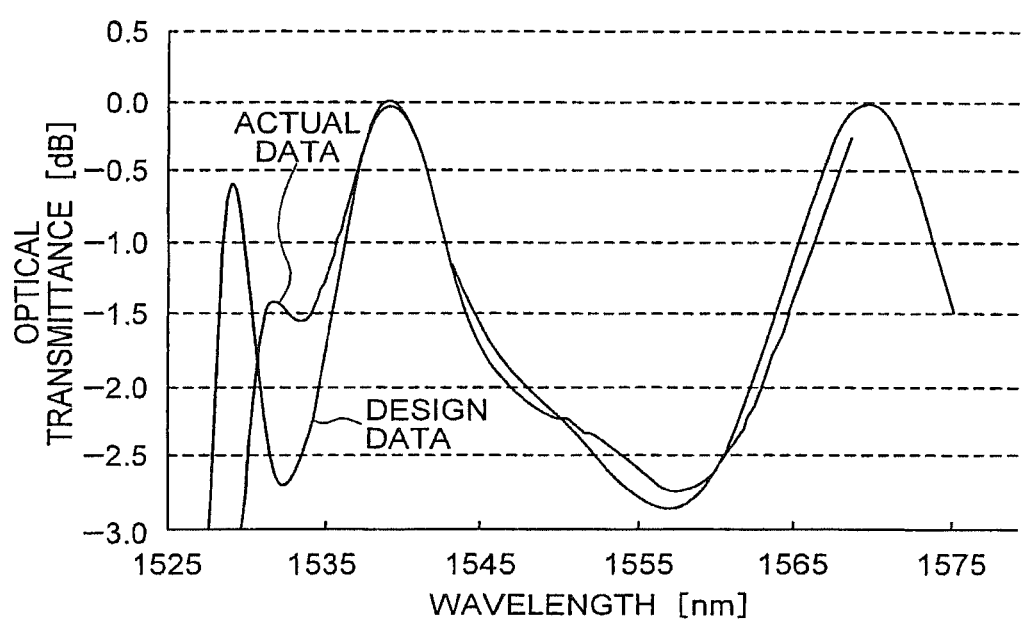
FIG. 46 is a graph for comparing wavelength profile data of a multi-layer thin film filter based on a design thickness with wavelength profile data of a multi-layer thin film filter that is actually deposited.
Figure 47:
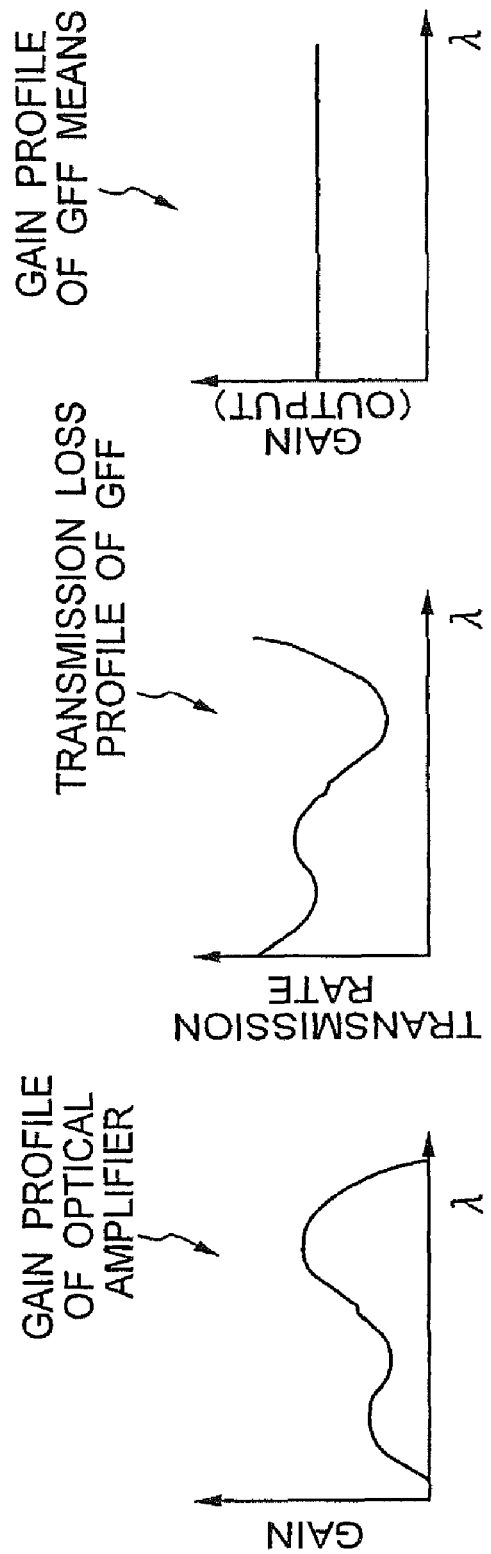
FIG. 47 is a graph for explaining a gain equalizing function of a gain equalization filter.
Figure 48:
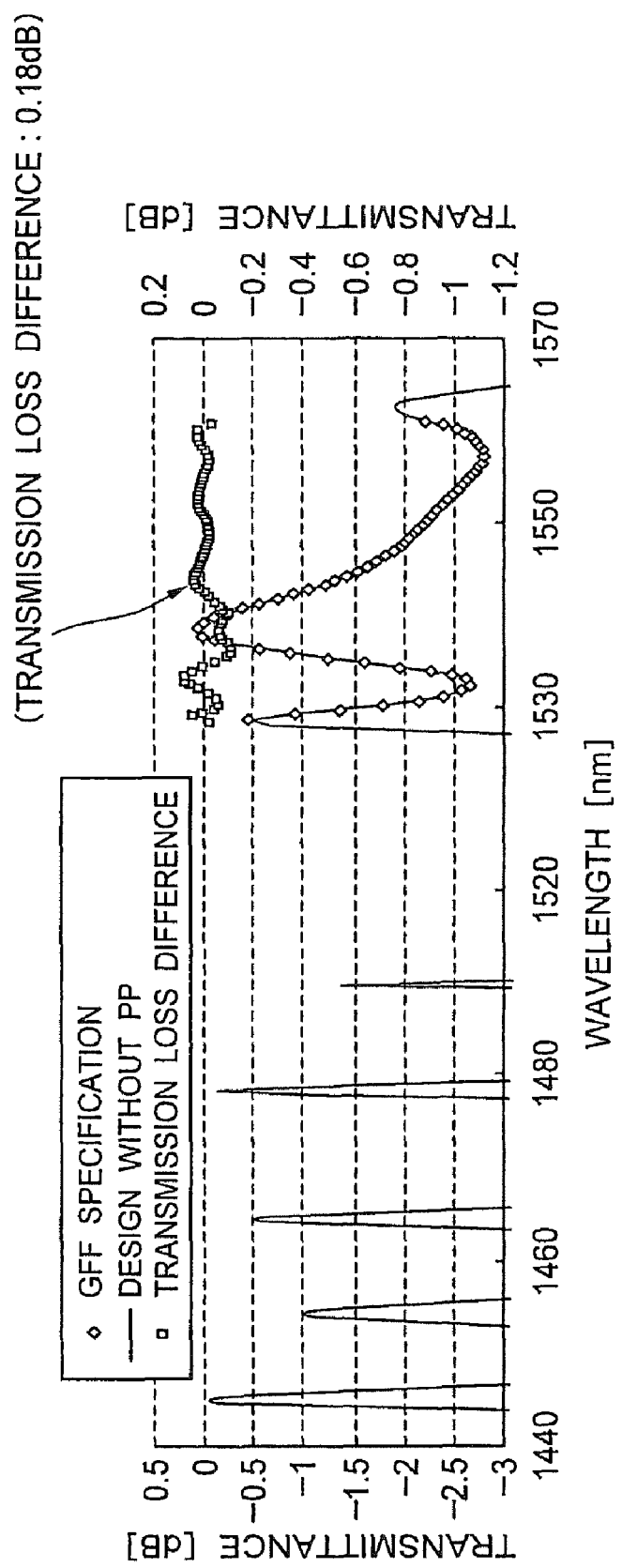
FIG. 48 is a graph for illustrating a design target transmission loss of a multi-layer thin film filter, a transmission loss profile based on a design value of a multi-layer thin film filter, and difference of transmission loss between a target value and a design value.

FIG. 46 illustrates the comparison between the wavelength profile data of the multi-layer thin film filter based on the design thin film thickness and the wavelength profile data of the multi-layer thin film filter actually deposited. FIG. 21 illustrates the calculation result of the wavelength profile in each delay time calculated according to the delay time estimation process as shown in FIG. 19

Figure 22:
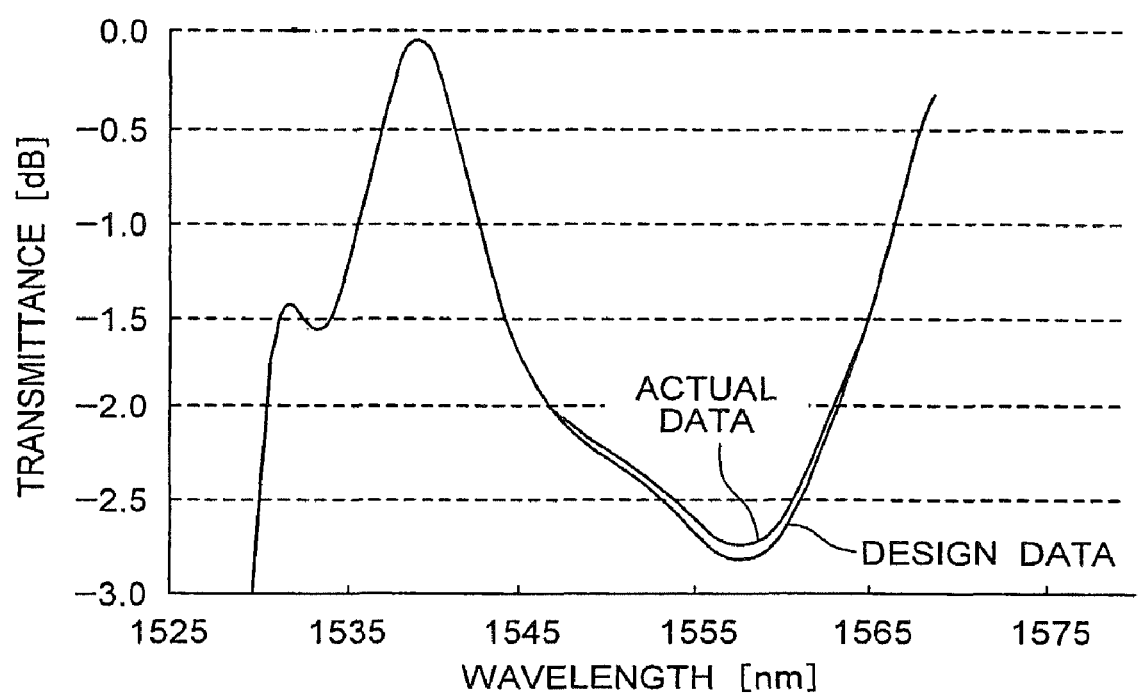
FIG. 22 is a graph for illustrating a calculated profile at Td=1.7 sec in the third embodiment, and the actual profile data as shown in FIG. 46.

As shown in FIG. 21, if the delay time becomes larger, the wavelength profile is changed. FIG. 22 shows the comparison between the calculated profile at Td=1.7 sec as shown in FIG. 21 and the actual profile data as shown in FIG. 46. FIG. 22 shows that both profiles are the almost same.

Therefore having the similar profiles and having the minimum error has the same meaning, and the delay time Td (the minimum error) of the similar profile can be used as an optimized delay time Td (OPT).

The deposition control is performed with using the optimized delay time Td (OPT) as mentioned above. For example, the thin film layer $L_j$ is deposited as described in the first embodiment.

Figure 23:
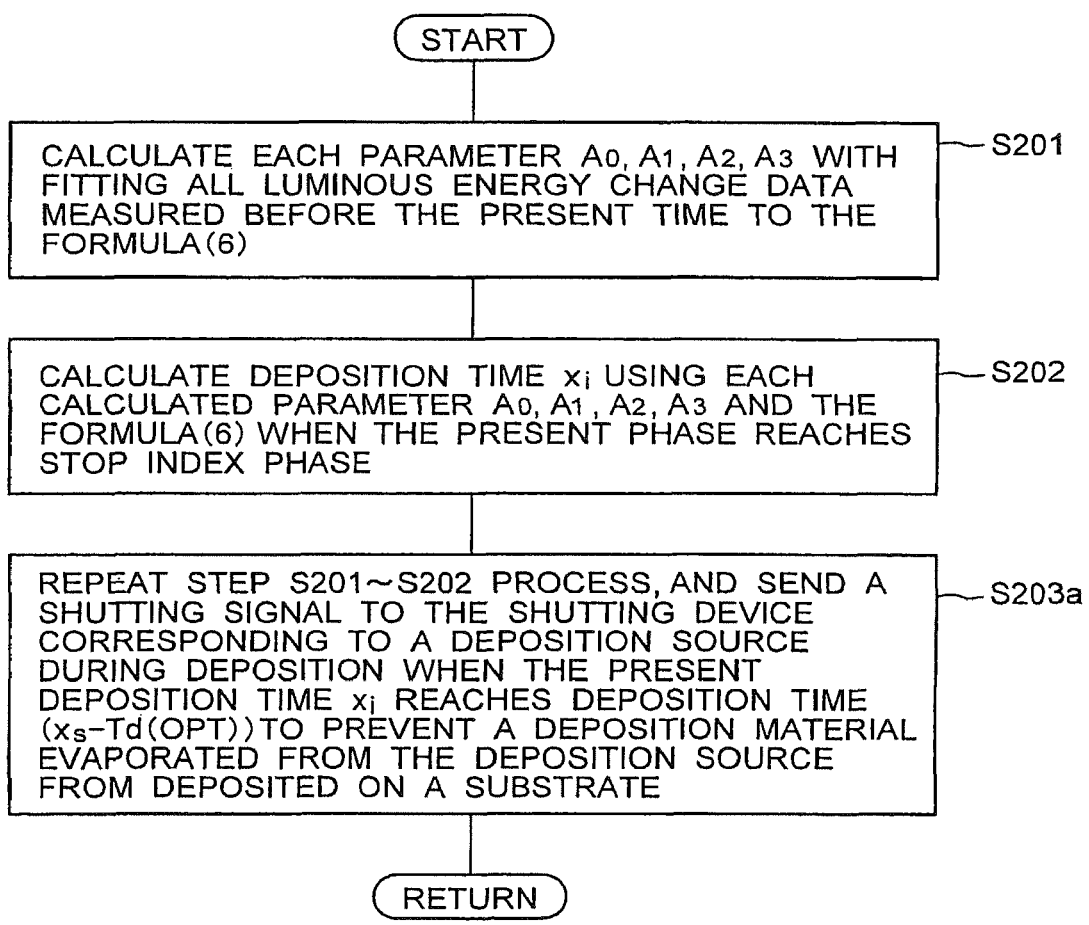
FIG. 23 is a flow chart for illustrating an example of a thin film deposition control process by the control apparatus in the third embodiment.

As shown in FIG. 23, the computer 141 performs the fitting as described in the equation (6) stored in the theoretical data file 145 of the memory 142 with using the optical intensity change data $\{x_k, t_k\}$ based on all the optical intensity signals measured before the present time $x_i$ in the corresponding thin film layer $L_j$ stored in the memory 142, and calculates each parameter $A_0, A_1, A_2$ and $A_3$ of the equation (6). (FIG. 23 and Step S201.) The computer 141 calculates the deposition time $x_s$ when the present phase reaches the stop index phase value, that is, the $x_s$ calculated based on the condition that $(A_2 x_s + A_3)$ becomes the above mentioned stop index phase value (Step S202). The condition of deposition starting time is $x=0$.)

The computer 141 repeats the process from the Step S201 to the Step S202, and when the present time $x_i$ reaches the time $(x_s-Td(OPT))$ which is the delay time (OPT) before the deposition time $x_s$, the computer 141 sends the shutting signal to the shutter device 122a2 corresponding to the deposition material source 113a2 under deposition so as to prevent the deposition material evaporated from the deposition material source 113a2 from deposited on the substrate 116 (Step S203a).

Figure 24:
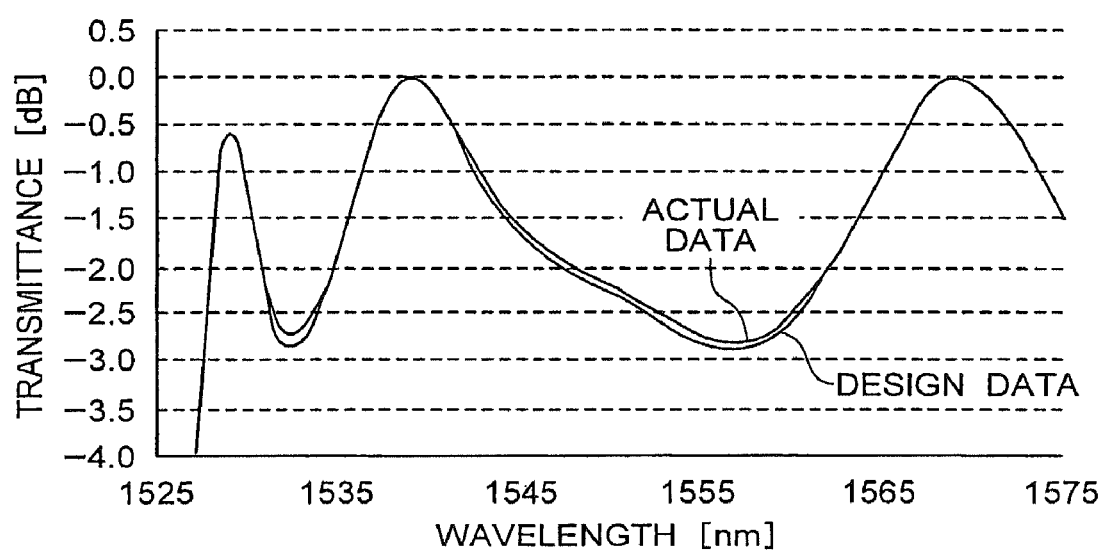
FIG. 24 is a graph for illustrating a design profile data and an actual profile data for the multi-layer thin film filter actually deposited by the thin film control process as shown in FIG. 23.

FIG. 24 shows the interrelation between the design profile data of the multi-layer thin film filter actually deposited by the deposition process as shown in FIG. 23 and the actual profile data. As show in FIG. 24, the both profiles are similar and the difference is only 0.23 dB.

If the transmission loss difference (2.514 dB) of FIG. 46 and the transmission loss difference (0.32 dB) of FIG. 24 is compared, it is clear that the transmission loss difference can be remarkably improved by the deposition control method of this embodiment.

As mentioned above, even if there is any thin film thickness error in the optical thin films actually deposited by plural causes such as the optical time constant, the delay of signal processing, the effects of mechanical movement and the effects of turning around, the computer can estimate this thin film thickness error from the optical profile data of the multi-layer thin film filter which is actually deposited, and adjust the deposition time according to the estimated thin film thickness error in the third embodiment.

Therefore even the obtained transmission loss difference can be maintained in high level without affected by the thin film thickness error even if the thin film thickness error occurs.

Though the deposition time is adjusted according to the estimated errors in the third embodiment, the present invention is not limited to this embodiment, and for example it is possible to adjust design thin film thickness of each layer by compensating the estimated errors.

Though the theoretical equation data DT that expresses the transmitted optical intensity change in the function of the deposition time as the theoretical equation data corresponding to the phase control method in the second and third embodiment, the present invention is not limited to it.

Figure 17:
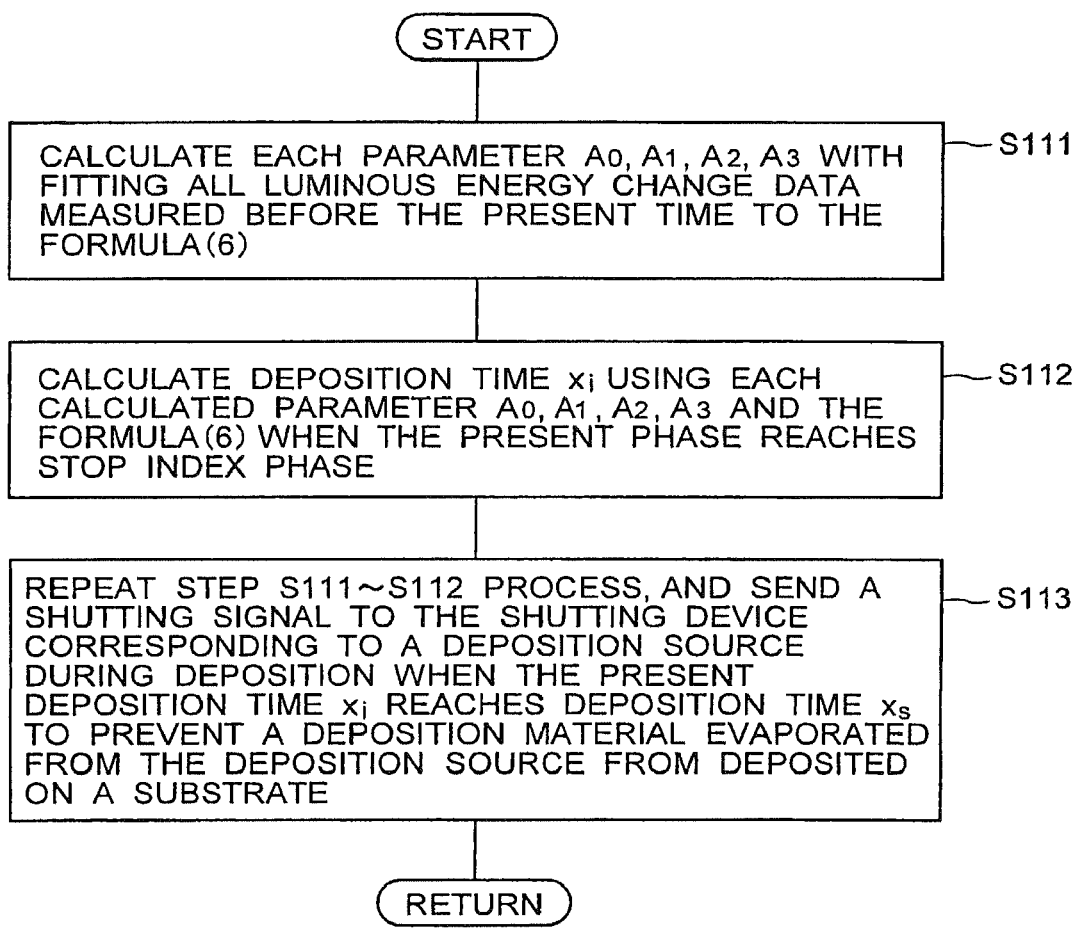
FIG. 17 is a flow chart for illustrating an example of a thin film deposition control process by the control apparatus as shown in FIG. 2.
Figure 18:
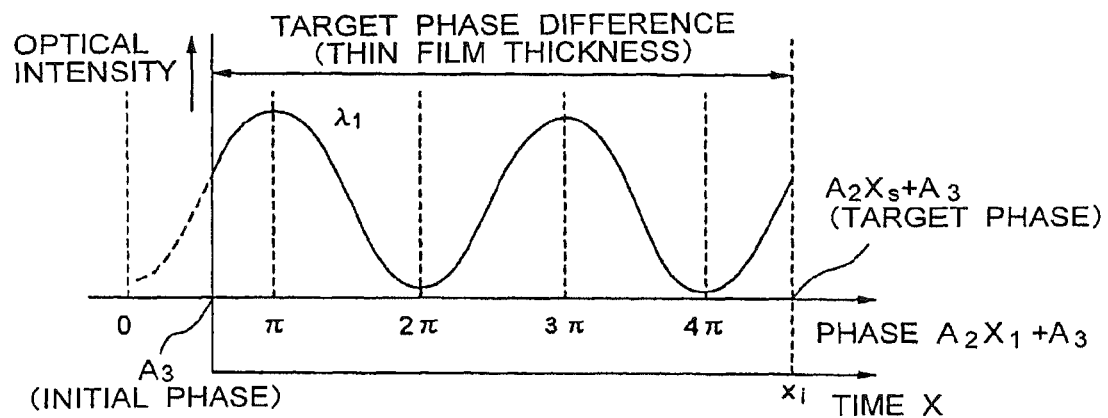
FIG. 18 is a graph for explaining a stop index phase value for the second embodiment.

Therefore when the deposition control is performed with using proportion of the B/A between the range of the optical intensity change A and the change from the extremal value of the corresponding stop optical intensity, the thin film thickness error (the optimized delay time) corresponding to the B/A control method can be estimated by storing the theoretical equation data corresponding to the functional equation which expresses the B/A theoretically in the theoretical formula data file 145, and performing the process as shown in FIG. 17, FIG. 19, FIG. 21 and the like with using the theoretical equation data.

Though the above mentioned monitoring light wavelength determining process and the deposition control process is performed by only one computer in this embodiment, it can be performed by plural computers.

Though the transmission light through the thin film F and the substrate 116 is used for a monitoring light in this embodiment, the present invention is not limited to the above mentioned embodiment, and it is also possible to use the light reflecting from the thin film F for a monitoring light.

The Fourth Embodiment

Figure 25:
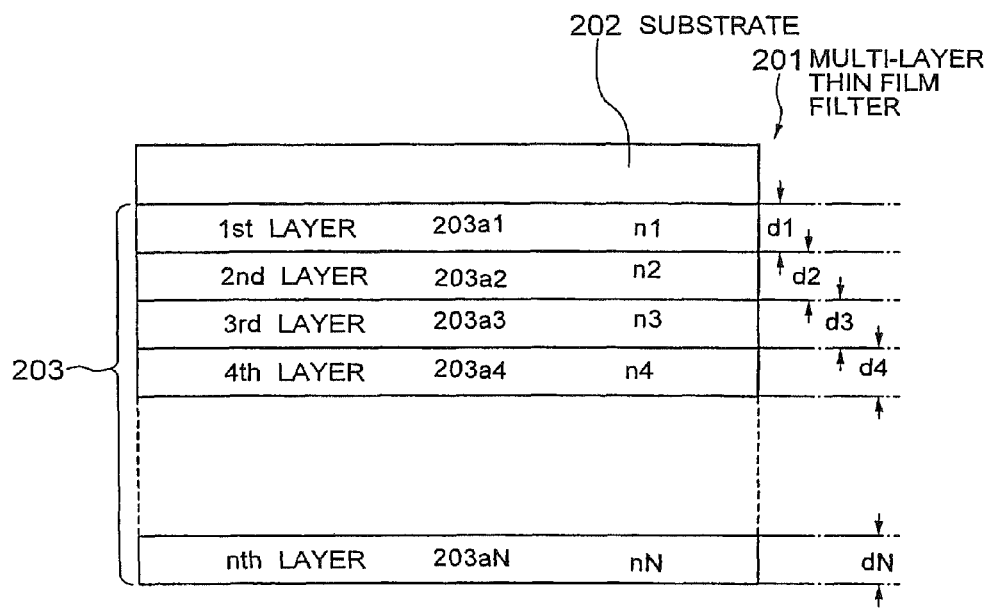
FIG. 25 is a multi-layer thin film filter in the fourth embodiment.

The fourth embodiment of the present invention is explained with referring to drawings. FIG. 25 illustrates a multi-layer thin film filter 201 of the fourth embodiment.

As shown in FIG. 25, the multi-layer thin film filter 201 includes a substrate 202 and plural layers of thin films (the first layer 203a1 to the $N^{th}$ layer 203aN), for example, deposited by vaporizing, spattering and the like. The index of refraction of the thin film material for the cardinal number of layers from the substrate 202 (the first layer 203a1, the third layer 203a3, . . . , the 2N−1 layer 203 2N−1, . . . ) is different from the index of refraction of the thin film material for the even number of layers from the substrate 202 (the second layer 203a2, the fourth layer 203a4, . . . , the 2N layer 203 2N, . . . ) in plural thin film layers from 203a1 to 203aN.

Each layer of plural thin films which composes the thin film layer 3, that is, the optical thin film thickness which is calculated by multiplying the physical thin film thickness from d1 to dN of the first layer 203a1 to the $N^{th}$ layer 203aN and the index of refraction n1 to nN together, is precisely designed according to a thin film thickness design process to be explained later.

Figure 26:
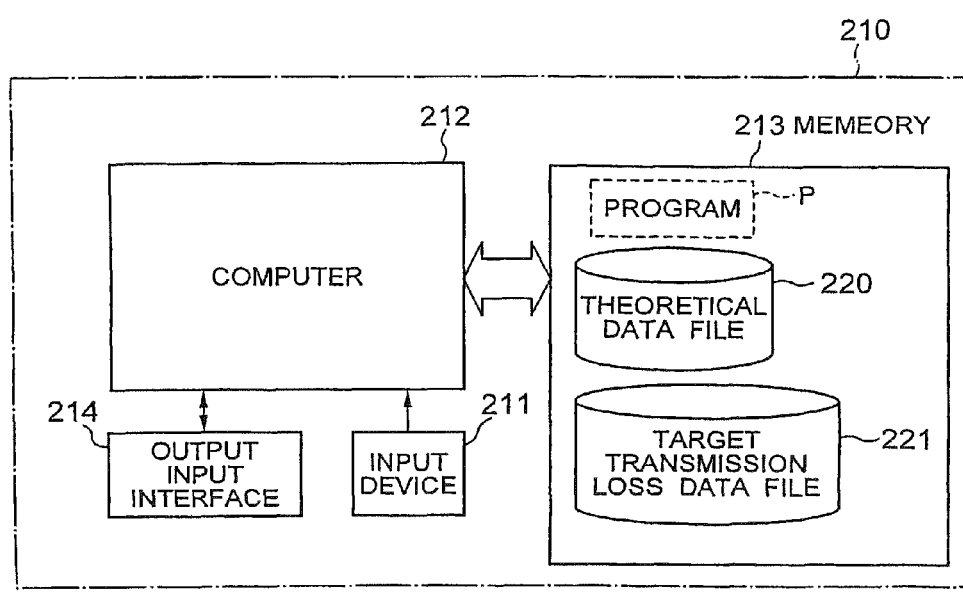
FIG. 26 is a block diagram for illustrating a configuration of hardware of a thin film design apparatus so as to design an optical thin film thickness of each thin film layer for a multi-layer thin film filter in the fourth embodiment.

FIG. 26 shows configuration of the hardware of the thin film thickness design device 210 to design the optical thin film thickness of each layer 203a1 to 203aN for the multi-layer thin film filter 201.

As shown in FIG. 26, the thin film thickness design apparatus 210 is a computer system and includes an input device 211 in which a designer operates and inputs information, a computer 212 connected to the input device 211, a memory 213 connected to the computer 212 to enable data communication and to store in advance the program P to perform a thin film thickness design process to be explained later, and an external input/output interface 214 to perform the interface process regarding the input and output to/from the external. A semiconductor memory, a magnetic memory and the like are available for the storage medium.

The memory 213 has the theoretical equation data file 220 including the theoretical equation data to express the theoretical value of transmission rate for the continuous wavelength of N layers of multi-layer thin film filter 201, and the target transmission loss data file 221 which stores the target transmission loss (the target value) required for the GFF and the target transmission loss (the transmission rate: for example, −1 dB or more) in the pump light transmission wavelength (for example, 1460 nm to 1495 nm).

The theoretical equation data stored in the theoretical equation data file 220 is hereinafter explained.

The theoretical equation of the transmission rate for the N layers of thin film filter 201 using the optical thin film thickness of each layer from 203a1 to 203aN as a parameter is calculated by the equation (1) to (5) specified in the first embodiment based on the condition that the projected light angle is vertical to the film surface of the multi-layer thin film filter 201.

Then the theoretical value of the transmission rate in continuous wavelength of the N continuous layers of the thin film filter 201 is calculated using the optical thin film thickness of the j layer as a parameter, and the transmission loss can be expressed with using the optical thin film thickness and wavelength as a parameter if the transmission rate is converted into the transmission loss (the input loss).

Therefore the theoretical equation to express the above mentioned transmission loss (the input loss) IL is stored in the theoretical equation data file 221 as a theoretical equation data DA.

Figure 27:
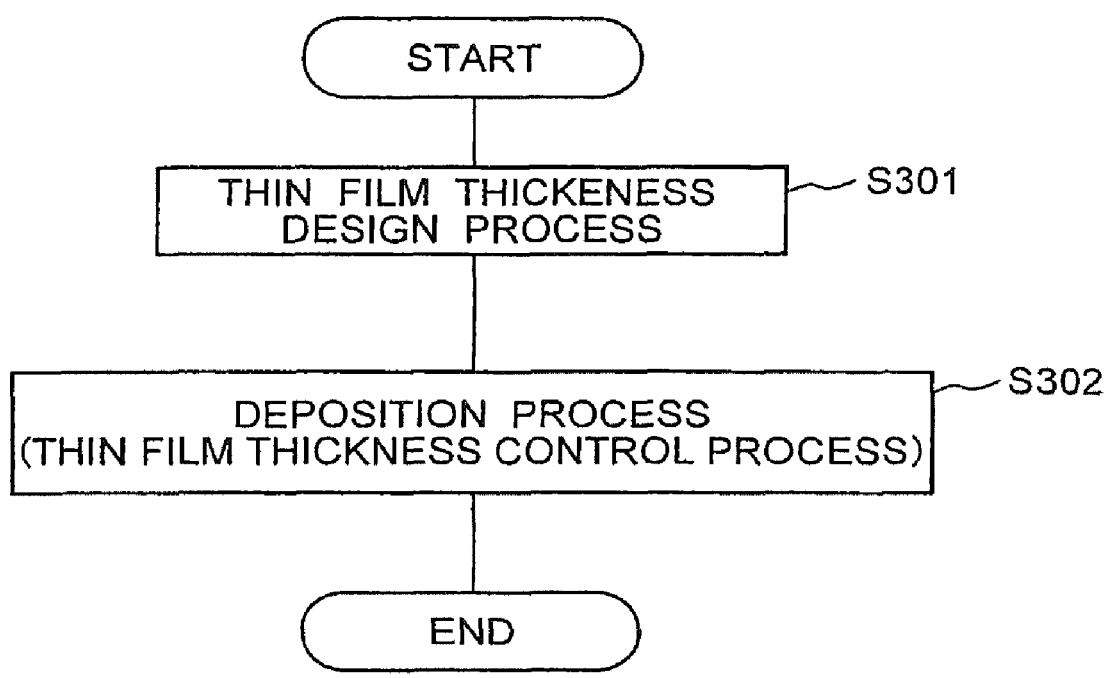
FIG. 27 is a flow chart for illustrating an example of a production process of a multi-layer thin film filter in the fourth embodiment.

Total movement of this embodiment is explained. As shown in FIG. 27, the optical thin film thickness of each layer from 203a1 to 203aN of the multi-layer thin film filter 201 is at first designed when the multi-layer thin film filter 201 is produced (Step S301).

Therefore a designer inputs the target transmission loss (data) $IL(\lambda_i)$ into the computer 212 through the input device 211 of the thin film thickness design apparatus. The target transmission loss (data) $IL(\lambda_i)$ expresses the target transmission loss profile of the pump light and the target transmission loss profile of the GFF respectively, and target transmission loss (data) $IL(\lambda_i)$ is the nominal transmission loss for the above mentioned pump light transmission and for the GFF against each discontinuous wavelength $\lambda_i$ (I=1, 2, 3, ..., N−1, N) including the target profile wavelength band (for example 1460 nm to 1495 nm) of the pump light and the target profile wavelength band (for example 1530 nm to 1560 nm).

Further more, a designer inputs an initial value (the thin film thickness) of the group (matrix) of the optical thin film thickness parameters (hereinafter called the thin film thickness parameter) a so that the cutting off band of the transmission loss profile in the above mentioned profile wavelength band corresponding to the initial value (the thin film thickness) does not cover the pump light transmission wavelength band (1460 nm to 1495 nm) (Step S301).

Figure 28:
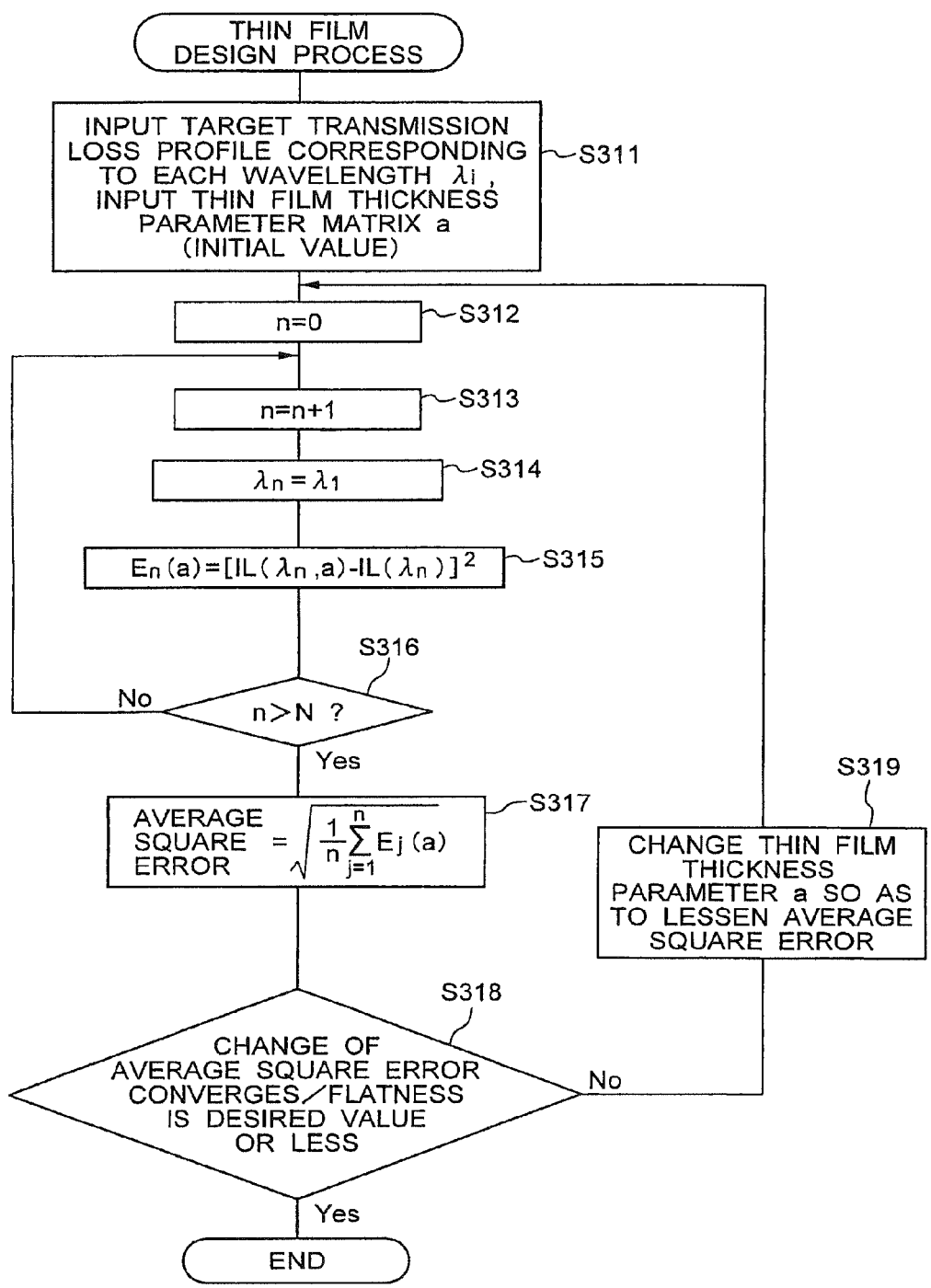
FIG. 28 is a flow chart for illustrating an example of a thin film design process in the fourth embodiment.

As shown in FIG. 28, the computer 212 performs according to the program P, and receives the input target transmission loss profile $IL(\lambda_i)$ and the thin film thickness parameter a (the initial value). The computer 212 stores the group of the thin film thickness parameters a in the memory 213 and stores the input target transmission loss profile $IL(\lambda_i)$ in the target transmission loss data file 221 (Step S311).

Figure 29:
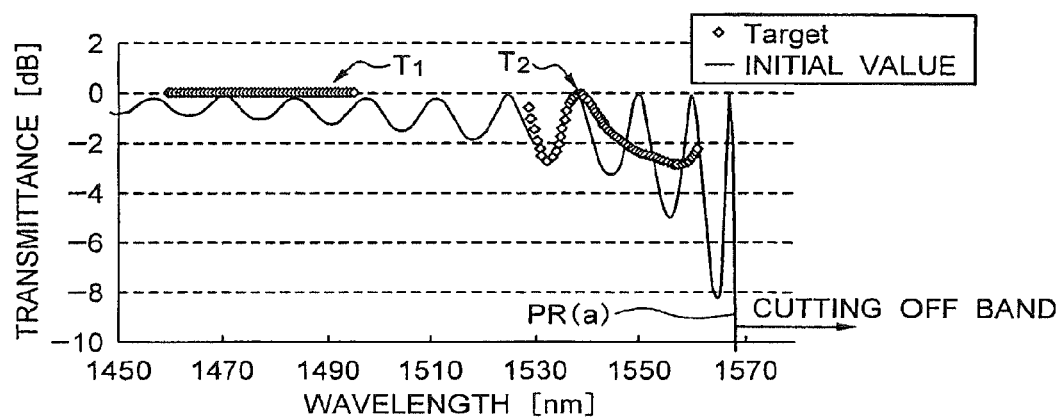
FIG. 29 is a graph for illustrating a target transmission loss profile of pumping light in a profile wavelength band of the fourth embodiment, a target transmission loss profile for a GFF, and a transmission loss profile corresponding to an initial value of an optical thin film thickness.

FIG. 29 is a graph to illustrate the target transmission loss profile (the target transmission profile) T1 of the pump light in the profile wavelength band, the target transmission loss profile of the GFF T2 and the transmission loss profile PR (a) corresponding to the initial value of the optical thin film thickness.

Therefore as shown in FIG. 29, it is clear that the cutting off band of the transmission loss profile PR (a) corresponding to the initial value a of the optical thin film thickness does not overlap the pump light transmission wavelength band (1460 nm to 1495 nm) if the edge of shorter wavelength side of the cutting off band is set as an initial value of the transmission loss profile of the GFF.

Additionally the computer 212 sets zero in the variable n (Step S312), and add one to the variable n (the increment)

(Step S313), and sets $\lambda_i$ in the parameter $\lambda_n$ of the profile wavelength band. $\lambda_n$ currently becomes $\lambda_i$ because the present condition is that n equals one. (Step S314)

The computer 212 reads the theoretical data stored in the theoretical equation data file 221 of the memory 42 and inputs the group (matrix) of the optical thin film thickness parameters a (the initial value) in the read theoretical equation data DA. The computer 212 calculates the input transmission loss $IL(\lambda_i, a)$ of the multi-layer thin films 203 with using the group (matrix) of the optical thin film thickness parameters a and the wavelength $\lambda_i$ as variables. Then the computer 21 calculates the square error $E_n$ between the input transmission loss $IL(\lambda_n, a)$ of the multi-layers thin films 203 and the target transmission loss $IL(\lambda_n)$ of total multi-layer thin films 203 at the corresponding wavelength of $\lambda_n$ with using the following equation:

$$E_n(a) = \{IL(\lambda_n, a) - IL(\lambda_n)\}^2 \qquad (9)$$

And then the computer 212 stores the calculated $E_n(a)$ for the total multi-layers thin films 203 in the memory 213 (Step S315).

Additionally the computer 212 judges if n exceeds N (YES) or not (NO) (Step S316). The present condition is that n equals one. Therefore the computer 212 judges NO in the Step S316 and returns to the Step S313, and then re-calculates from the Step S104 with adding one to n (the increment).

The computer 141 repeats the above mentioned calculation from the Step S313 to Step S316 until n exceeds N, that is, until the process of the Step S315 is completed based on the condition that the wavelength parameter $\lambda_n$ equals $\lambda_N$.

As a result, the square error $E_n$ (a) between the theoretical transmission loss $IL(\lambda_n, a)$ in the total profile wavelength band at the thin film thickness parameter a (the initial value) of each layer 203a1 and the target transmission loss $IL(\lambda_n)$ at the corresponding to the wavelength $\lambda_n$ is calculated in each wavelength.

If n exceeds N, the judgment of the above mentioned Step S316 becomes YES, and the computer 212 calculates the average of the square error $E_n$ calculated in the total profile wavelength band for the total multi-layer thin films 203 with using the following equation (Step S317):

$$\text{average square error} = \sqrt{\frac{1}{n}\sum_{j=1}^{n} E_j(a)} \qquad (10)$$

Then the computer 212 judges if the average of the square error converges based on the average of the square error at the calculated wavelength parameter or the transmission loss error (the flatness) between the transmission loss $IL(\lambda_1$ to $\lambda_N$, a) of the total multi-layer thin films 203 with using the present optical thin film thickness a(1) to a(N) and the corresponding target transmission loss $IL(\lambda_1$ to $\lambda_N)$ becomes the setting value (for example, less than 1 dB) (Step S318).

If the result of the Step S318 is NO (in the case that the average of the square error does not converge, or the difference of the transmission loss exceeds the certain value), the computer 212 changes the group (matrix) of the optical thin film thickness parameters a of at least one layer in the optical thin film layer from 203a1 to 203aN (Step S319), and returns to the process of the Step S312, and repeats the fitting process from the Step S312 to the S319 until the judgment of the Step S318 becomes YES.

Therefore the computer 212 repeats the fitting process from the Step S312 to the S319 with changing the thin film thickness parameter a of the optical thin film layer from 203a1 to 203aN by each layer until the transmission loss IL($\lambda_1$ to $\lambda_N$, a(1) to a(N)) of the total multi-layer thin films 203 with using the present optical thin film thickness a(1) to a(N) becomes close enough to the corresponding target transmission loss IL($\lambda_1$ to $\lambda_N$). When the average of the square error does not converge, or the difference of the transmission loss between the transmission loss IL($\lambda_1$ to $\lambda_N$, a(1) to a(N)) of the total multi-layer thin films 203 with using the present optical thin film thickness a(1) to a(N) and the target transmission loss IL($\lambda_1$ to $\lambda_N$) and the corresponding target transmission loss IL($\lambda_1$ to $\lambda_N$) becomes within the predetermined value (The Step S318 becomes YES.), the fitting process is completed.

The above mentioned fitting process can be performed sufficiently because the cutting off band of the transmission loss profile PR(a) corresponding to the initial value of the optical thin film thickness does not overlap the pump light transmission wavelength band (1460 nm to 1495 nm) in this embodiment.

For example, the fitting process can be performed sufficiently for the GFF if the center wavelength is set in the center of the wavelength band (1529 nm to 1561 nm) for the transmission loss profile of the GFF and the transmission loss profile PR(b) corresponding to the initial value of the optical thin film thickness is set as a target transmission loss profile T2 at the edge of the longer wavelength side of the cutting off band.

Figure 30:
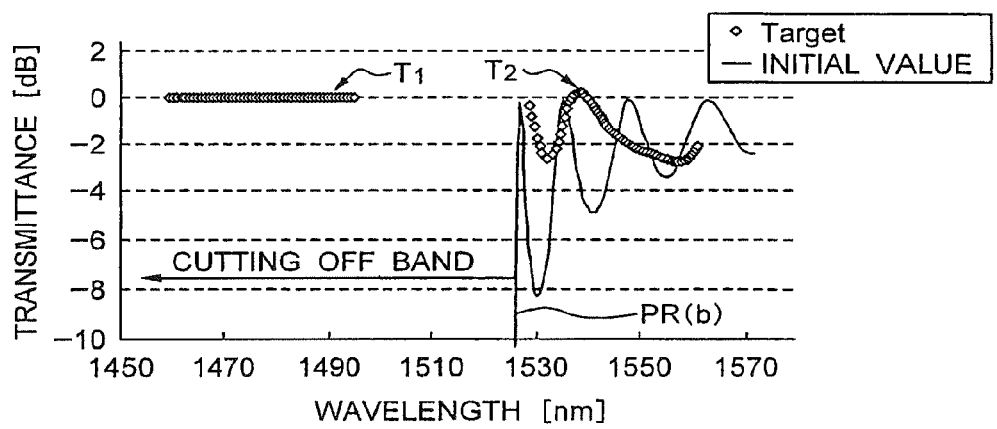
FIG. 30 is a graph for illustrating a target transmission loss profile of a pump light in a profile wavelength band, a target transmission loss profile of a GFF, and a transmission loss profile corresponding to an initial value of an optical thin film thickness in the fourth embodiment.

However the fitting in the pump light transmission wavelength band is difficult because the cutting off band overlaps the pump light transmission wavelength band (1460 nm to 1495 nm) as shown in FIG. 30 if the same initial value as the above mentioned normal GFF is set.

Therefore the fitting process is performed sufficiently even in the pump light transmission wavelength band as well as the transmission loss profile of the GFF with using the value for the cutting off band without overlapping the pump light transmission wavelength band (1460 nm to 1495 nm) as an initial value of each optical thin film thickness as explained in this embodiment.

The computer 212 stores the optimized group of the thin film thickness parameters (the matrix) a for each layer, that is, each group of optical thin film thickness parameter (the matrix) a which is designed sufficiently for each layer from 203a1 to 203aN is stored in the memory 213.

After the group of optical thin film thickness (the matrix) parameter a is designed for each layer from 203a1 to 203aN, the deposition process is performed with the deposition control with using the group of optical thin film thickness (the matrix) parameter a which is designed sufficiently. (Step S302)

The deposition material is deposited on the deposition substrate 202 by vaporizing or spattering. The deposition control is performed so that the optical thin film thickness of the thin film during deposition can correspond to the optical thin film thickness designed sufficiently by projecting the monitoring light to the thin film during deposition and for example monitoring the transmitted light. This deposition process (the deposition control process) is performed by the deposition apparatus including the computer based on the above mentioned group of optical thin film thickness (the matrix) a.

As mentioned above, the initial value of each optical thin film thickness is set so that the cutting off band of the transmission loss profile based on the initial value does not overlap the pump light transmission wavelength band (1460 nm to 1495 nm), the step S313 to S314, S320 to S321, S315 to S316 (in the case that the wavelength parameter $\lambda_n$ is out of the pump light transmission wavelength band), the step S313 to S314, S320 to S321, S315 to S316 (in the case that the target transmission rate T($\lambda_n$) at wavelength parameter $\lambda_n$ does not exceed the minimum transmission rate data $T_{min}$ in the pump light transmission wavelength band), 1495 nm) and the edge of the shorter wavelength side of the cutting off band becomes the initial value of the transmission loss of the GFF part. Therefore the fitting process can be applied on the optical thin film thickness of each thin film layer from 203a1 to 203aN of the multi-layer thin film filter with using the target transmission loss profile T1 and the target transmission loss profile T2 of the GFF as a target. The multi-layer thin film filter 201 with multi function that has both the target transmission loss profile T1 of the above mentioned pump light and the target transmission loss profile T2 of the GFF can be provided.

Figure 31:
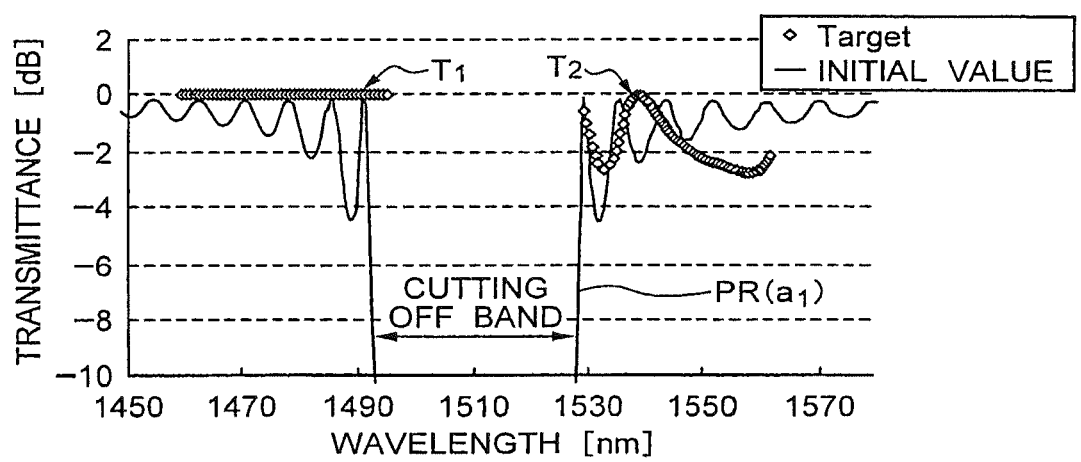
FIG. 31 is a graph for illustrating a target transmission loss profile of a pumping light in a profile wavelength band, a target transmission loss profile of a GFF, and a transmission loss profile corresponding to an initial value of an optical thin film thickness in the fourth embodiment.
Figure 32:
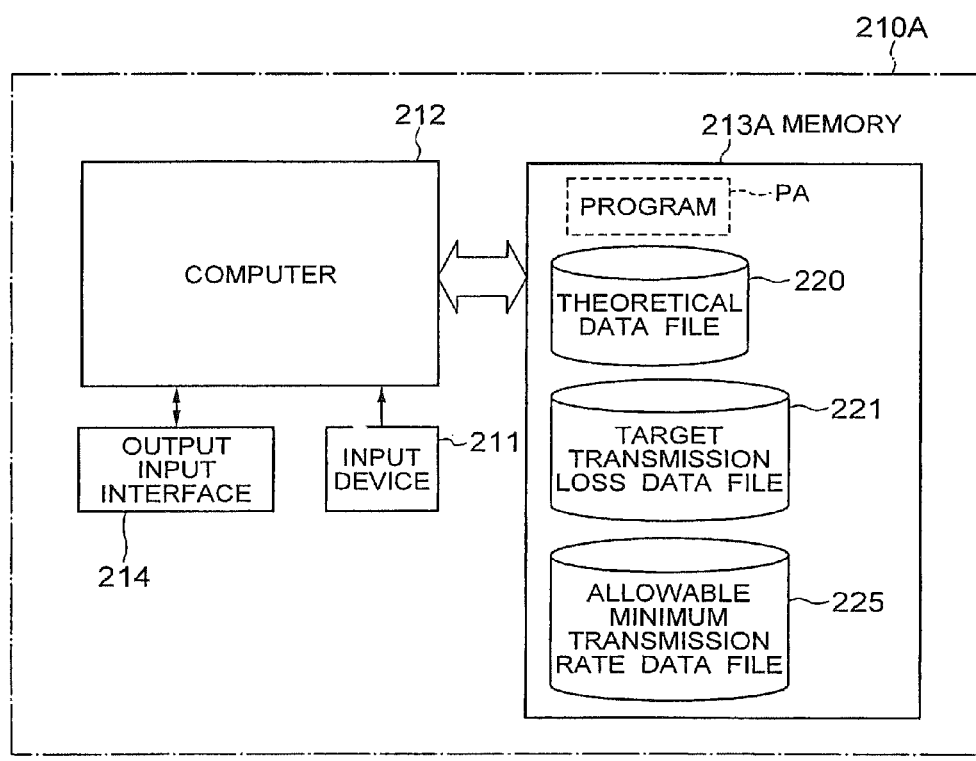
FIG. 32 is a block diagram for illustrating a configuration of hardware of a thin film thickness design apparatus to design an optical thin film thickness of each layer of a multi-layer thin film filter in the fifth embodiment.

It is possible that the initial value a1 can be set so that the cutting off band of the transmission loss profile PR (a1) based on the initial value a1 does not overlap the pump light transmission wavelength band (1460 nm to 1495 nm), and the center wavelength of the above mentioned transmission loss profile is set as the center of wavelength band for the transmission loss profile of the GFF as shown in FIG. 31, with increasing the optical thin film thickness of each layer and narrowing the cutting off band of the transmission loss profile in the fourth embodiment.

The Fifth Embodiment

The fifth embodiment of the present invention is explained with referring to drawings. The fifth embodiment is different from the fourth embodiment in the program PA to perform the thin film thickness design process and the thin film thickness design process performed by the computer 212 based on the program PA (Refer to FIG. 33.).

A memory 213A of the fifth embodiment stores in advance an allowable minimum transmission rate data file 225 including the minimum transmission rate data $T_{min}$ into which the allowable maximum input transmission loss $IL_{max}$ at the pump light transmission wavelength band (1460 nm to 1495 nm) is converted.

There is no difference between the fifth embodiment and the fourth embodiment in the other items. Therefore further explanation of the other items is skipped.

The computer 212 performs according to the program PA during the thin film thickness design process in the fifth embodiment and performs a process from S311 to S314 that is the same as the fourth embodiment.

The computer 212 judges if the parameter wavelength $\lambda_n$ is in the pump light transmission wavelength band (YES) or not (NO). (Step S320)

If the result of the judgment is NO, that is, the parameter wavelength $\lambda_n$ is not in the pump light transmission wavelength band, the computer 212 repeats the process from the Step S312 to the step S314 and the step S320, and from the step S315 to the step S316 which is the same as the fourth embodiment. In a result, the square error between the input transmission loss IL($\lambda_n$, a) of the total multi-layer thin film thickness 203 and the target transmission loss IL($\lambda_n$, a) of the total multi-layer thin film 203 at the corresponding wavelength $\lambda_n$ is calculated and stored in the memory 213.

On the other hand, if the result of judgment is YES, that is, the target transmission rate T($\lambda_n$) is the minimum transmission rate $T_{min}$ sorted in the allowable minimum transmission rate data file 225 or more, zero is set in this part of the square error $E_n$ (a). (Step S322)

Additionally the computer 212 moves to the process of the Step S316, and repeats the above mentioned the step S313, S314, S320, S315 to S316 (in the case that the wavelength parameter $\lambda_n$ is out of the pump light transmission wavelength band), the step S313 to S314, S320 to S321, S315 to S316 (in the case that the target transmission rate T($\lambda_n$) at wavelength parameter $\lambda_n$ does not exceed the minimum transmission rate data $T_{min}$ in the pump light transmission wavelength band), the step S313 to S314, and S320 to S322 (in the case that the target transmission rate T($\lambda_n$) at wavelength parameter $\lambda_n$ exceeds the minimum transmission rate data T$_{min}$ in the pump light transmission wavelength band) until n exceeds N.

If n exceeds N, the judgment of process of the step S316 becomes YES and the computer 212 calculates the average of the square error (difference) of E$_n$ (a) of the total multi-layer thin film 203 and stores it in the memory 213 (Step S317).

Then the computer 212 judges if the average of the square error converges based on the average of the square error at the calculated wavelength parameter a or the transmission loss error (the flatness) between the transmission loss IL($\lambda_1$ to $\lambda_N$, a) of the total multi-layer thin films 203 with using the present optical thin film thickness a(1) to a(N) and the corresponding target transmission loss IL($\lambda_1$ to $\lambda_N$) becomes the setting value (for example, less than 1 dB) (Step S318).

If the result of the Step S318 is NO (in the case that the average of the square error does not converge, or the difference of the transmission loss exceeds the certain value), the computer 212 changes the group (matrix) of the optical thin film thickness parameters a of at least one layer in the optical thin film layer 203a1 to 203aN (Step S319), and returns to the process of the Step S312, and repeats the fitting process from the Step S312 to the S319 until the judgment of the Step S318 becomes YES.

Therefore the computer 212 repeats the fitting process from the Step S312 to the S319 with changing the thin film thickness parameter a of the optical thin film layer from 203a1 to 203aN by each layer until the transmission loss IL($\lambda_1$ to $\lambda_N$, a(1) to a(N)) of the total multi-layer thin films 203 with using the present optical thin film thickness a(1) to a(N) becomes close enough to the corresponding target transmission loss IL($\lambda_1$ to $\lambda_N$). When the average of the square error does not converge, or the difference of the transmission loss between the transmission loss IL($\lambda_1$ to $\lambda_N$, a(1) to a(N)) of the total multi-layer thin films 203 with using the present optical thin film thickness a(1) to a(N) and target transmission loss IL($\lambda_1$ to $\lambda_N$) and the corresponding target transmission loss IL($\lambda_1$ to $\lambda_N$) becomes within the predetermined value (The Step S318 becomes YES.), the fitting process is completed.

If the target transmission rate T($\lambda_n$) exceeds the minimum transmission rate data T$_{min}$ in the pump light transmission wavelength band, the computer 212 compulsorily inputs zero to the square error (difference) between the input transmission loss IL($\lambda_n$, a) of the total multi-layer thin film 203 and the target transmission loss IL($\lambda_n$), and allows the difference (the ripple) of this part. The computer 212 allows the ripple in the pump light transmission wavelength band, and raises the fitting performance of other transmission loss band (for example, the transmission loss band of the GFF with the severer requirement.

Therefore the thin film thickness design apparatus 210A of this embodiment is especially effective in the case to require the sever specification for the flatness of the transmission loss profile of the GFF part.

Figure 34A:
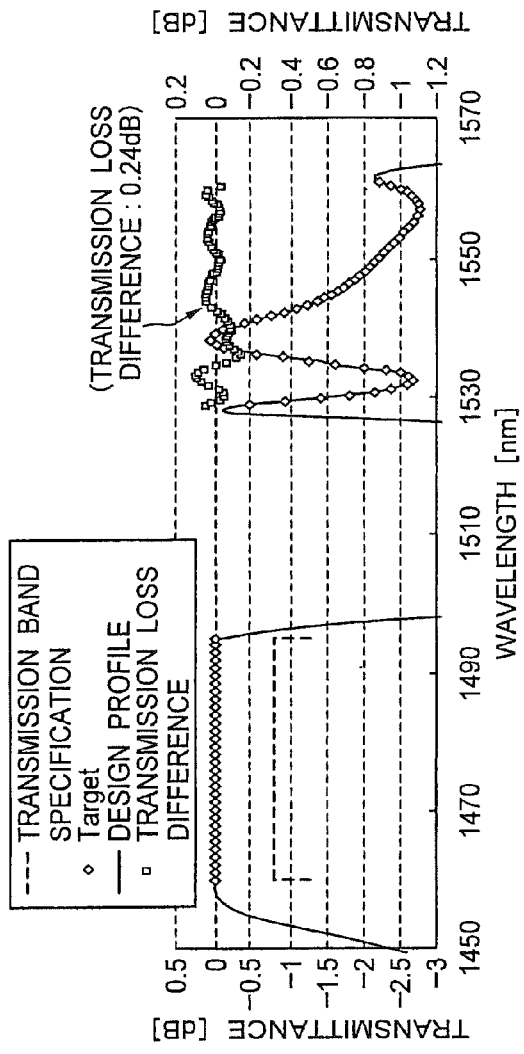
FIG. 34A is a graph for illustrating a design target transmission loss profile of a multi-layer thin film filter, a transmission loss profile based on a design value of a multi-layer thin film filter, and difference of transmission loss between a target value and a design value in the fourth embodiment.
Figures 35A, 35B:
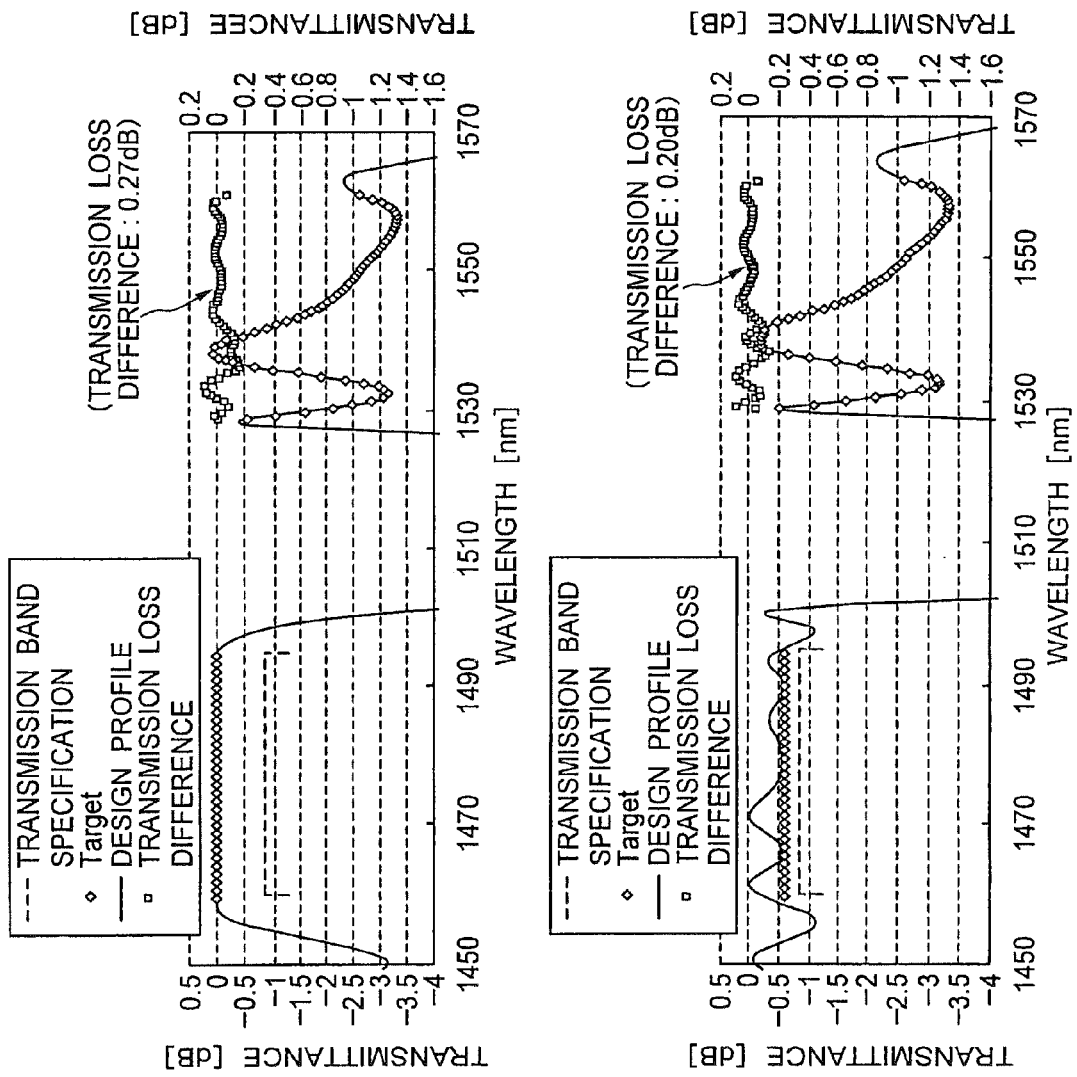
FIG. 35A is a graph for illustrating a design target transmission loss profile of a multi-layer thin film filter, a transmission loss profile based on a design value of a multi-layer thin film filter, and difference of transmission loss between a target value and a design value in the fourth embodiment.
FIG. 35B is a graph for illustrating a design target transmission loss profile of a multi-layer thin film filter, a transmission loss profile based on a design value of a multi-layer thin film filter, and difference of transmission loss between a target value and a design value in the fifth embodiment.

The multi-layer thin film filter 201 corresponding to the specification of the following table is actually designed by the multi-layer thin film design apparatus 210 of the fourth embodiment and the multi-layer thin film design apparatus 210A of the fifth embodiment respectively to verify the effect of these embodiments, and the result of the design is shown in FIGS. 34A & B and FIGS. 35A & B.

Total number N of layers for the multi-layer thin film as shown in FIGS. 34A & B and FIGS. 35A & B is different (The multi-layer thin film 201A as show in FIGS. 34A & B: N=46, the multi-layer thin film 201B as show in FIGS. 35A & B: N=26).

| Wavelength Band | Specification |
| --- | --- |
| GFF Profile/1529 nm to 1561 nm Pump Light Transmission Wavelength Profile: 1460 nm to 1495 nm | Designed Flatness: less than 0.2 dB Ripple in Design Transmission Band: less than 0.88 dB pp |

FIG. 34A shows the design target transmission loss profile of the multi-layer thin film filter 201A designed by the thin film thickness design apparatus 210 of the fourth embodiment (the GFF target and the target in the pump light transmission wavelength band: ◇ ), the loss profile (the solid line) based on the design value of the multi-layer thin film filter 210A, and the difference of the loss between the target value and the design value (□). 0 dB is set as a target in the pump light transmission wavelength band.

As shown in FIG. 34A, the flatness of the GFF part is 0.24 dB in the thin film thickness design of the fourth embodiment, which exceeds the desired flatness for the GFF part: less than 0.2 dB. As mentioned above, it is caused with the fitting process in the pump light transmission wavelength band.

Figure 34B:
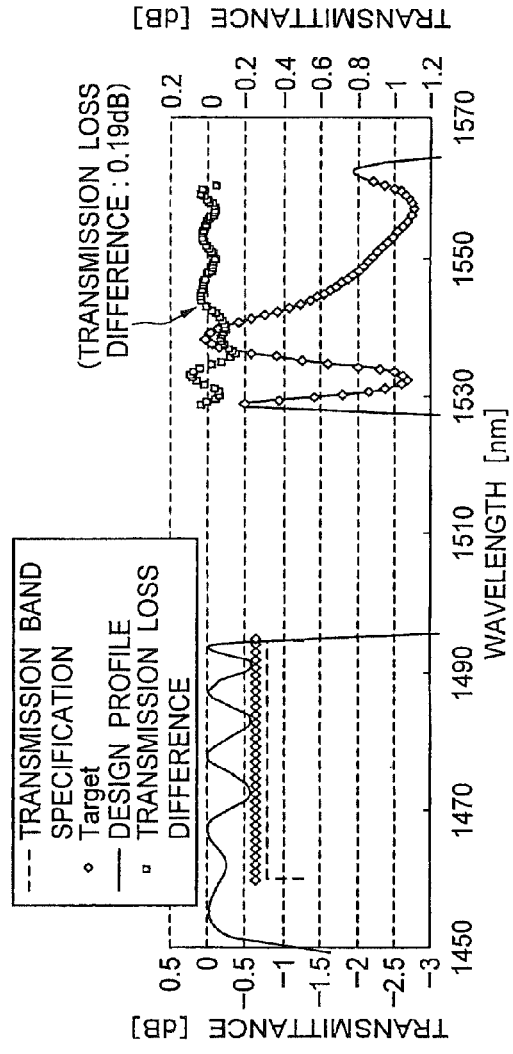
FIG. 34B is a graph for illustrating a design target transmission loss profile of a multi-layer thin film filter, a transmission loss based on a design value of a multi-layer thin film filter, and difference of transmission loss between a target value and a design value in the fifth embodiment.

On the other hand, FIG. 34B illustrates the design target transmission loss profile of the multi-layer thin film filter 201B designed by the thin film thickness design apparatus 210A of the fifth embodiment (the GFF target and the target in the pump light transmission wavelength band: ◇ ), the transmission loss profile (the solid line) based on the design value of the multi-layer thin film filter 210B, and the difference of the transmission loss between the target value and the design value (□). −0.6 dB is set for the target in the pump light transmission wavelength band. 0.6 dB is set for the maximum input transmission loss IL$_{max}$ (the minimum transmission rate T$_{min}$).

As shown in FIG. 34B, there is the ripple in the thin film thickness design of the fifth embodiment because the square error between the target value in the case that the transmission rate exceeds the minimum transmission rate T$_{min}$ and zero is set for the design value in the transmission loss profile (the solid line) based on the design value in the pump light transmission wavelength band. However the above mentioned specification is satisfied because the specification of this ripple part has a wide allowable range such as 0.8 dB pp between the local maximum value and the local minimum value (the peak to peak). Further more, the flatness of the GFF part becomes 0.19 dB, and it satisfies the condition that the flatness is 0.2 dB or less.

FIG. 35A illustrates a target design transmission loss profile of the multi-layer thin film filter 201B designed by the thin film thickness design apparatus 210 of the fourth embodiment (the GFF target and the target in the pump light transmission wavelength band: ◇ ), the loss profile (the solid line) based on the design value of the multi-layer thin film filter 210B, and the difference of the loss between the target value and the design value (□). 0 dB is set for the target in the pump light transmission wavelength band.

As shown in FIG. 35A, the flatness of the GFF part becomes 0.265 dB, and it cannot satisfy the condition that the flatness is 0.2 dB or less. This is also affected by the fitting in the pump light transmission wavelength band.

On the other hand, FIG. 35B illustrates the design target transmission loss profile of the multi-layer thin film filter 201B designed by the thin film thickness design apparatus 210A of the fifth embodiment (the GFF target and the target in the pump light transmission wavelength band: ◇ ), the loss profile (the solid line) based on the design value of the multi-layer thin film filter 210B, and the difference of the loss between the target value and the design value (□). −0.6 dB is set for the target in the pump light transmission wavelength band. 0.6 dB is set for the maximum input transmission loss $IL_{max}$ (the minimum transmission rate $T_{min}$).

As shown in FIG. 34B and FIG. 35B, regarding the thin film thickness design of the fifth embodiment, there is the ripple in the corresponding wavelength transmission band for the transmission loss (the solid line) based on the design value in the pump light transmission wavelength band. However the above mentioned specification is satisfied because the specification of this ripple part has a wide allowable range such as 0.8 dB pp between the local maximum value and the local minimum value (the peak to peak). Further more, the flatness of the GFF part becomes 0.19 dB, and it satisfies the condition that the flatness is 0.2 dB or less.

Figure 36:
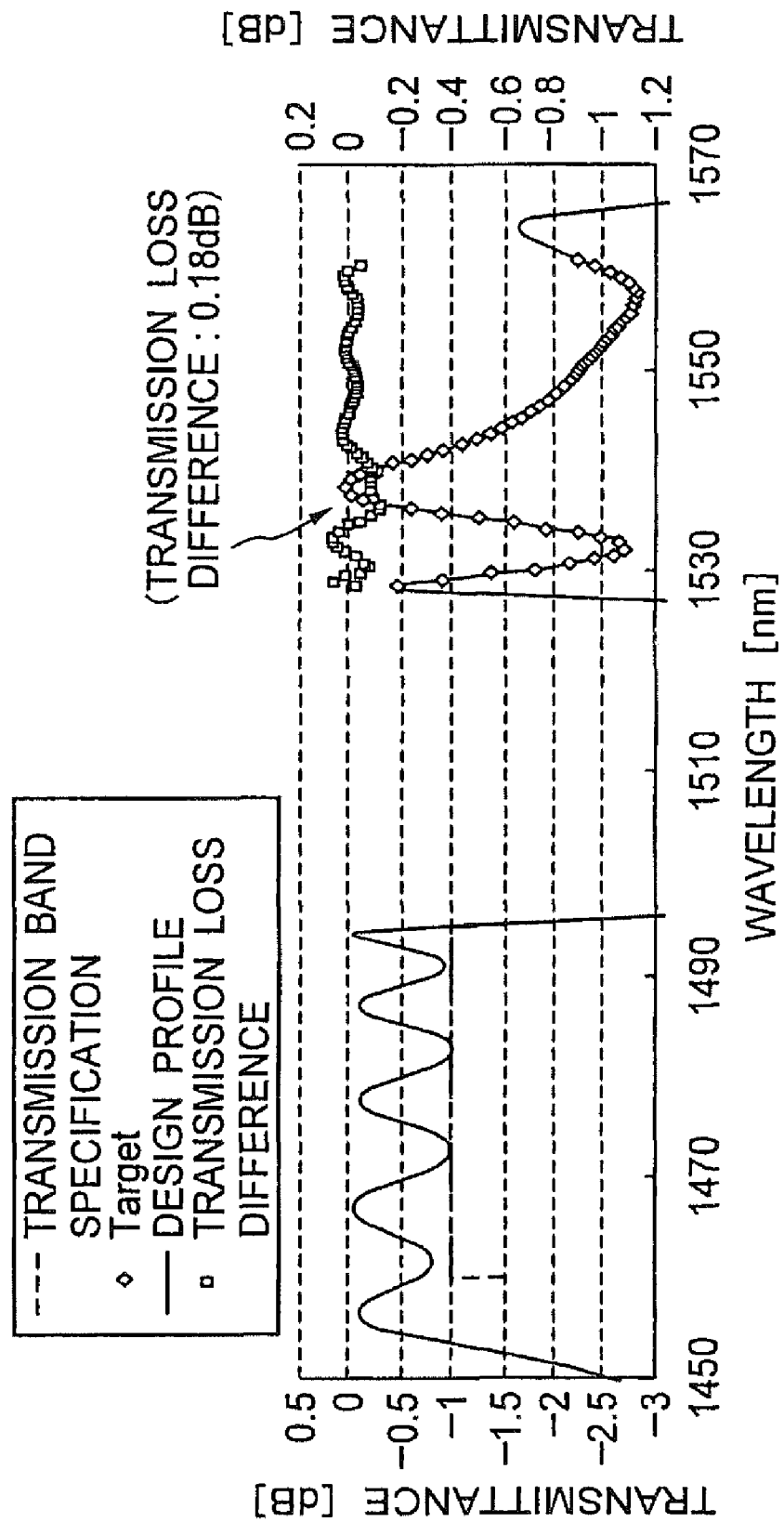
FIG. 36 is a graph for illustrating a design target transmission loss profile of a multi-layer thin film filter, a transmission loss profile based on a design value of a multi-layer thin film filter, and difference of transmission loss between a target value and a design value in the fifth embodiment.

If setting data of the allowable maximum input transmission loss $IL_{max}$ (the minimum transmission data $T_{min}$) in the pump light transmission wavelength band becomes larger (the minimum transmission data $T_{min}$ becomes larger) flexibility of the fitting for the thin film thickness is increased and the flatness profile is improved according to the thin film thickness design based on the thin film thickness design apparatus of this embodiment. If around 1 dB for the ripple of the transmission band is allowed, the flatness value is 0.18 dB and it is achieved to get the flatness profile which is the same level as that of the GFF which is designed normally without considering the pump light transmission, (Refer to FIG. 36.).

The transmission wavelength band is ranged from 1450 nm to 1495 nm in the fourth and fifth embodiment, however, the present invention is not limited to this band and it is possible to set the pump light transmission wavelength band in other wavelength band, for example, the band in which the pump light of 980 nm wavelength can be transmitted.

Figure 37A:
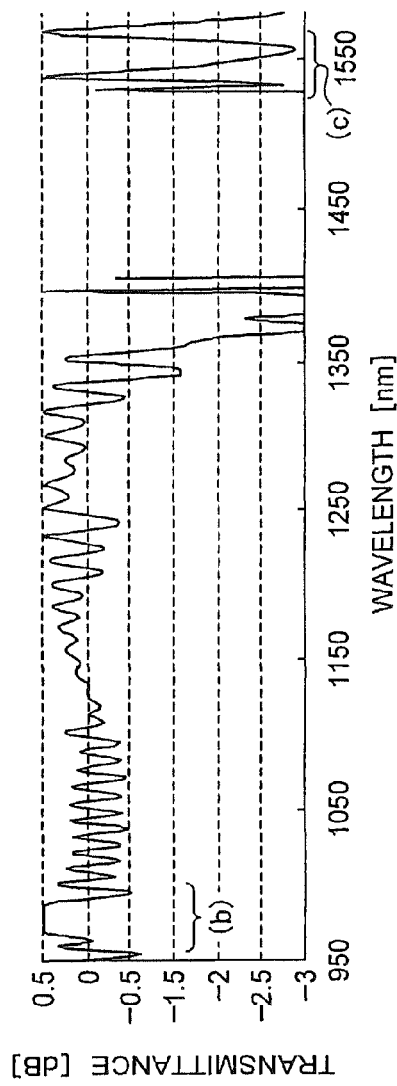
FIG. 37A is a graph for illustrating a desired optical transmission profile for a pumping light wavelength band of 980 nm band, and a transmission loss based on a design value of a multi-layer thin film filter which has a desired optical transmission loss profile in a GFF part.
Figure 37C:
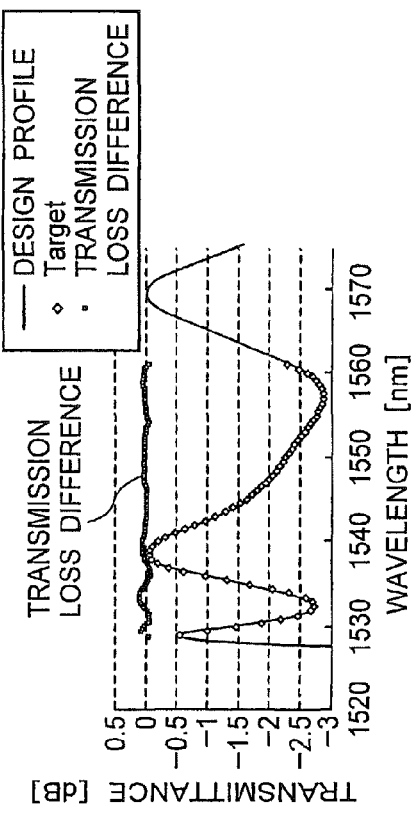
FIG. 37C is a graph for illustrating an enlargement of (c) of FIG. 37A.
Figure 37B:
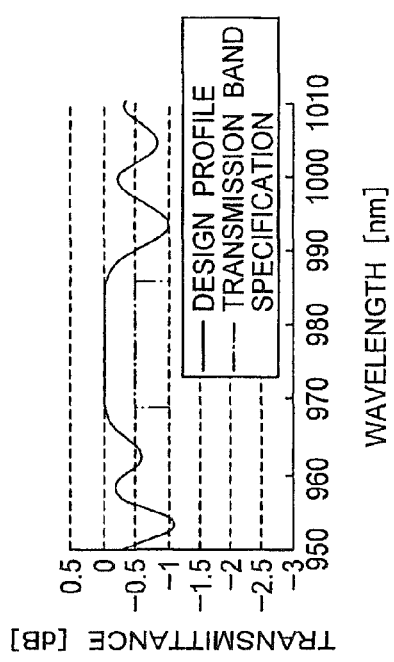
FIG. 37B is a graph for illustrating an enlargement of (b) of FIG. 37A.

FIG. 37A is a graph which illustrates the transmission loss profile (the solid line) based on the design value of the multi-layer thin film filter which has the predetermined transmission profile in the pump light wavelength band of the 980 nm band and the predetermined transmission loss profile in the GFF part (1520 nm to 1561 nm). FIG. 37B is a graph to show the part (b) of FIG. 37A, that is, a graph which enlarges the transmission profile around the above mentioned 980 nm band. FIG. 37C is a graph to show the part (c) of FIG. 37A, that is, a graph to enlarge the transmission profile of the above mentioned GFF part (1529 nm to 1561 nm).

As shown in FIG. 37A to FIG. 37C, the multi-layer thin film filter which has both the pump light transmission function and the gain equalizing function can be designed even if the pump transmission band is different.

Though the multi-layer thin film filter which has both the pump light transmission function to transmit the pump light, and the GFF function is designed in the fourth and fifth embodiment, the present invention is not limited to the embodiment, and the multi-layer thin film filter which has both the pump light cutting off function to cut off the pump light in the predetermined pump light cutting off band and the GFF function.

The allowable maximum transmission rate data file 225 including the maximum transmission rate data $T_{max}$ which is the transmission rate into which the allowable minimum input transmission loss $IL_{max}$ the pump light cutting off wavelength band (the cutting off wavelength band with the center wavelength of 1480 nm; for example 1460 nm to 1520 nm) is converted is stored in the memory 213A instead of or adding to the allowable minimum transmission rate data file 225 in the fifth embodiment.

The computer 212 judges if the target transmission rate $T(\lambda_n)$ into which the target transmission loss $IL(\lambda_n)$ is the maximum transmission rate data $T_{max}$ stored in the allowable maximum transmission rate data file 225 or less in the Step S321 of the thin film thickness design process as shown in FIG. 33 (Step S321).

If the judgment of the step S321 is NO, that is, the target transmission rate $T(\lambda_n)$ exceeds the maximum transmission rate $T_{max}$, the computer 212 performs the above mentioned step S315, and the square error $E_n(a)$ between the input transmission loss $IL(\lambda_n, a)$ of the total multi-layer thin film 203 and the target transmission loss $IL(\lambda_n)$ is calculated and stored in the memory 213.

On the other hand if the judgment of the step S321 is YES, that is, the target transmission rate $T(\lambda_n)$ does not exceed the maximum transmission rate $T_{max}$, zero is set for the square error $E_n(a)$ of this part. (Step S322)

Therefore if the target transmission rate $T(\lambda_n)$ is the maximum transmission rate $T_{max}$ or less in this example, the square error $E_n(a)$ between the input transmission loss $IL(\lambda_n, a)$ of the total multi-layer thin film 203 and zero is compulsorily set for the target transmission loss $IL(\lambda_n)$ so as 0 to improve the fitting performance.

Figure 38:
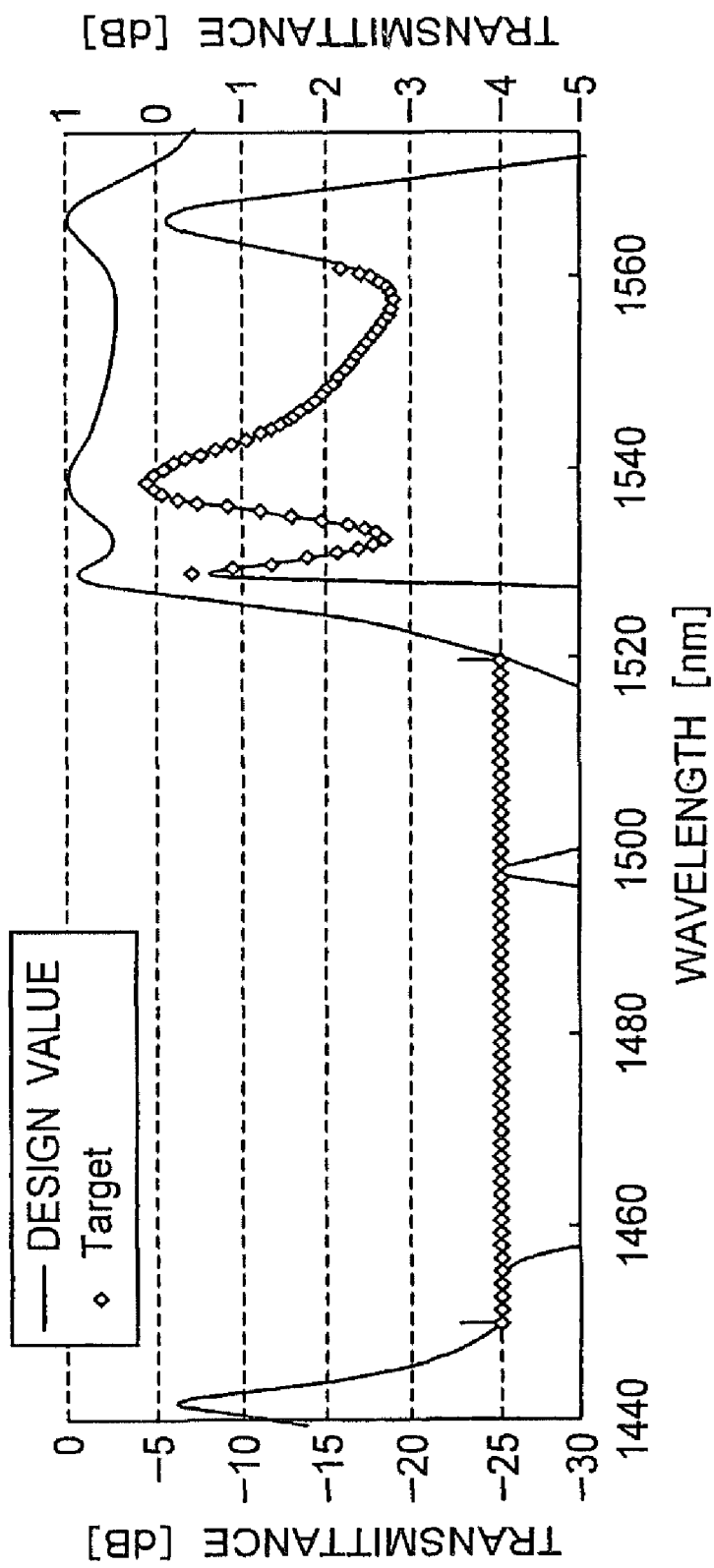
FIG. 38 is a graph a design target transmission loss profile of a multi-layer thin film filter that has both a pump light cutting off function and a GFF function, and a transmission loss profile based in a design result in a variation of the fifth embodiment.

As a result, as shown in FIG. 38, the multi-layer thin film filter which has both the pump light cutting off function and the GFF function can be provided even if there is the sever condition on the flatness of the transmission loss profile in the GFF part.

The embodiment of the optical amplifier including the GFF based on the multi-layer thin film 201 and 201A as explained in the fourth and fifth embodiment and other examples is hereinafter explained with using drawings.

Figure 39:
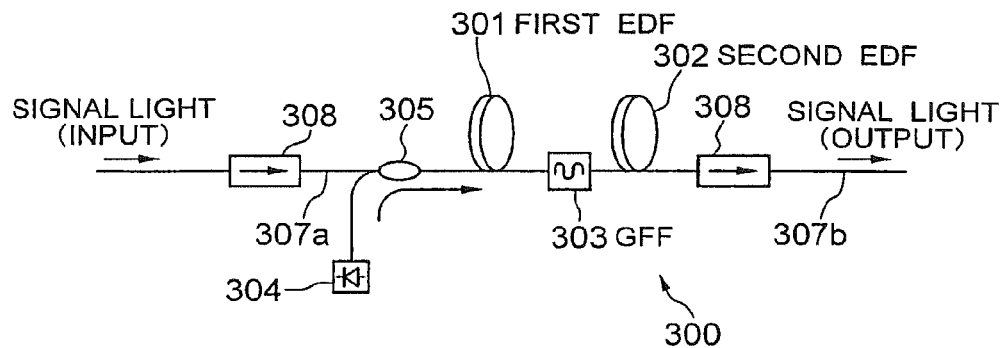
FIG. 39 is a schematic view for illustrating a configuration of a frontward excited type optical amplifier including a GFF based on a multi-layer thin film filter of the present invention.

FIG. 39 illustrates the configuration of a frontward excited type optical amplifier 300. As shown in FIG. 39, the optical amplifier 300 includes a first EDF 301 connected to optical fiber 307a into which optical signal is projected and consisting of optical fiber into which a rare earth element such as erbium is doped, a second EDF 302 connected the first EDF 301 in series and consisting of optical fiber into which a rare earth element such as erbium is doped, the multi-layer thin film filter of the present invention 201 connected between the first EDF 301 and the second EDF 302, the GFF 303 based on the multi-layer thin film filter of the present invention 201. The second EDF 302 and the GFF 303 are connected to the optical fiber 307b.

The optical amplifier including the EDF as an amplification medium into which erbium is doped as a dopant is explained in the embodiment of the above mentioned optical amplifier, however the present invention is not limited to the embodiment. The optical amplifier that has the similar configuration for the excitation is available. For example, for the amplifier medium, tellurite, fluoride, silica and the like is available for host grass of the optical fiber.

The optical amplifier 300 also includes a pumping light source 304 to project a pumping light (pump light) for the excitation of the EDF, and a collector 305 which supplies the pumping light projected by the pumping light source 304 to the first EDF 301 and the second EDF from the optical signal input side of the first EDF 301.

Further more, regarding the optical amplifier 300, an isolator 308 can be installed, if necessary, in at least one of the optical signal input side in the fiber 307a or in the fiber 307b. The isolators 308 are installed both in the optical fiber 307a and the optical fiber 307b in FIG. 39.

Figure 40:
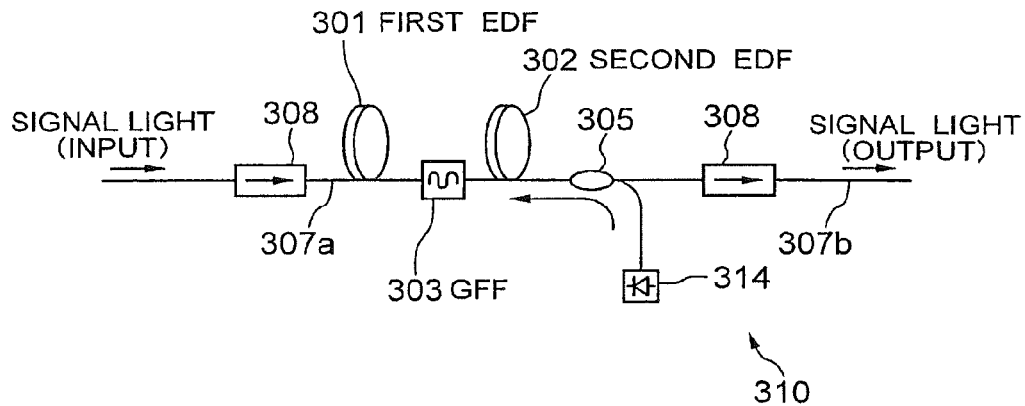
FIG. 40 is a schematic view for illustrating a configuration of a backward excited type optical amplifier including a GFF based on a multi-layer thin film filter of the present invention.

FIG. 40 illustrates the configuration of a backward excited type optical amplifier 310. Difference from the frontward excited type optical amplifier 300 as shown in FIG. 39 is that the pumping light is supplied from the optical signal output side of the second EDF 302. Therefore the optical amplifier 310 of backward excited type includes the collector 305 installed in the optical signal output side of the second EDF, an pumping light source 314 which projects the pumping light for the EDF excitation. The collector 305 supplies the pumping light projected by the pumping light source 314 to the second EDF 302 and the first EDF 301 from the optical signal output side of the second EDF 302.

Figure 41:
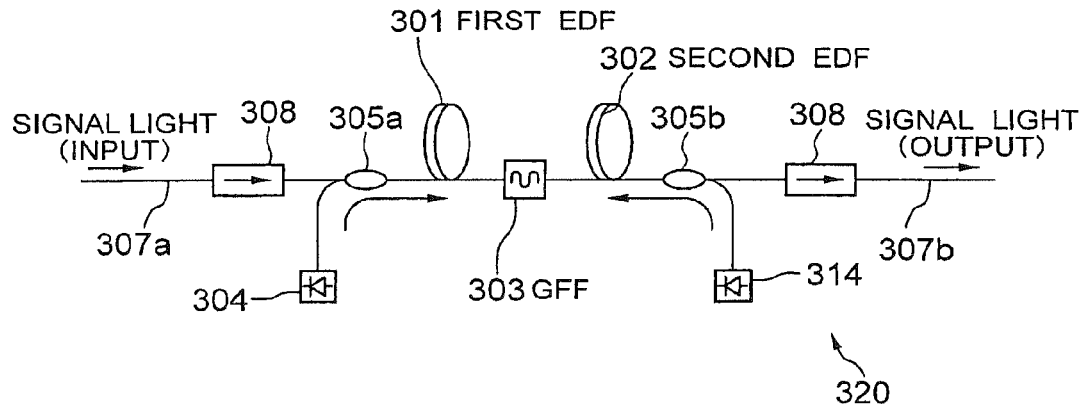
FIG. 41 is a schematic view for illustrating a configuration of a dual excited type optical amplifier including a GFF based on a multi-layer thin film filter of the present invention.

FIG. 41 illustrates the configuration of a dual excited type optical amplifier 320. As shown in FIG. 41, the dual excited type optical amplifier 320 has the configuration to combine the frontward excited type amplifier 300 as shown in FIG. 39 and the backward excited type amplifier 310 as shown in FIG. 40. Therefore the dual excited type amplifier 320 includes the pumping light source 304 to project the pumping light, the first collector 305a to supply the pumping light projected by the exited light source 304 to the first EDF 301 and the second EDF 302 from the optical signal input side of the first EDF 301, the second collector 305b to supply the pumping light projected by the exited light source 314 to and the second EDF 302 and the first EDF 301 from the optical signal output side of the second EDF 302.

Figure 42:
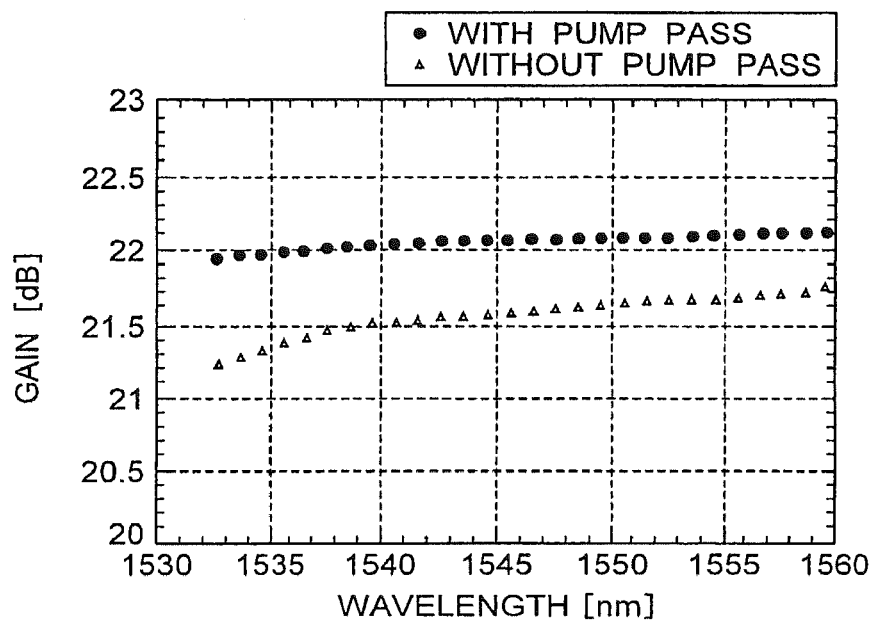
FIG. 42 is a graph for illustrating an interrelation between a gain and wavelength in the dual excited type optical amplifier as shown in FIG. 41.
Figure 43:
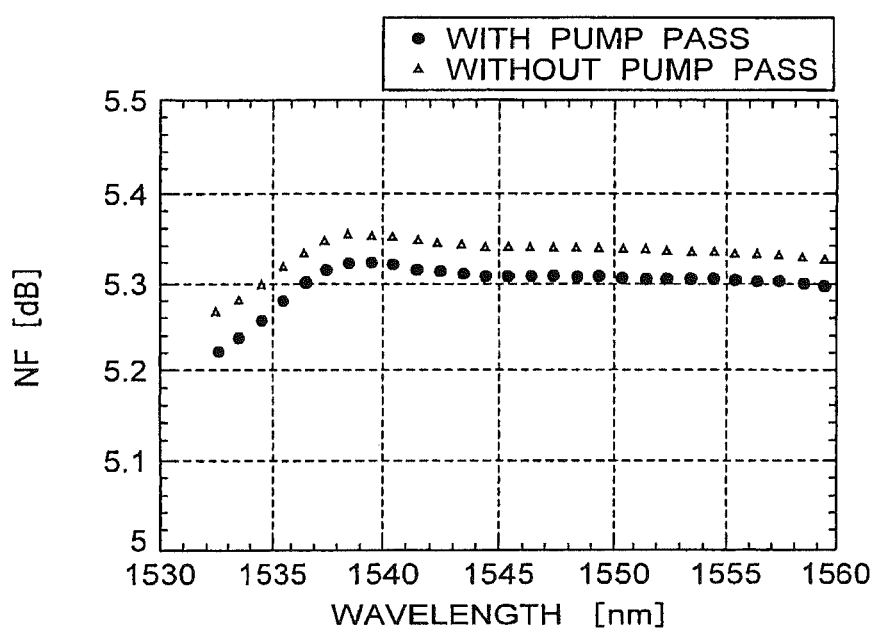
FIG. 43 is a graph for illustrating an interrelation between a Noise figure and wavelength in the dual excited type optical amplifier as shown in FIG. 41.

As shown from FIG. 39 to FIG. 41, the optical amplifier 300, 310 and 320 including the GFF 303 based on the multi-layer thin film filter 201 and 201A as explained in the fourth embodiment, the fifth embodiment and other examples of the present invention have the profile as shown in FIG. 42 and FIG. 43.

FIG. 42 is a graph for showing the correlation between the gain and the wavelength (the gain wavelength profile) of the dual excited type optical amplifier 320 as shown in FIG. 41. The wavelength profile of the gain (with the pump pass) of the optical amplifier 320 including the GFF 303 of the present invention is shown with "●" mark, and the wavelength profile of the gain (without the pump pass) of the optical amplifier not including the GFF 303 of the present invention is shown with "Δ" mark.

As shown in FIG. 42, the gain of the optical amplifier can increase by around 0.5 to 0.7 dB with applying the GFF 303 of the present invention.

FIG. 43 is a graph for showing a correlation between the noise figure NF and the wavelength of the dual excited type optical amplifier 320 as shown in FIG. 41. The wavelength profile of the NF (with the pump pass) of the optical amplifier 320 including the GFF 303 of the present invention is shown with "●" mark, and the wavelength profile of the NF (without the pump pass) of the optical amplifier not including the GFF 303 of the present invention is shown with "Δ" mark.

As shown in FIG. 43, the NF of the optical amplifier can be decrease by around 0.03 to 0.04 dB with applying the GFF 303 of the present invention.

Though the gain wavelength profile and the NF profile for the dual excited type optical amplifier 320 as shown in FIG. 41, FIG. 42 and FIG. 43, the frontward excited type optical amplifier 300 as shown in FIG. 39 and the backward excited type optical amplifier 310 as shown in FIG. 40 also have almost the same wavelength profile as the dual excited type optical amplifier 320. Therefore drawings and explanation is skipped.

As mentioned the above, the gain profile and the NF profile for the optical amplifier can be improved as well as effects of the GFF itself by installing the GFF based on the multi-layer thin film filter 201 and 201A of the present invention in the optical amplifier.

The embodiment of the wavelength division multiplexing system including an optical amplifier is hereinafter explained with using FIG. 39 (FIG. 40, FIG. 41).

Figure 44:
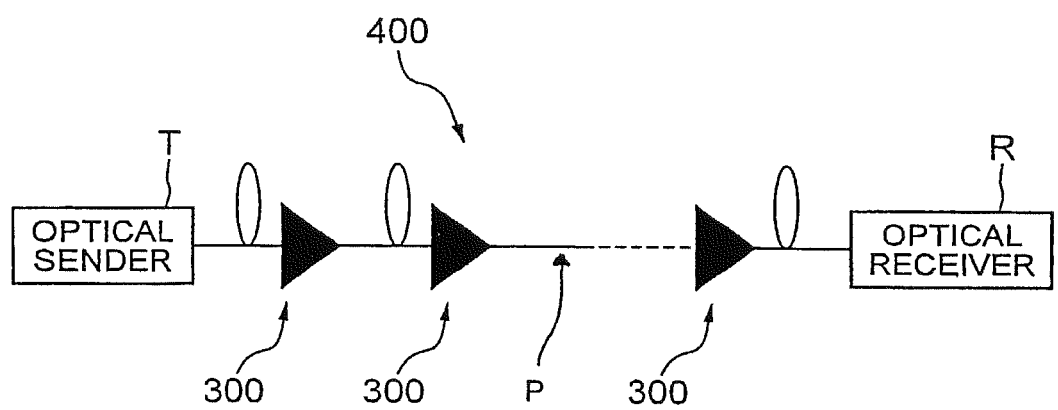
FIG. 44 is a block diagram for illustrating a configuration of a wavelength division multiplexing system including the optical amplifier as shown in FIG. 39 (FIG. 40, FIG. 41)
Figure 45:
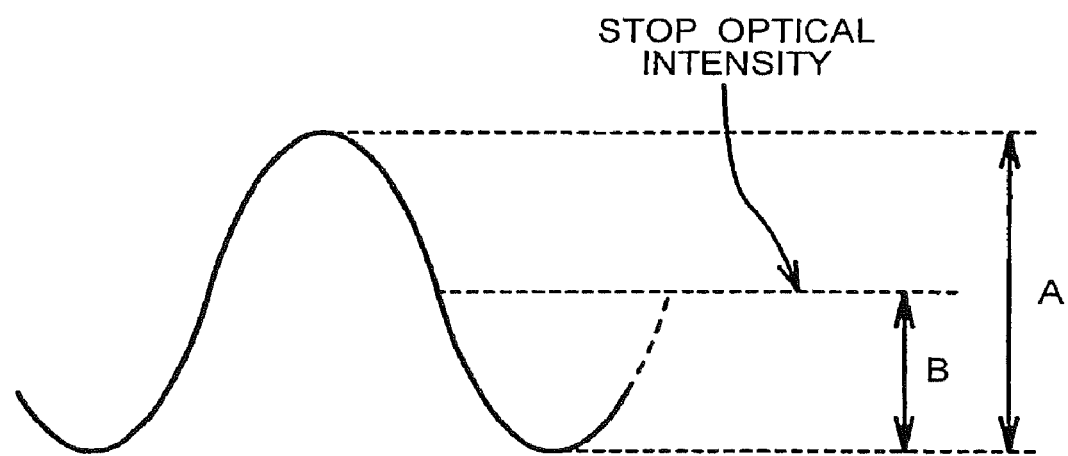
FIG. 45 is a graph for explaining the B/A in the B/A control method.

FIG. 44 is a block diagram to illustrate a configuration of the above mentioned wavelength division multiplexing system 400. As shown in FIG. 44, the wavelength division multiplexing system 400 includes an optical sender T which sends the wavelength division multiplexed light signals consisting of plural optical signals with different wavelength to an optical transmission route P, an optical receiver R which receives the wavelength division multiplexed light signals transmitted through the optical transmission route P, and plural optical amplifiers 300 which is connected in series and have a function of a translator between the optical sender T and the optical transmission route P. Therefore the optical amplifiers 300 have a function to amplify the wavelength division multiplexed light signals transmitted thorough the optical transmission route P at the same time.

The backward excited type optical amplifier 310 or the dual excited type optical amplifier 320 can be applied for the optical amplifier as well as the frontward excited type optical amplifier 300. It is possible to select any of the frontward excited type optical amplifier 300, the backward excited type optical amplifier 310 or the dual excited type optical amplifier 320, and locate them in the desired arrangement.

The wavelength division multiplexed light signals sent by the optical sender T is amplified gradually by each optical amplifier 300 including the above mentioned GFF 303 (Refer to FIG. 39.) and transmitted to the optical receiver R in the wavelength division multiplexing system 400. It is possible to send wavelength division multiplexed light signals with a high optical SN ratio which has the similar level in each wavelength from the optical sender T to the optical receiver R because the gain of the wavelength division multiplexed light signals is equalized and the NF ratio is controlled by the GFF 303 in each optical amplifier 300.

Though the embodiment of the present invention is explained, the present invention is not limited to the above mentioned embodiment. Therefore various kinds of change or improvement are included in the present invention.

As mention the above, according to the wavelength determining method and apparatus for a thin film thickness monitoring light, and the deposition system and program, it is possible to determine the wavelength which minimizes the effects of the wavelength change as a wavelength of a monitoring light even if the relative wavelength change occurs in a monitoring light during the deposition of each thin film layer.

Therefore it is possible to minimize the optical thin film thickness error caused by the relative wavelength change and control the cumulative thin film thickness errors in the total multi-layer thin films within the range to get the desired optical profile in the total multi-layer thin films.

According to the multi-layer thin film filter and its design apparatus of the present invention, the multi-layer thin film filter with the target wavelength profile can easily designed because a wavelength profile with a sharper transmission loss change against the wavelength can be obtained in the same number of layers with compared to the multi-layer thin film filter which is designed based on λ/4 as a basic thin film thickness.

According to the deposition control method and its system of the present invention, even if the thin film thickness error occurs in each thin film layer which is actually deposited because of the plural reasons such as the optical time constant, a delay of the signal processing, effects of the mechanical movement, effects of turning around and the like, it is possible to estimate this thin film thickness error from the optical profile data of the multi-layer thin film filter which is actually deposited and adjust the deposition time and the design thin film thickness by the estimated thin film thickness.

Therefore it is possible to maintain low transmission loss error not affected by the thin film thickness error and improve the reliability and the practical use of the multi-layer thin film filter actually produced.

According to the multi-layer thin film filter and the thin film thickness design method and its apparatus, it is possible to provide the multi-layer thin film filter which has both the desired wavelength profile in the gain equalization wavelength band and the desired wavelength profile in the pumping light wavelength band because the optical thin film thickness of each thin film layer for the multi-layer thin film filter has the desired wavelength profile in each wavelength of the pre-determined gain equalization wavelength band and is designed so as to obtain the desired wavelength profile in the pumping light wavelength band not included in the above mentioned gain equalization wavelength band.

Therefore it is possible to correspond to the pumping light transmission/cutting off requirements for the multi-layer thin film filter which has the gain equalization function such as the GFF, improve the practical use of the multi-layer thin film filter.

It is possible to obtain a low transmission loss/large out put in the output profile of the optical amplifier with combining the multi-layer thin film filer with the sufficient wavelength profile corresponding to the above mentioned pumping light transmission/cutting off requirements with the optical amplifiers.

Further more, it is possible to obtain low electrical consumption in the total system with combining the above mentioned optical amplifier with the optical receiver.

What is claimed is:

1. An optical amplifier comprising:
   a first optical amplifying fiber;
   a second optical amplifying fiber connected in series with the first optical amplifying fiber;
   a multi-layer thin film filter connected between the first and second optical amplifying fibers; and
   a pumping light source connected so as to supply a pumping light to the first and second optical amplifying fibers;
   wherein the multi-layer thin film filter has a gain flattening transmission loss property in a signal wavelength band, and a flattening transmission property at a pumping light wavelength band of the pumping light source,
   wherein a predetermined wavelength band other than said signal wavelength band and said pumping light wavelength band is set as a cutting off band in the multi-layer thin film filter,
   wherein said cutting off band is between said signal wavelength band and said pumping light wavelength band or is set at a longer side of said signal wavelength band.

2. The optical amplifier of claim 1, wherein:
   said first optical amplifying fiber is connected at an input side of a signal light;
   said second optical amplifying fiber is connected at an output side of the signal light;
   said pumping light source is connected to an input side of said first optical amplifying fiber wherein a pumping light from said first pumping light source and said signal light co-propagate in the same direction so that said pumping light passes through said first optical amplifying fiber, said multi-layer thin film filter and said second optical amplifying fiber in this order.

3. The optical amplifier of claim 1, wherein:
   said first optical amplifying fiber is connected at an input side of a signal light;
   said second optical amplifying fiber is connected at an output side of the signal light;
   a second pumping light source is connected to an output side of said second optical amplifying fiber wherein a second pumping light from said second pumping light source and said signal light counter-propagate with each other so that said second pumping light passes through said second optical amplifying fiber, said multi-layer thin film filter and said first optical amplifying fiber in this order.

4. The optical amplifier of claim 1, wherein:
   said first optical amplifying fiber is connected at an input side of a signal light;
   said second optical amplifying fiber is connected at an output side of the signal light;
   a first pumping light source is connected to an input side of said first optical amplifying fiber wherein a first pumping light from said first pumping light source and said signal light co-propagate in the same direction so that said first pumping light passes through said first optical amplifying fiber, said multi-layer thin film filter and said second optical amplifying fiber in this order;
   a second pumping light source is connected to an output side of said second optical amplifying fiber wherein a second pumping light from said second pumping light source and said signal light counter-propagate with each other so that said second pumping light passes through said second optical amplifying fiber, said multi-layer thin film filter and said first optical amplifying fiber in this order.

5. The optical amplifier of claim 1, wherein:
   said signal wavelength band covers wavelengths from 1530 nm to 1560 nm.

6. The optical amplifier of claim 5, wherein:
   said pumping light wavelength is between 1460 nm and 1490 nm.

7. The optical amplifier of claim 5, wherein:
   said pumping light wavelength falls in a band of 980 nm.

8. The optical amplifier of claim 1, wherein:
   said first and second optical amplifying fibers are each formed by a rare-earth-doped optical fiber.

9. The optical amplifier of claim 8 wherein:
   said rare earth is an erbium.

10. The optical amplifier of claim 1, wherein:
    the flattening transmission property at said pumping light wavelength band indicates that a maximum value of a transmission loss thereof is larger than a maximum value of a ripple of said signal wavelength band.

11. The optical amplifier of claim 1, wherein:
    the flattening transmission property at said pumping light wavelength band indicates that a maximum value of a ripple thereof is larger than the maximum value of the ripple of said signal wavelength band.

* * * * *